Dec. 20, 1966 W. H. EGGLESTON ETAL 3,292,799
COMBINED UNSCRAMBLER AND FEED TABLE FOR SHEARING MACHINE
Filed Feb. 19, 1963 17 Sheets-Sheet 1
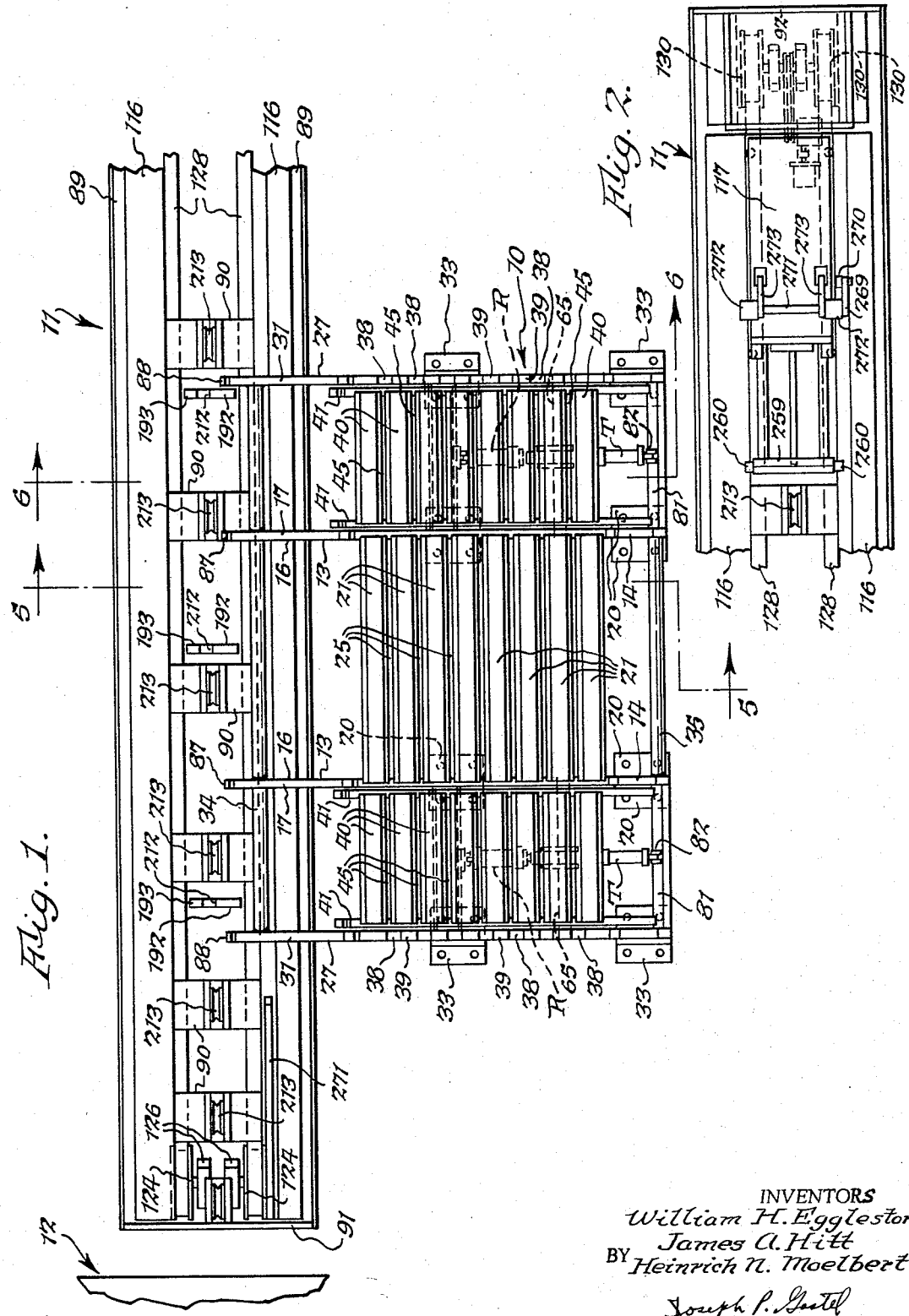
INVENTORS
William H. Eggleston
James A. Hitt
Heinrich N. Moelbert
BY
Joseph P. Gastel
ATTORNEY Dec. 20, 1966  W. H. EGGLESTON ETAL  3,292,799
COMBINED UNSCRAMBLER AND FEED TABLE FOR SHEARING MACHINE
Filed Feb. 19, 1963  17 Sheets-Sheet 2
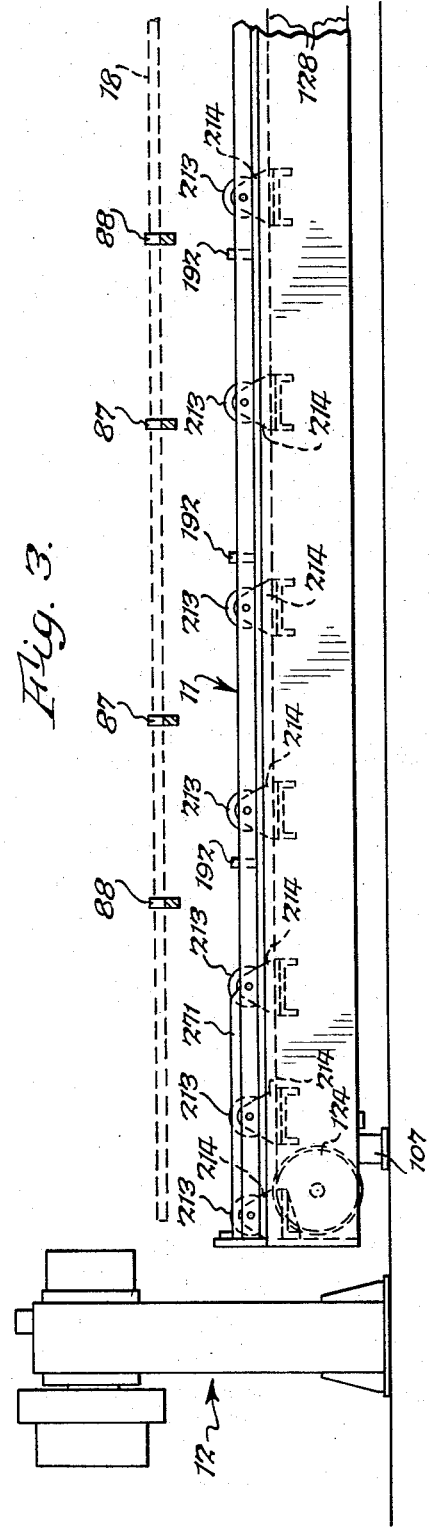
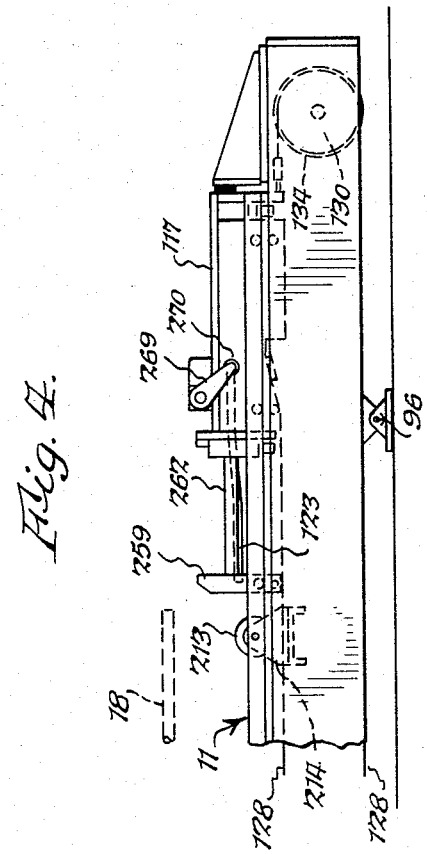
INVENTORS
William H. Eggleston
James A. Hitt
Heinrich N. Moelbert
BY
Joseph P. Gastel
ATTORNEY Dec. 20, 1966 W. H. EGGLESTON ET AL 3,292,799
COMBINED UNSCRAMBLER AND FEED TABLE FOR SHEARING MACHINE
Filed Feb. 19, 1963 17 Sheets-Sheet 3
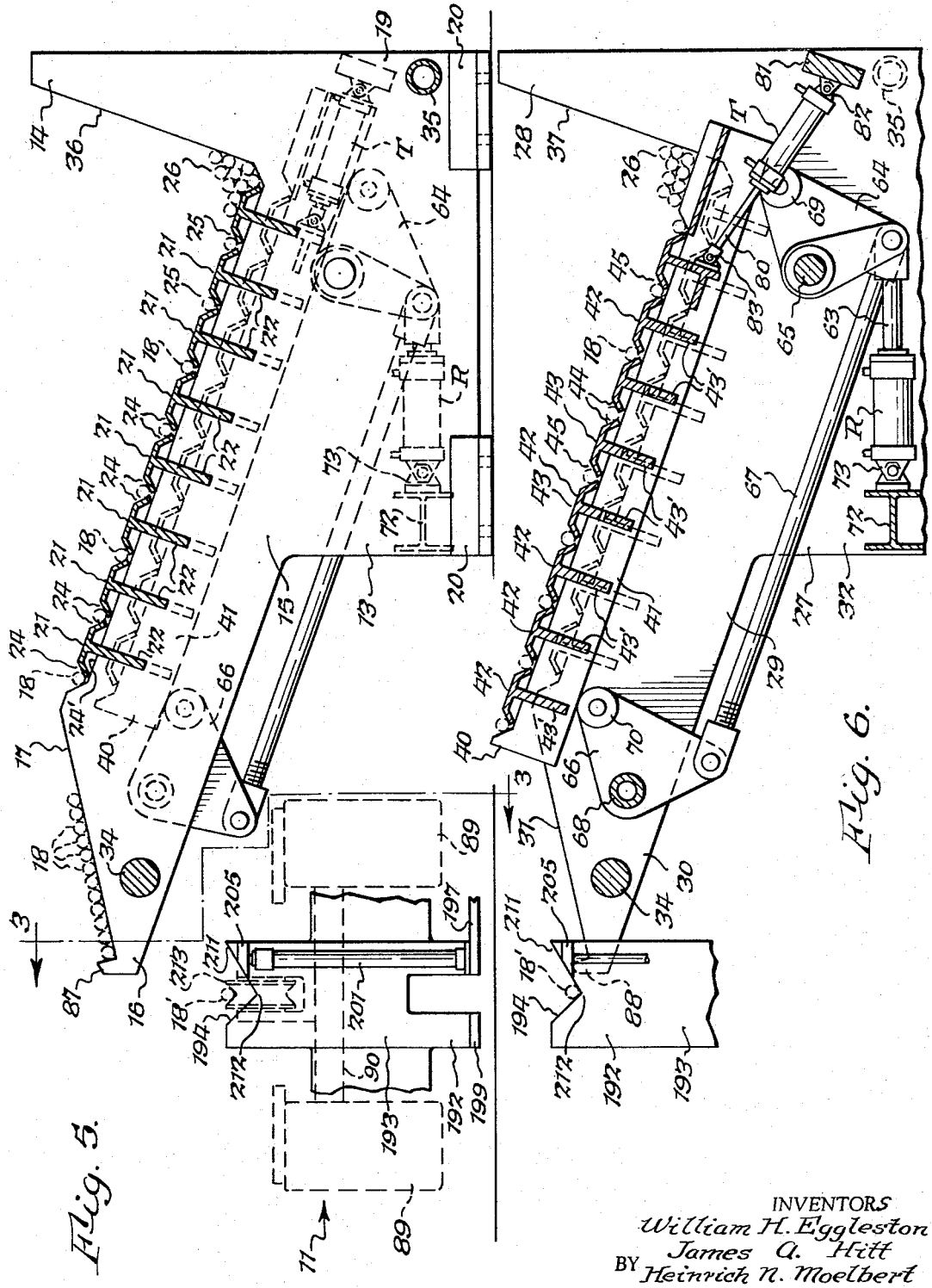
INVENTORS
William H. Eggleston
James A. Hitt
BY Heinrich N. Moelbert
Joseph P. Gastel
ATTORNEY

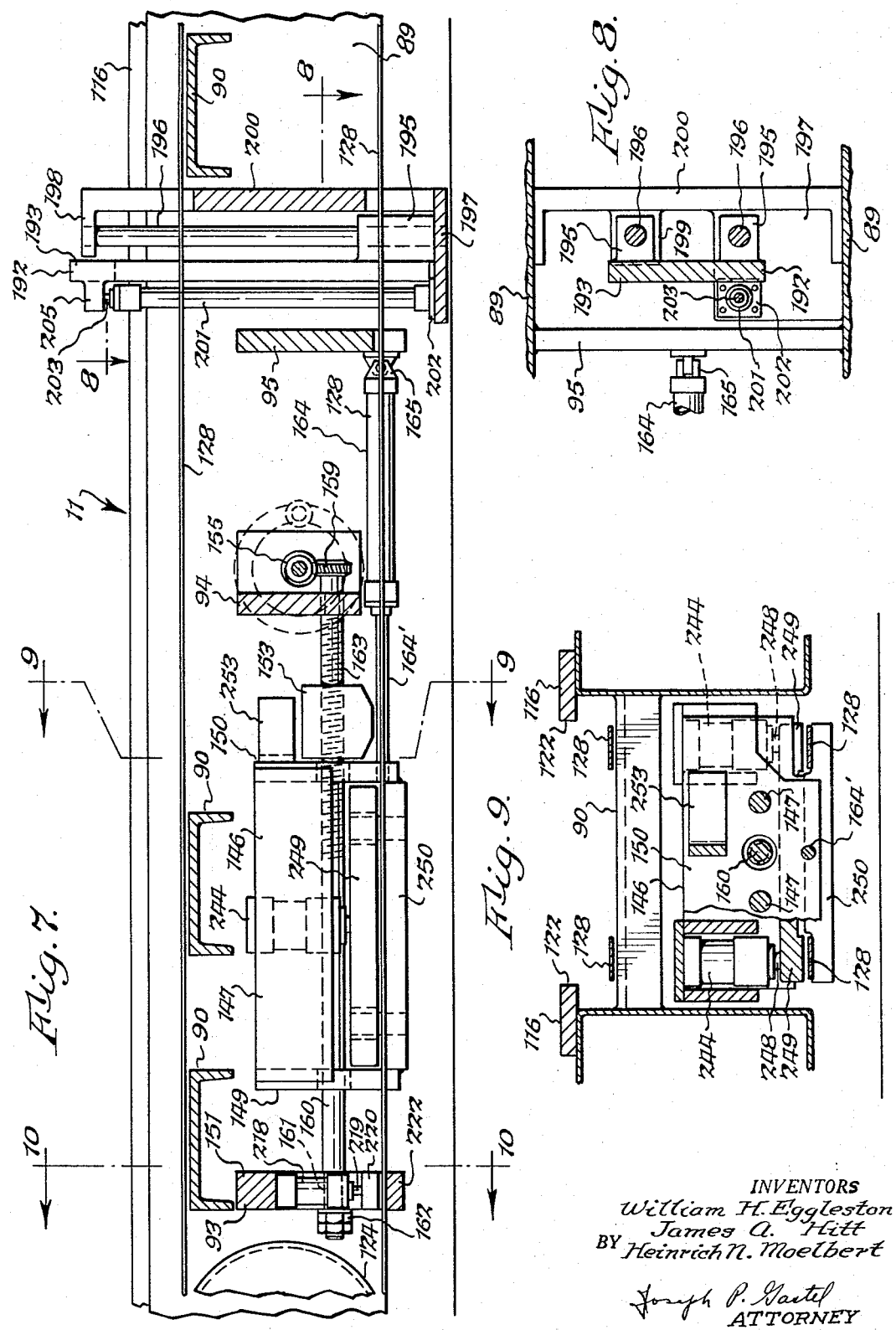

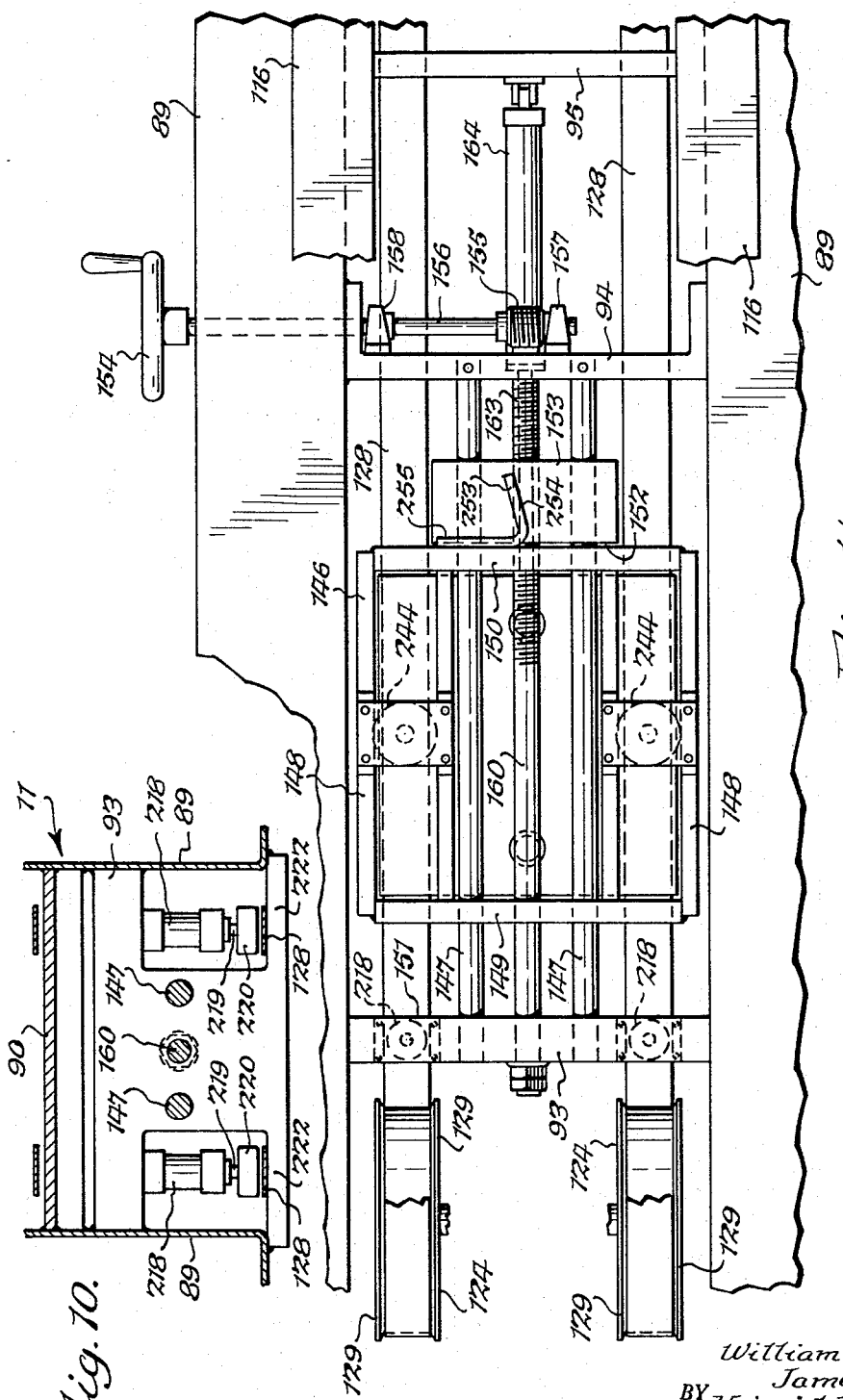

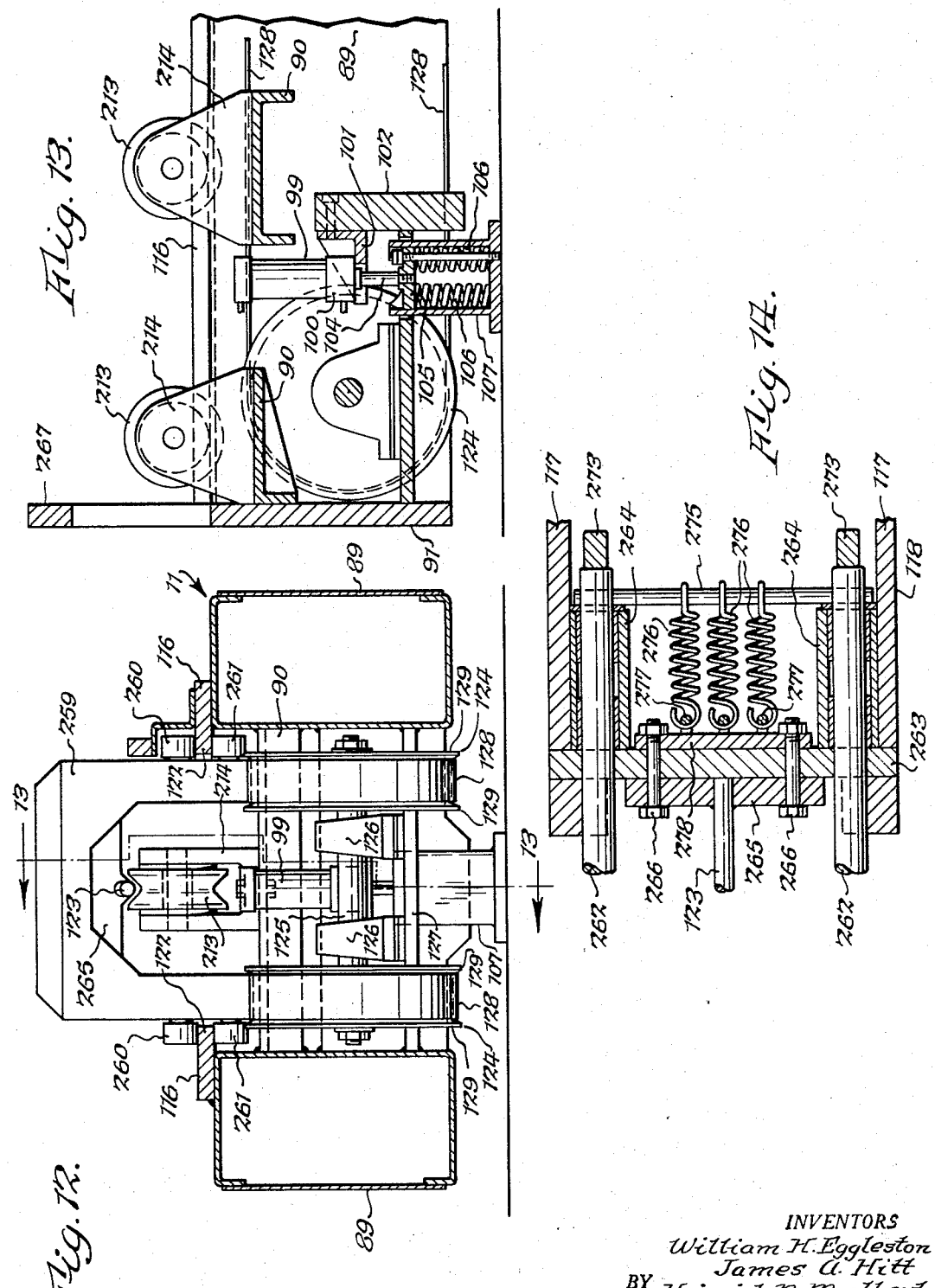

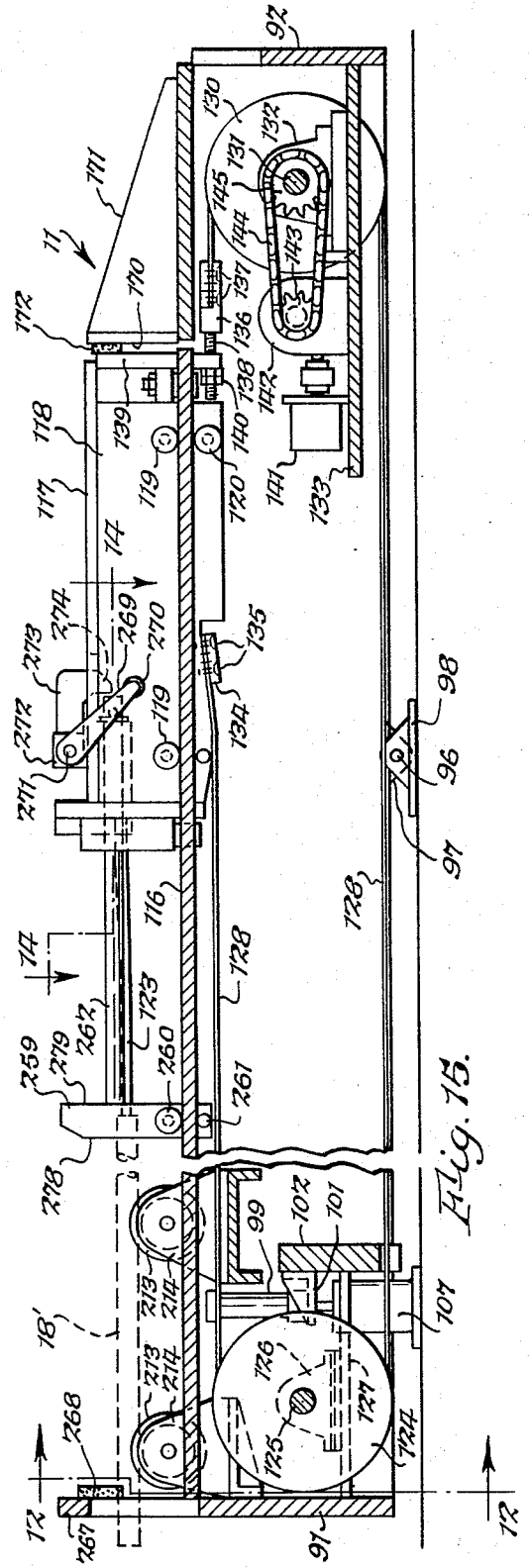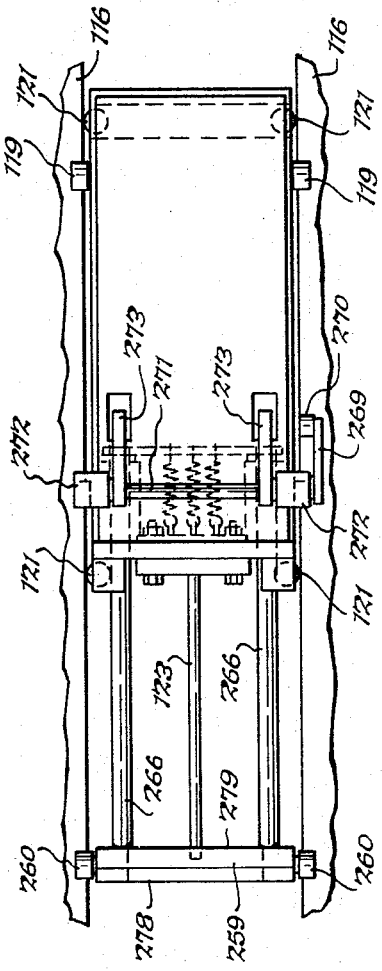

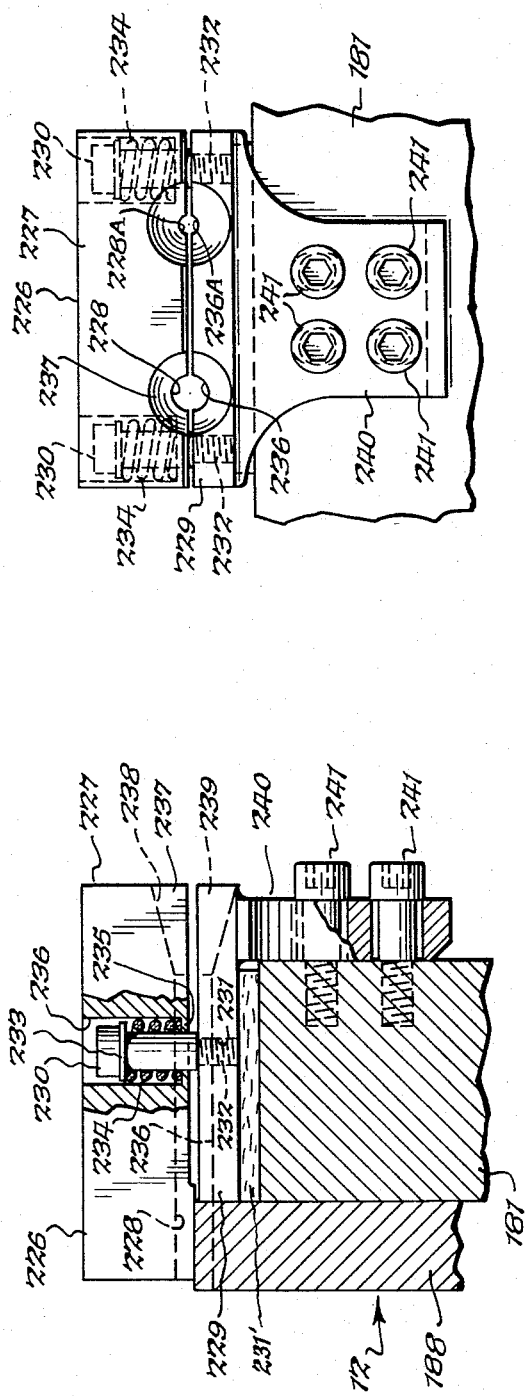
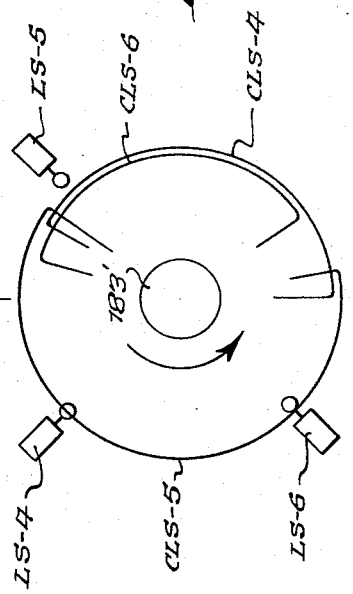

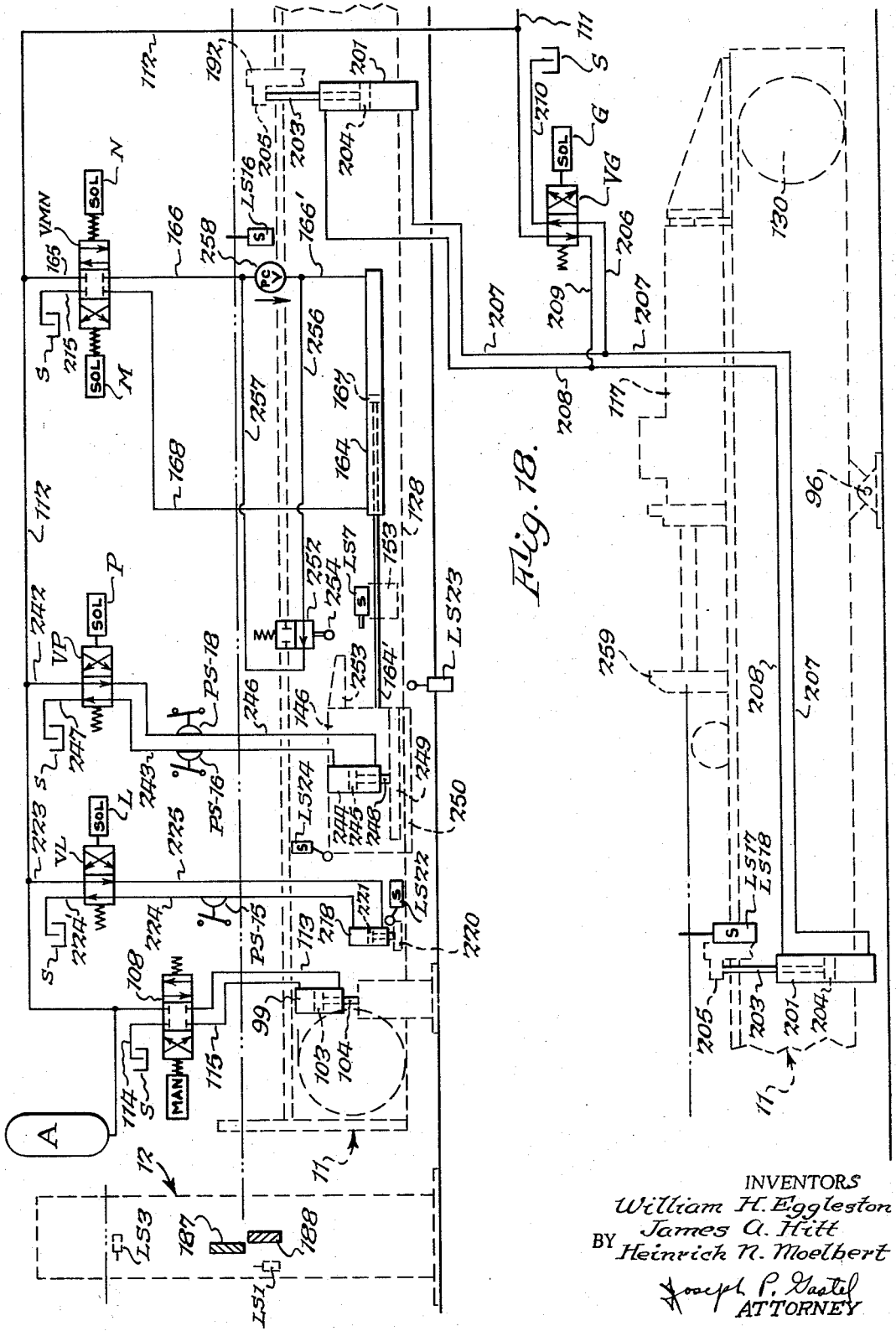

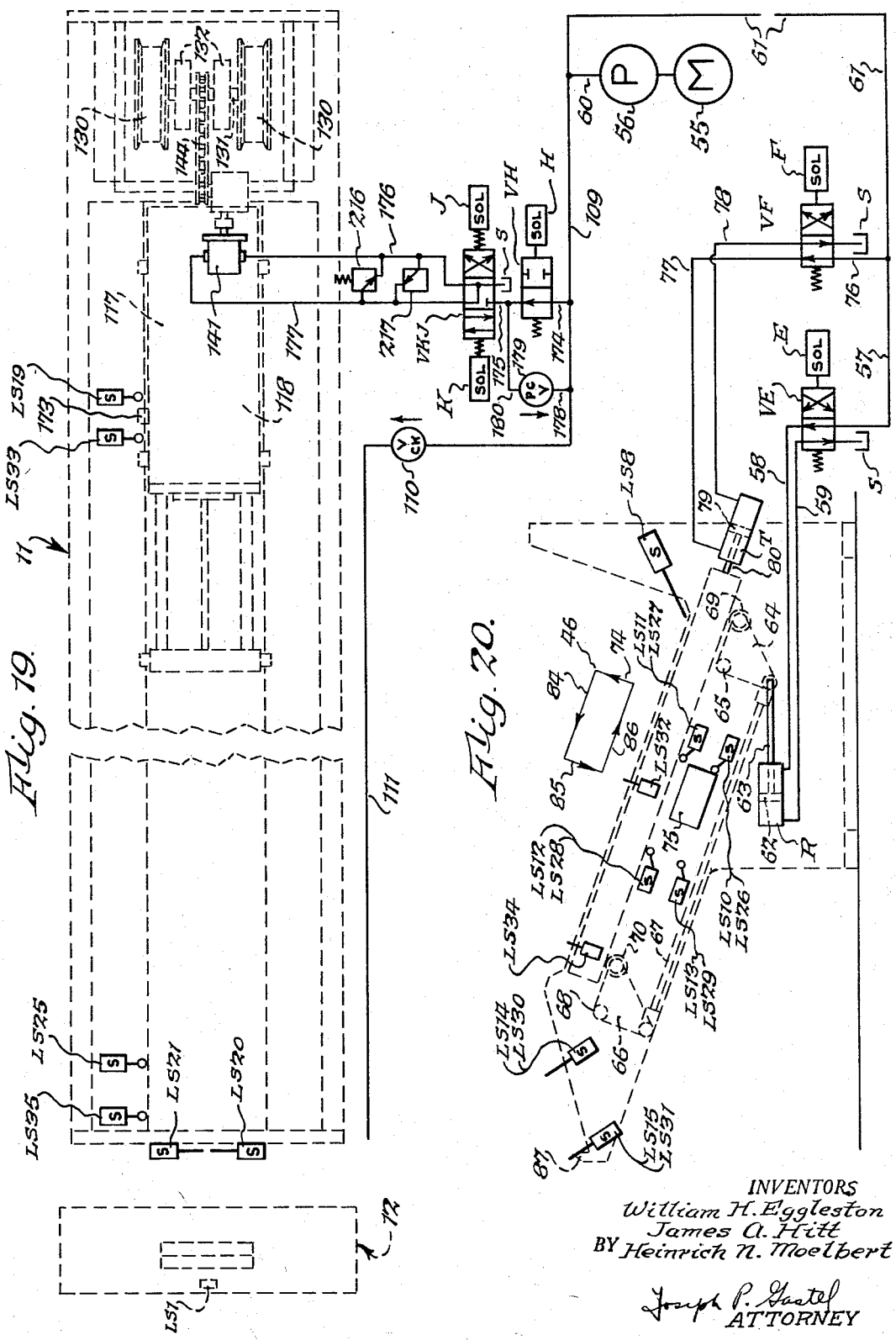

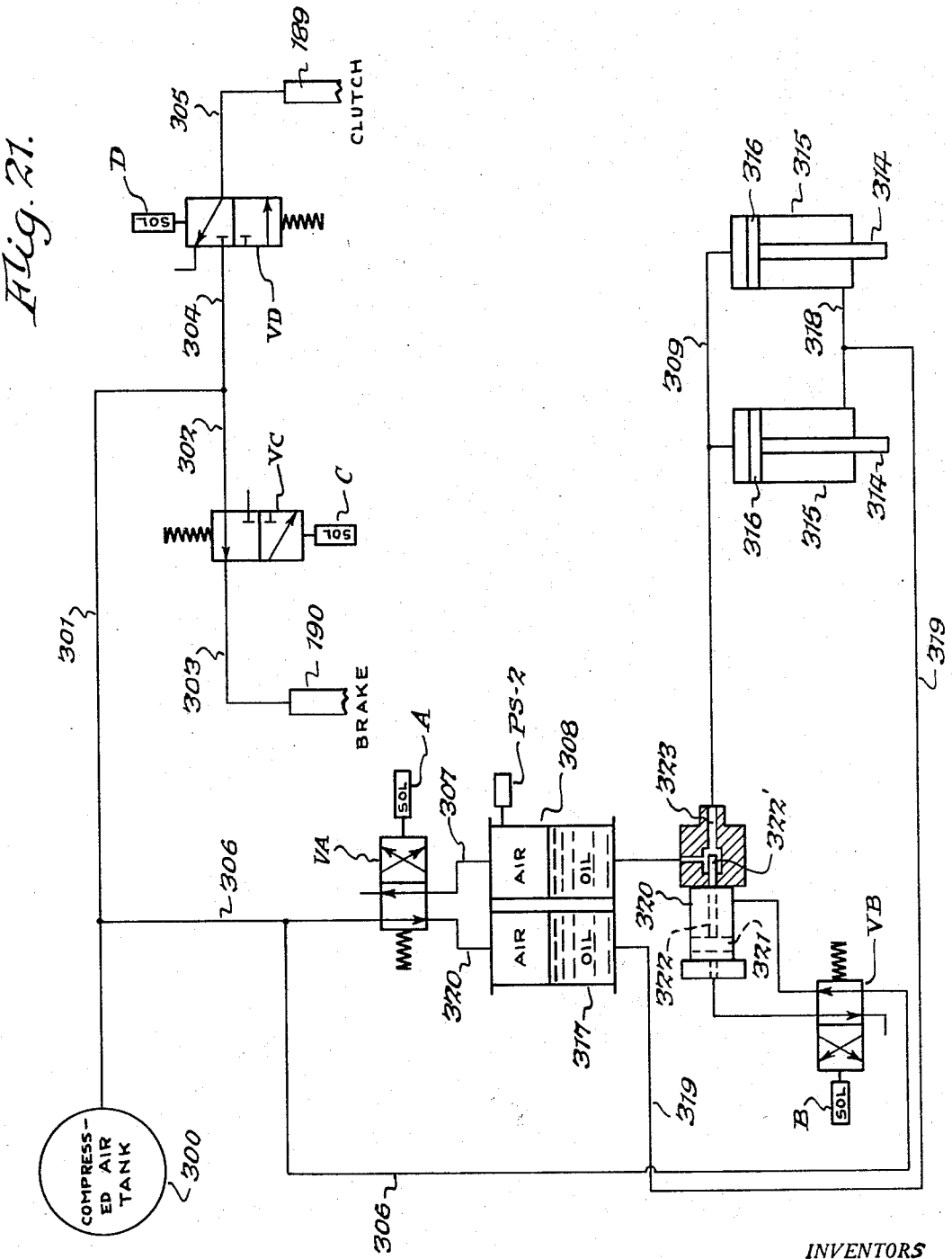

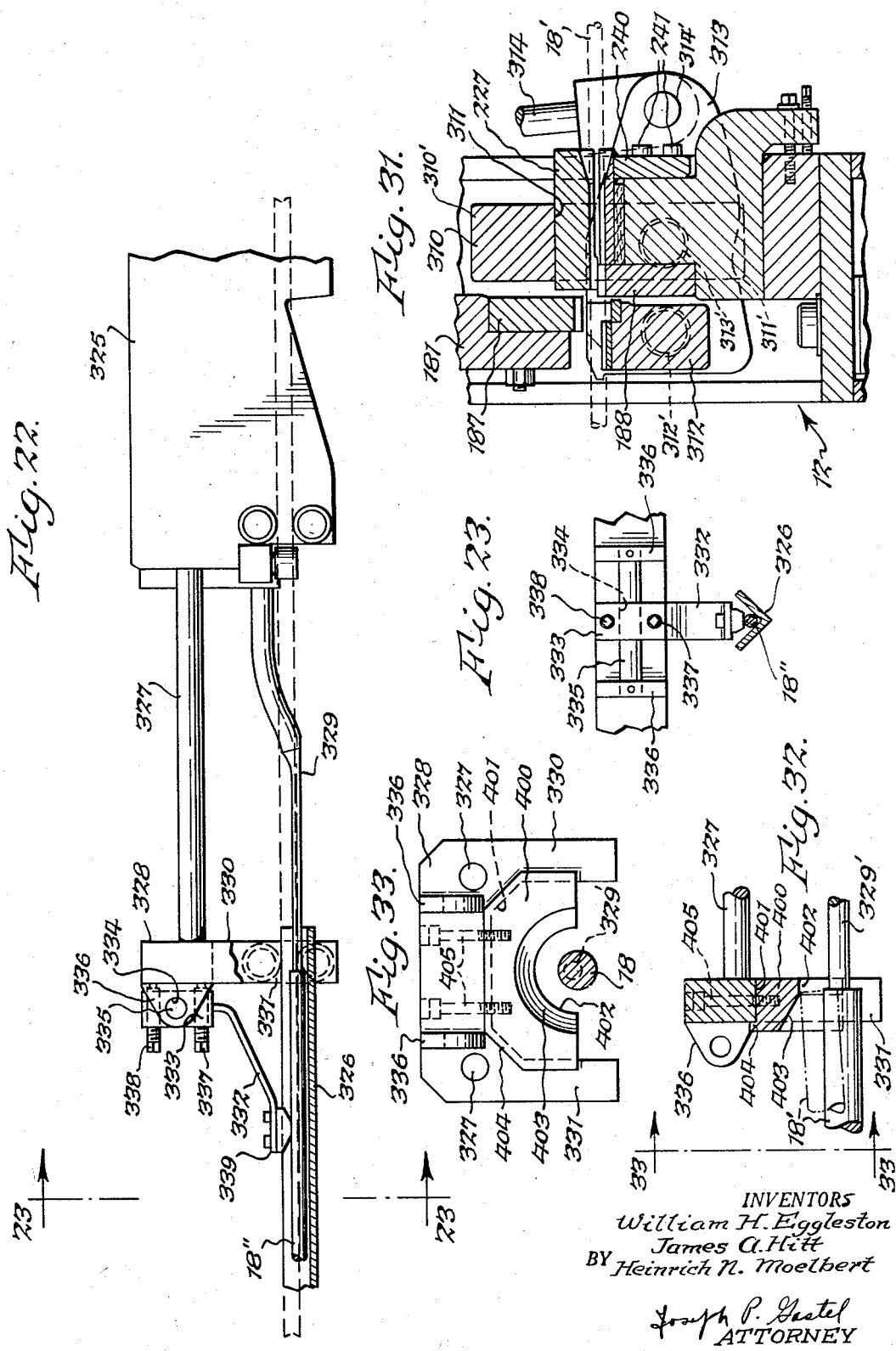

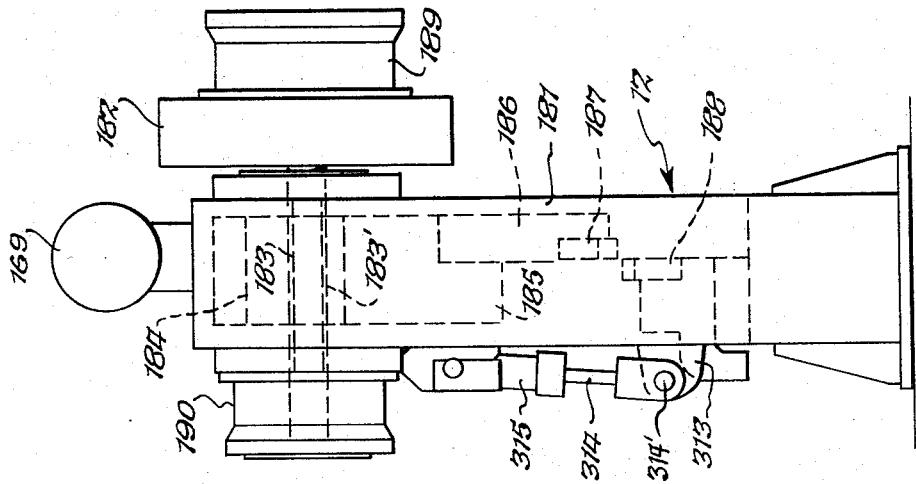
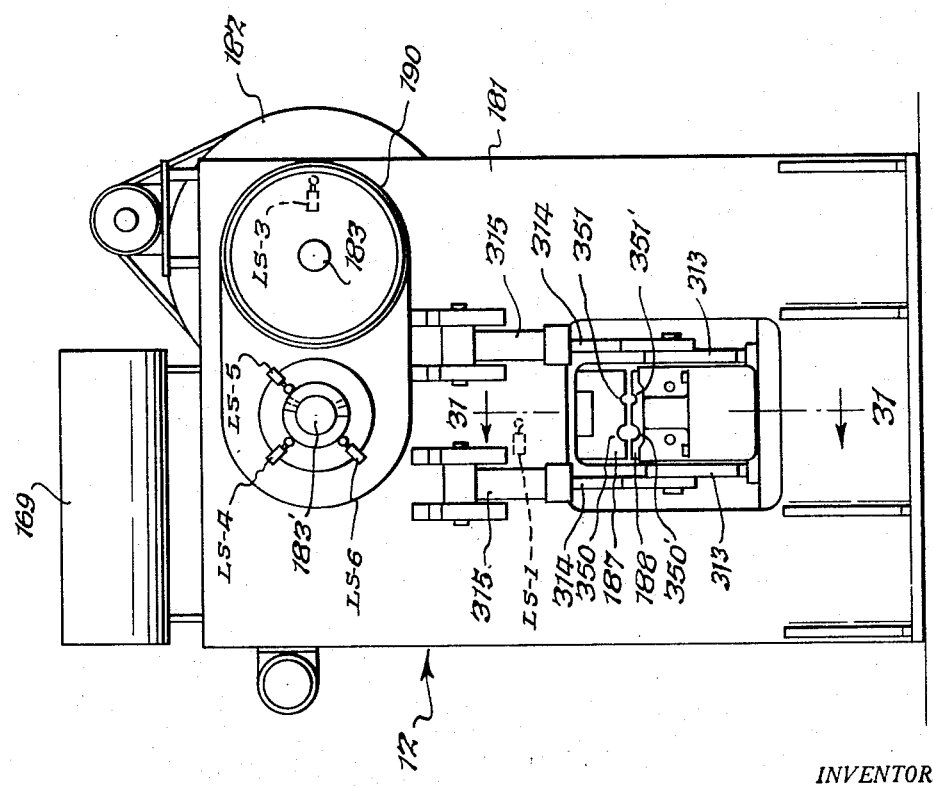

Dec. 20, 1966 W. H. EGGLESTON ETAL 3,292,799
COMBINED UNSCRAMBLER AND FEED TABLE FOR SHEARING MACHINE
Filed Feb. 19, 1963 17 Sheets-Sheet 14
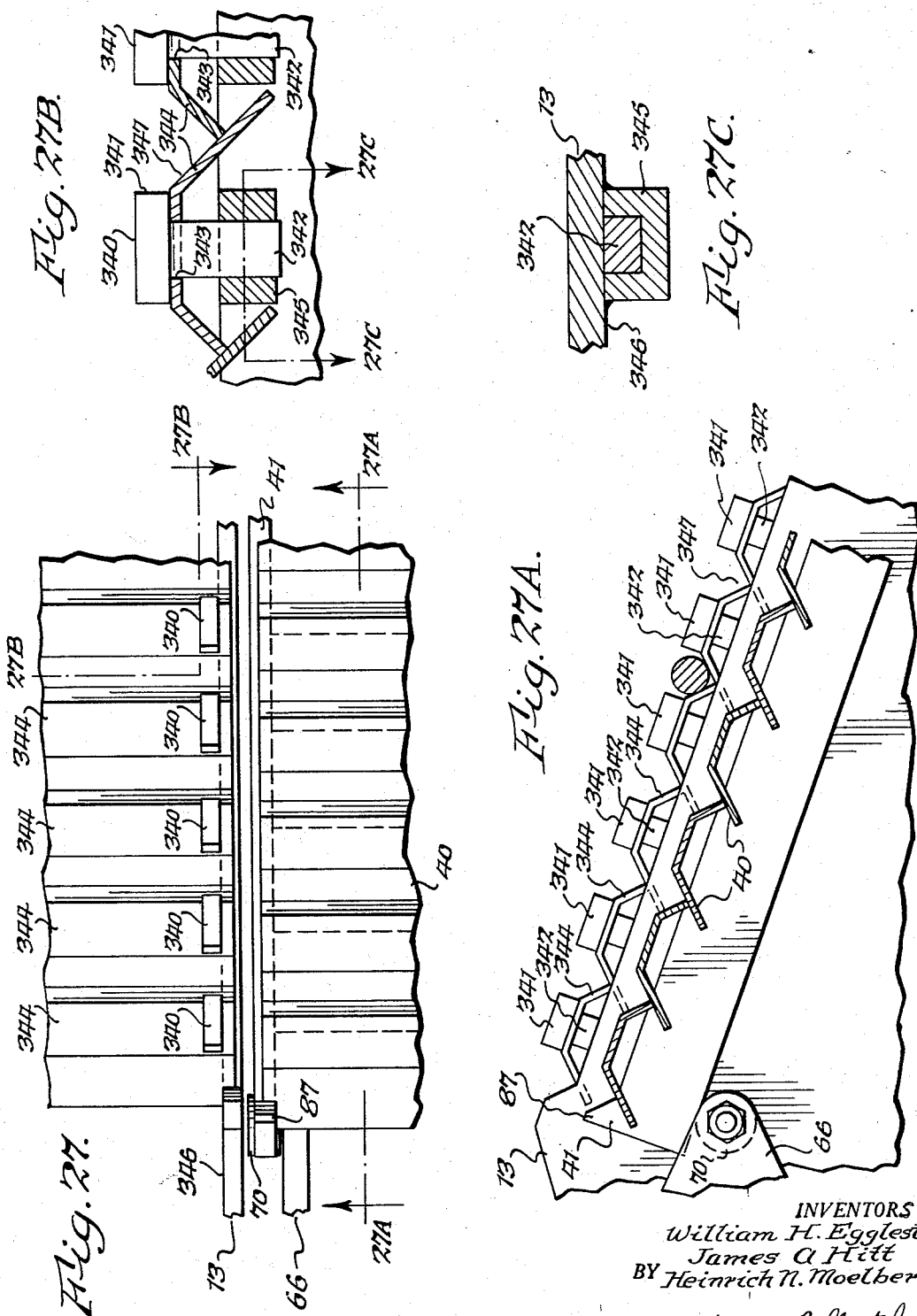
INVENTORS
William H. Eggleston
James O. Hitt
BY Heinrich N. Moelbert
Joseph P. Gastel
ATTORNEY

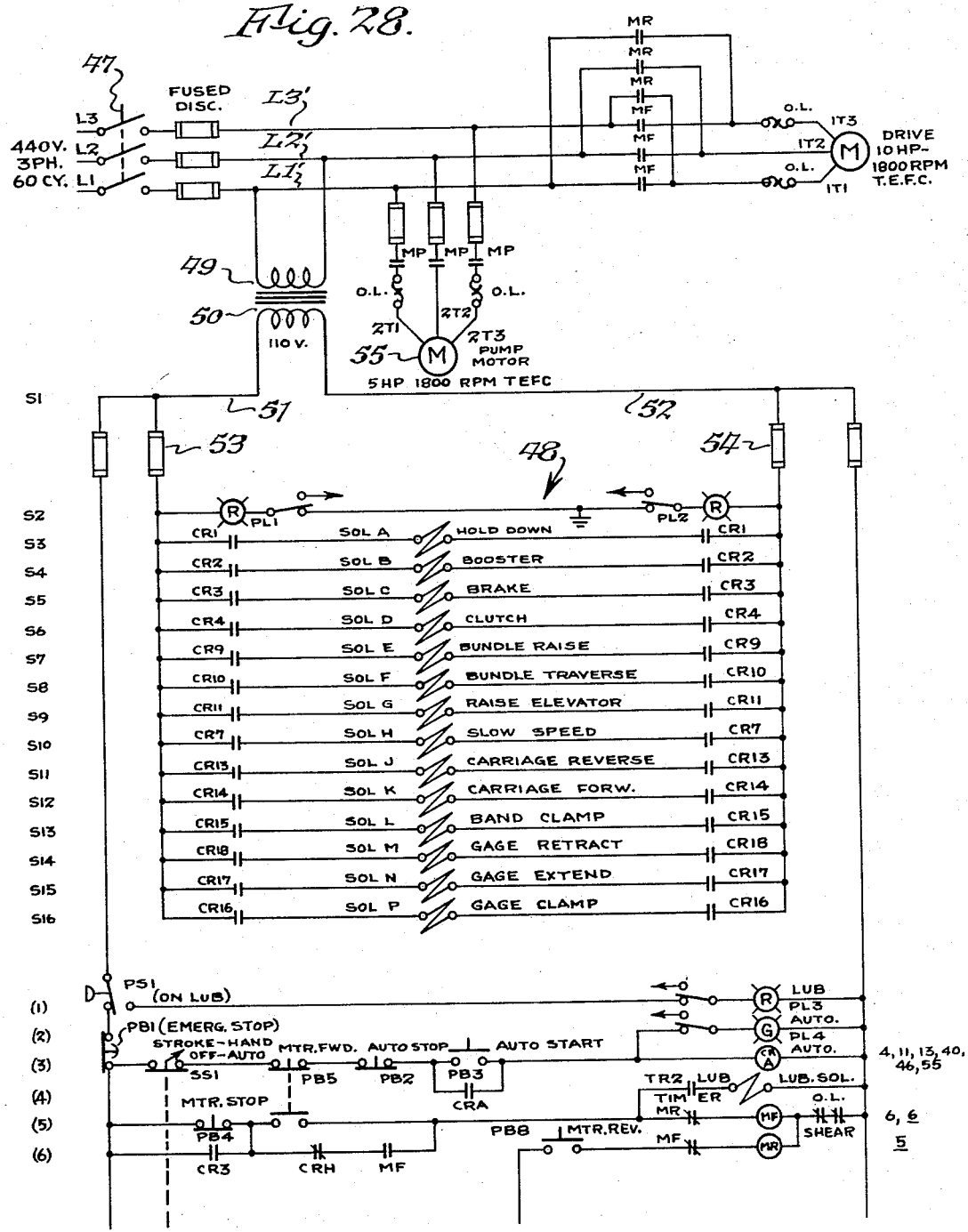

Dec. 20, 1966   W. H. EGGLESTON ETAL   3,292,799
COMBINED UNSCRAMBLER AND FEED TABLE FOR SHEARING MACHINE
Filed Feb. 19, 1963   17 Sheets-Sheet 16

INVENTORS
William H. Eggleston
James A. Hitt
BY Heinrich N. Moelbert

Joseph P. Gastel
ATTORNEY.

United States Patent Office 3,292,799
Patented Dec. 20, 1966

3,292,799
COMBINED UNSCRAMBLER AND FEED TABLE FOR SHEARING MACHINE
William H. Eggleston, West Seneca, James A. Hitt, Lakeview, and Heinrich N. Moelbert, Buffalo, N.Y., assignors to Buffalo Forge Company, Buffalo, N.Y., a corporation of New York
Filed Feb. 19, 1963, Ser. No. 259,622
15 Claims. (Cl. 214—1.5)

The present invention relates to an improved combined unscrambler, feed table, and shearing mechanism for automatically reducing a bundle of bars into accurately gauged slugs.

In the past the producing of accurately gauged slugs by shearing elongated metal bars into a plurality of pieces was a relatively time consuming, inefficient, difficult and expensive process. First of all there was an extremely significant material handling problem because the elongated rods were received from the mill in bundles weighing as much as 7½ tons. Therefore, such bundles had to be separated into single bars and loaded on to feeding devices associated with a shear. The foregoing operation was usually effected manually. The reason for effecting the foregoing operation manually was because there was no efficient and positive manner known for effectively unscrambling a bundle of bars or rods and co-ordinating such unscrambling action with the action of a feed table associated with an intermittently operating shear. Because the unscrambling and loading was effected manually, the process was time consuming and costly in view of the attendant high labor costs and low productivity.

Secondly, the feeding of the separated bars to a shearing machine by the use of a prior art feed table or the like was usually inefficient in that accurately gauged slugs could not be obtained in a rapid manner because existing gauging devices were inherently incapable of high production. More specifically, in shearing an elongated member into a plurality of slugs, it was conventional to utilize a back gauge or stop on the shear which permitted only a predetermined portion of a rod to advance through the shear to thereby gauge the length of the slug. However this type of gauge had certain shortcomings. More specifically, when an attempt was made to feed the elongated member through the shear rapidly, the gauging was not accurate because the bar would tend to strike the gauge with a relatively high force and bounce back, that is, the bar would not stop in abutting engagement with the gauge. In this instance a shorter slug would be sheared from the bar than was desired. Other times the rapid movement of the bar into engagement with the gauge would cause the latter to spring and this would result in a longer than desired slug being cut. The only way to overcome the deficiencies of prior art gauging devices of the foregoing type was by slowly feeding the bar stock into engagement with the above type of gauge. However, this type of operation resulted in a relatively low output of slugs from the machine.

Furthermore the above type of gauge which was located at the rear of the shear had certain other undesirable aspects. More specifically, it blocked the rear of the shear, especially when it was sufficiently large to provide an unyielding stop, so that access to the dies in the rear of the machine was obstructed. In addition, when short slugs were being cut from an elongated rod, the gauge was sufficiently close to the dies so that it occasionally prevented slugs from being positively discharged from the shear with the attendant result that such slugs tended to jam the shear. On the other hand, when extremely long slugs were being sheared, it was required that additional means be located at the exit side of the shear for supporting the elongated bar during the actual shearing action because, in the absence of such support, the terminal portion of the elongated bar would tend to fall from the machine, prior to the shearing action, because of the fact that a greater portion of the bar extended from the rear of the machine than was being supported on the feed table associated with the machine. The additional structure which was utilized for the foregoing purpose was not only cumbersome but also expensive. In certain instances wherein actual apparatus was not used to overcome the foregoing shortcomings, it was customary to station a man at the rear of the shear and his sole function was to support the portion of the bar protruding from the shear of the machine to prevent an unbalanced bar from dropping from the machine without being sheared. Furthermore, in the foregoing type of action utilizing a gauge mounted on the rear of the machine it was impossible to utilize a conveyor for conducting slugs from the machine because the back gauge and supporting mechanism, if used, prevented the use of a conveyor. In view of all of the foregoing factors, prior art feeding and gauging devices limited the production of accurately gauged slugs from a shearing machine and therefore ultimately resulted in a relatively high unit cost per slug.

Thirdly, there was no efficient automatic manner of effecting a crop cut on the end of a bar, this procedure being necessary to remove the small imperfect end portion thereof. Furthermore there was no efficient automatic manner know for ejecting a remnant end portion of a bar from the shear to prevent this remnant end portion from jamming the shear in the event that it was not pushed out by a subsequent bar or did not fall out by itself. Therefore both of the foregoing operations were usually effected manually with an attendant decrease in production from a shear and an attendant increase in labor costs, the foregoing factors also greatly increasing the cost per slug. It is with the providing of an improved unscrambling and article feeding apparatus in combination with an intermittently operating machine, such as a shear, which overcomes the foregoing shortcomings of the prior art that the present invention is concerned.

It is accordingly one important object of the present invention to provide an improved combined unscrambler and feed mechanism which will automatically separate elongated members such as bars or rods from a bundle and feed a single rod in predetermined accurately gauged increments to a machine, such as a shear, which intermittently operates on the elongated members.

Another object of the present invention is to provide an improved feed table for an intermittently operating machine such as a shear, or the like, said feed table being capable of automatically advancing a bar or rod-like member into the machine in accurately gauged increments. A related object of the present invention is to provide an improved feed table of the foregoing type which is capable of high speed operation while maintaining a high degree of accuracy as to the length of the elongated member which is automatically advanced into the machine. A still further related object of the present invention is to provide a feed table which is capable of advancing an elongated member into a machine in accurately gauged increments without utilizing gauges or stops on the rear of the machine which obstruct the movement of the member.

Another object of the present invention is to provide a feed table for use with a shear which automatically provides a crop cut incidental to initially feeding the bar into the shear and which thereafter provides a plurality of cuts at accurately spaced intervals along the bar and thereafter automatically ejects any terminal portion of the bar which is shorter than the length of slug which is being cut. A related object of the present invention is to provide an improved feed table which in addition to achieving the foregoing objects, automatically returns to a condition wherein it can subsequently receive an elongated bar or rod-like member and automatically repeat the above-described cycles of operation.

Still another object of the present invention is to provide an improved unscrambler which is capable of separating a bundle of elongated members such as bars or rods in an extremely positive manner and transporting a single bar or rod to a predesignated location. Other objects and attendant advantages of the present invention will readily be perceived hereafter.

The unscrambler of the present invention includes a bin portion which is adapted to receive a bundle of elongated rods or bars. When the unscrambler is connected to a suitable source of energy for operation, the mere placing of the bundle in the bin portion causes the actuation of a limit switch which initiates operation of the unscrambler. The unscrambler includes a bundle table which is inclined upwardly from the bin, said bundle table including a plurality of equally spaced horizontal slots extending upwardly along the incline. A movable bundle carrier arrangement is also provided on each side of the bundle table. Each bundle carrier includes a plurality of horizontal slots which are spaced the same distance apart as are the slots in the bundle table. The movable bundle carrier arrangement is inclined upwardly away from the bin at the same angle as the bundle table. When the unscrambler is actuated in the manner above, a control circuit will cause the bundle carriers to move upwardly from beneath the bundle table while the slots in both the bundle carrier and bundle table remain in alignment. This will cause bars which are held in the lowermost slots in the bundle table to be lifted by corresponding slots in the bundle carrier. Thereafter the control circuit will cause the bundle carriers to move upwardly in the direction of inclination of the bundle table and carry bars upwardly which are held in the slots of the bundle carriers. After an upward distance of one slot is traversed by the bundle carriers, the control circuit will cause the bundle carriers to move downwardly while the slots therein and the slots in the bundle table remain in alignment. A point will be reached wherein the bundle carriers pass beneath the bundle table and at this time the bars will be received in slots in the bundle table which are elevated along the incline a distance of one slot from the slots from which the bars were originally removed. Thereafter the control circuit will cause the bundle carriers to continue to move downwardly until such time as they no longer engage the bars. The control circuit will thereafter cause the bundle carriers to move downwardly in the direction of inclination of the bundle table until such time as the slots in the bundle carriers which originally carried the bars are in alignment with the slots in the bundle table from which the bars were originally taken. Thereafter the foregoing cycle is again repeated. In this manner bars which are in the lowermost slots of the bundle table are gradually elevated to the uppermost slots. Since the bundle table is inclined upwardly and since the slots are preferably of a size to receive only a single bar, bars which are not securely held in the slots in the bundle table will tend to roll downwardly into the bin. In this manner the tendency for lifting a plurality of bars in the same slots is greatly minimized. After a bar reaches the top of the incline, it rolls along a downwardly inclined surface of a storage rack until such time as it abuts a fixed stop. The above described cycle of elevating individual bars from a bundle is repeated until such time as a plurality of bars lie in juxtaposed relationship along the downwardly inclined surface of the storage rack. After a certain number of bars are so located, a limit switch is actuated to energize a control circuit which causes the unscrambler to automatically terminate operation.

As soon as a single bar is positioned on the storage rack, a limit switch is actuated which causes mechanism to be actuated for moving said bar to a feed table. This is achieved by an elevator arrangement which is coordinated with the operation of the feed table portion of the present invention. When a control circuit indicates that the feed table is clear for receiving a bar, the above-mentioned limit switch energizes a circuit to cause the elevators to rise. The elevators have a pointed end which fits between the lowermost bar on the downwardly inclined surface of the storage rack and the next adjacent bar and lifts this lowermost bar upwardly as the elevators rise above the fixed stop on the downwardly inclined surface of the storage rack. The elevators have a V-shaped slot in the upper surface with the apex of the V extending downwardly. The lowermost bar which is picked up from the downwardly inclined upper surface of the storage rack rolls into the apex of the V-shaped slot as the elevators lift the bar beyond the fixed stop. After the elevators have moved a sufficient distance so that the bar clears the fixed stop, a limit switch is actuated to energize a control circuit which causes the elevators to reverse their movement and move downwardly. Because the lowermost bar has rolled into the slot of the V-shaped elevators, it will miss the fixed stop on the storage rack during the downward movement of the elevators. The downward movement of the elevators is, in turn, continued until such time as the bar comes to rest on V-shaped guide rolls, or the like, which are in alignment with the machine to which the bar is to be fed. Thereafter the elevators will continue to retract until such time as they are clear of the bar so that they will not interfere with the proper operation of the feed table. After the bar is removed from the unscrambler in the above-described manner, the remainder of the bars on the downwardly inclined surface will roll toward the fixed stop of the lowermost portion of the storage rack. At this time a limit switch will be actuated to cause the unscrambler to operate for a single cycle to replenish the number of bars on the downwardly inclined surface.

After the bar is located on the feed table in the above-described manner, the improved feed table of the present invention automatically commences to feed the elongated bar to an intermittently operable machine in positively gauged increments. In the present instance the intermittently operated machine is depicted as a metal shear commonly called a billet shear. It will be understood, however, that the principles of the present invention may be utilized with other types of intermittently operating machines, such as forging presses or the like. The improved feed table of the present invention includes a frame having a pair of spaced guides thereon. A feed carriage is mounted for reciprocating movement along these guides. It is to be noted at this point that the bar cannot be placed on the feed table unless the feed carriage is located at the rear of the table. Pulleys are journaled proximate the front and rear portions of the feed table. These pulleys have flat metal bands encircling them, said metal bands being affixed to the above-mentioned feed carriage. As a result of the placing of the bar on the table in the above-described manner, a limit switch is actuated which in turn effects energization of a motor associated with one of a pair of spaced pulleys. This causes the pulleys to rotate at high speed to advance the feed carriage into engagement with the bar on the table. Thereafter the bar and carriage will move in unison at a high rate of speed toward the billet shear. However limit switches are provided proximate the billet shear to energize a control circuit to cause the carriage to move at a low rate of speed while the end of the bar is in the vicinity of the shear. A suitable control circuit, however, causes the shear to be in a position with its movable blade obstructing the path of movement of the bar. Therefore the bar will come to rest, after traveling at slow speed, against the blade. It will be understood that the end portions of bars or rods are usually of irregular shape. This necessitates that a crop cut be effected thereon to remove such irregular shape. The crop cut consists of removing only a small portion of the end of the bar in the interest of conserving material.

In order to automatically effect the above-described crop cut and to advance the above-mentioned bar which has been delivered to the feed table in increments, a gauging carriage is provided on the frame of the feed table. The gauging carriage is movable by a suitable hydraulic motor between a fixed abutment and a movable abutment. By adjusting the movable abutment relative to the fixed abutment the length of movement of the gauging carriage can be determined. After a bar has been delivered to the feed table in the above-described manner, a control circuit will cause the gauging carriage to be in position against the fixed abutment. Thereafter, the gauging carriage will be actuated by the motor associated therewith and be caused to travel a predetermined distance away from the said fixed abutment, but not to the point where it abuts the movable abutment. Its movement will be terminated when it contacts the crop cut limit switch, located between the fixed and movable abutments, which energizes a control circuit which causes it to stop. Thereafter a pair of gauging clamps on a movable carriage will be actuated, as a result of the carriage coming in contact with said limit switch, to thereby clamp said bands to said gauging carriage. After the end of said bar abuts the movable knife, in the manner noted above and the gauge clamps are clamped, a control circuit will cause the movable knife to be removed from the path of the bar, and the gauging carriage will be caused to advance the distance between the above-mentioned crop cut limit switch and the movable abutment. This will cause the feed carriage to advance a distance which is equal to the distance between the crop cut limit switch and the movable abutment to thereby move an imperfect end of the bar through the shear. After the gauging carriage has engaged the movable abutment a limit switch will be actuated which sets the shear in operation to thereby shear off the imperfect end of the bar and thereby provide a crop cut automatically. The shear will thereafter return the movable knife to a top dead-center position and a suitable control circuit will cause the shear to stop in this position.

Thereafter a pair of band clamps mounted on the frame of the machine will engage the above-mentioned bands which drive the feed carriage to hold the feed carriage attached to said bands in a position in which it last was placed during the crop cut. Therefore the position of the said carriage in contact with the end of the bar remote from the shear is an indirect indication of the location of the cut end of the bar. After the band clamps have been engaged to securely hold the bands and the feed carriage against relative movement with respect to the feed table, the motor associated with the gauging carriage is actuated to cause the latter to move until it comes into engagement with the fixed abutment. At this time a limit switch will be actuated to energize a circuit which causes the gauging clamps on the gauging carriage to engage the bands, and after such engagement has been effected, a suitable control circuit causes the band clamps to release the bands. After such release has been effected, the motor driving the gauging carriage will be actuated to cause the gauging carriage to move from the fixed abutment until such time as it abuts the movable abutment. Since the bands are clamped to the gauging carriage, the feed carriage which is driven by the motor associated therewith, will advance the rod through the shear an accurately gauged amount which is equal to the spacing between the fixed abutment and the movable abutment. The clamping of the flat metal bands, in the above-described manner, by the band clamps and the gauge clamps results in very accurate gauging of length of bar which is fed to the shear. More specifically, the flat metal bands provide an extremely large frictional gripping surface which permits the various clamps to positively grip them against undesired movement. Furthermore, the flexibility of the bands enhances such firm gripping engagement.

It is to be noted at this point that a pressure block is mounted on the shear to engage the bar being fed to the shear with a frictional force which is sufficient to overcome the momentum of the bar itself when the latter is not being positively driven by the feed carriage. Thus when the feed carriage stops, the bar will stop, and since the amount of advance of the feed carriage was accurately controlled by the gauging carriage, a very accurately measured portion of the bar will have been caused to pass through the shear. As noted above relative to the crop cut, after the gauging carriage has abutted the movable abutment, the shear cycle is initiated to cause an accurately measured slug to be cut from the end of the bar.

The foregoing cycle of operation between the feed table and the shear is repeated to thereby cause the feed carriage to advance the bar to the shear in increments, and after each movement of the bar has terminated, to cause the shear to shear an accurately gauged slug from the end of the bar. The foregoing cycle is continuously repeated until such time as the feed carriage is extremely close to the shear. At this time a limit switch will be actuated by the feed carriage to cause a probe of the feed carriage, which has been feeding the bar, to eject the remnant end of the bar from the shear to thereby positively clear the latter for the receipt of a new bar. It is to be noted that a control circuit is associated with the feed table and the shear to prevent the probe from being cut by the shear during the time the remnant is being ejected.

After the remnant has been ejected and the feed carriage has moved as far as it can go toward the shear, a limit switch is actuated to reverse the motor driving the feed carriage and cause the latter to travel mostly at high speed toward the rear of the table until such time as it engages a fixed abutment on the feed table and thereby actuates a limit switch which causes the electric circuit linking the above-mentioned elevators and the unscrambler to be energized to thereby feed another bar from the unscrambler onto the feed table. It is to be noted at this point that until the last-mentioned switch is actuated, a control circuit prevents a bar from being fed onto the feed table from the unscrambler and this assures that the feed table will be clear to receive said bar. Thereafter, the above-described cycle of operation will be repeated to again provide a crop cut and to shear the bar into accurately gauged slugs and thereafter eject the remnant from the shear. The foregoing cycle is automatically repeated again and again until the entire bundle of bars which were delivered to the unscrambler have been converted into accurately gauged slugs.

It is to be especially noted that the feed table may sometimes be as much as thirty or forty feet long. The returning of the feed carriage from its position adjacent the shear to its position at the rear of the table at high speed greatly minimizes the time required to prepare the feed table to receive a bar after the shearing of a previous bar has been completed. Furthermore, as noted above, the advancing of a bar, which has initially been placed on the feed table, toward the shear at high speed also minimizes the time required to again initiate the operation of the shear. Because of the above-described high speed cycles of operation, the actual loading time of the feed table is greatly minimized thereby permitting a relatively high output from said shear per unit of time. It is to be further noted that the automatic effecting of crop cut also obviates a time-consuming operation thereby further enhancing the output from the shear. In addition, it is to be noted that the use of the pressure block in conjunction with the shear not only prevents the bar from traveling under its own momentum and thereby provides accurately gauged slugs, but also eliminates the necessity for back stops or other types of gauges for stopping movement of the bar. This permits the rear of the shearing machine to be clear for the receipt of a suitable conveyor or the like for conveying the sheared slugs from the machine. In addition to the foregoing advantages of the pressure block, it is also to be noted that said pressure block positively holds the remnant end portion of the bar during the last shearing action of the shear and therefore prevents an unbalanced bar, that is, one with a greater portion protruding from the shear than the portion being fed to the shear, from falling out of the shear. In short, the improved unscrambler, feed table, and shear combination of the present invention produces results heretofore unobtainable and this combination will be more fully understood when the following portions of the specification are read in conjunction with the accompanying drawings wherein:

FIG. 1 is a fragmentary plan view showing the relationship of the unscrambler, feed table, and billet shear of the present invention;

FIG. 2 is a fragmentary plan view of a portion of the feed table and is a continuation of the feed table shown in FIG. 1;

FIG. 3 is a fragmentary side elevational view showing the relationship between the feed table and the shear and showing the position occupied by a rod on the unscrambler prior to its being loaded onto the feed table, this figure being taken substantially along line 3—3 of FIG. 5;

FIG. 4 is a fragmentary side elevational view of the end portion of the feed table and is a continuation of the feed table shown in FIG. 3;

FIG. 5 is a cross sectional view of the bundle table of the unscrambler taken along line 5—5 of FIG. 1 and showing the relationship between the bundle table and the bundle carriers when the latter are not carrying rods;

FIG. 6 is a cross sectional view taken along line 6—6 of FIG. 2 showing the bundle carriers of the unscrambler in an elevated position wherein they are moving rods upwardly along the bundle table;

FIG. 7 is a fragmentary view partially in cross section showing the relationship of the gauging carriage and associated adjusting mechanism relative to other portions of the feed table, certain portions of the feed table being omitted in the interest of clarity;

FIG. 8 is a fragmentary view partially in cross section taken along line 8—8 of FIG. 7 and showing the manner in which the elevators of the unscrambler are associated with the feed table;

FIG. 9 is a cross sectional view with portions broken away in the interest of clarity and showing the relationship of the gauging carriage to other portions of the feed table, FIG. 9 being taken along line 9—9 of FIG. 7;

FIG. 10 is a cross sectional view taken along line 10—10 of FIG. 7 and showing the relationship of the band clamps to the bands and frame of the feed table;

FIG. 11 is a fragmentary plan view showing the relationship of the gauging carriage and associated mechanism to the remainder of the feed table, this figure being substantially a plan view of the structure shown in FIG. 7;

FIG. 12 is an end view of the feed table taken substantially along line 12—12 of FIG. 15 with certain parts omitted in the interest of clarity and showing the organization of the feed carriage relative to the remainder of the feed table;

FIG. 13 is a view taken substantially along line 13—13 of FIG. 12 with the feed carriage omitted and showing the resilient support for raising or lowering the end of the feed table adjacent the shear;

FIG. 14 is a view taken substantially along line 14—14 of FIG. 15 and showing, partially in cross section, the details of how the pusher rod is mounted on the feed carriage;

FIG. 15 is an elevational view partially in cross section showing the feed carriage in fully retracted position on the feed table;

FIG. 16 is a plan view of the feed carriage on the feed table, this view being a portion of the structure shown in FIG. 15;

FIG. 17 is a schematic view of the limit switches associated with the cams which are driven in timed relationship with the shear ram which carries the movable knife of the shear;

FIG. 18 is a schematic view showing the location of various limit switches on the feed table and portions of the hydraulic circuit including pressure switches associated with the feed table;

FIG. 19 is a schematic view of the feed table and shear and showing the location of various limit switches on the feed table and the hydraulic circuit associated with the feed table, FIG. 19 being a continuation of FIG. 18;

FIG. 20 is a schematic view of the unscrambler showing the location of various limit switches thereon and the hydraulic circuit associated therewith, FIG. 20 being a continuation of FIG. 19;

FIG. 21 is a schematic diagram of the hydraulic and pneumatic control circuits for the hold-down mechanism of the shear;

FIG. 22 is a side elevational view of a modified type of pusher bar which can be associated with the feed carriage for pushing relatively thin rods which are susceptible to bending;

FIG. 23 is a view taken substantially along line 23—23 of FIG. 22;

FIG. 24 is a side elevational view, with portions broken away in the interest of clarity, of a pressure block construction mounted on the shear for frictionally engaging a bar which is being fed to the shear and for permitting longitudinal movement of the bar only when it is actually being pushed by the feed carriage;

FIG. 25 is a fragmentary end elevational view of the pressure block of FIG. 24;

FIG. 26 is an elevational view of the front frame of the shear and schematically showing the location of various limit switches and cams thereon;

FIG. 26A is a side elevational view of the shear shown in FIG. 26;

FIG. 27 is a plan view of a modified construction for the bundle table of the unscrambler which positively prevents more than a single bar from being transferred from successive notches therein;

FIG. 27A is a cross sectional view taken along line 27A—27A of FIG. 27;

FIG. 27B is a cross sectional view showing the manner in which different sized blocks may be mounted on the bundle table, this figure being taken along line 27B—27B of FIG. 27;

FIG. 27C is a detailed view of the manner in which the adjusting blocks are mounted on the unscrambler, this view being taken along line 27C—27C of FIG. 27B;

FIG. 28 is a schematic line wiring diagram of a portion of the electric circuit for the unscrambler, feed table, and shear;

FIG. 31 is a fragmentary view of the hold-down mechanism for the shear;

FIG. 32 is a side elevational view partially in cross section of a cam plate arrangement associated with the yoke on the feed carriage for guiding a bar having a camber therein into engagement with the pusher probe of the feed carriage; and FIG. 33 is a front elevational view of the cam plate shown in FIG. 32 mounted on the yoke of the feed carriage.

Figure 29:
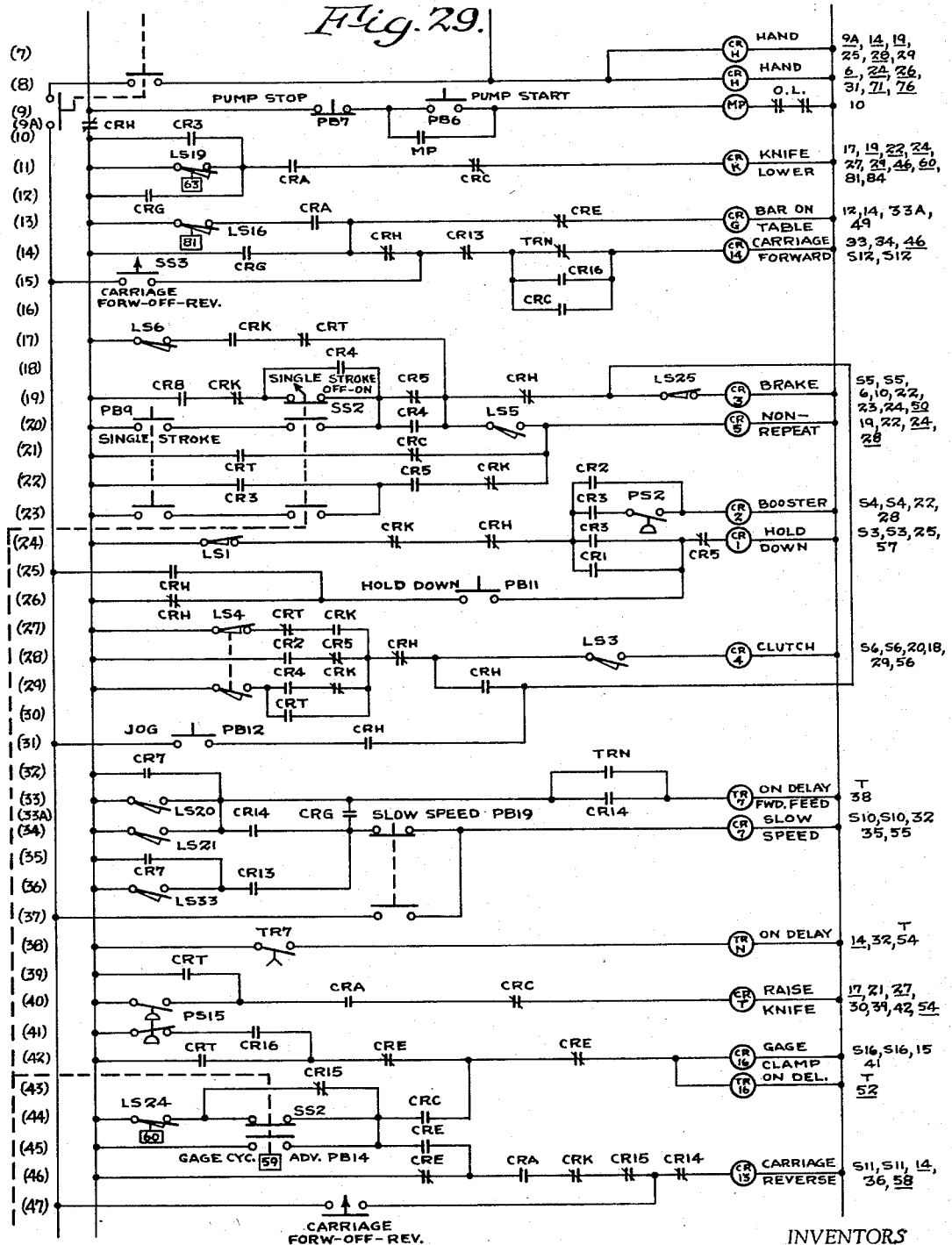
FIG. 29 is a continuation of FIG. 28.

In FIGS. 1, 2, 3, and 4 the general organization of the unscrambler 10, feed table 11 and shear 12 is shown. Broadly the unscrambler 10 receives a bundle of bars or rods which are deposited thereon. The unscrambler separates this bundle and aligns the rods so that they are located in adjacent relationship with their longitudinal axes parallel. Individual rods are thereafter deposited on the feed table 11 which feeds each individual rod to the billet shear 12 which in turn cuts the rods into accurately gauged predetermined lengths.

More specifically, the unscrambler 10 includes a pair of vertically oriented frame members 13 (FIGS. 1 and 5) which comprise a portion of the frame of the unscrambler. Each of the frame members 13 includes an upwardly extending rear portion 14, an upwardly inclined central portion 15 extending from rear portion 14, and a storage rack portion 16 on the opposite end of central portion 15 from upwardly extending portion 14, storage rack portion 16 including a downwardly inclined upper surface 17 upon which rods 18 are adapted to be ultimately oriented in juxtaposed relationship with their longitudinal axes parallel as shown in FIG. 5. Extending downwardly from the central portion 15 of each frame member 13 is a base 19 having flanges 20 suitably secured, as by welding, to opposite sides thereof at spaced positions on said base 19. The flange members have suitable apertures therein (not numbered) for receiving bolts (not shown) which secure said frame members 13 to the floor of a shop.

The adjacent frame members 13 have T members 21 rigidly secured thereto as by welding. More specifically, the opposite ends of the stems 22 (FIG. 5) are secured to the central portion 15 of upright frame members 13 and the lower sides of the upper portions 23 of T members 21 rest on the upper inclined surface 24 of frame members 13 and may also be suitably secured to said upper surfaces by welding or the like. It can readily be seen from FIG. 5 that the upper surfaces 23 of T members 21 are bent downwardly as at 24 so that the suitable spacing of T members 21 along the inclined surface 24 provides a series of equally spaced notches 25 extending upwardly along inclined surface 24. Notches 25 are for the purpose of receiving bars 18 during the process of their being separated from the bundle of bars 26 which is received on the bundle table as shown in FIG. 5 between upwardly extending frame portion 14 and the lower T shaped members 21, as shown in FIG. 5. It will readily be appreciated that since the T shaped members 21 follow the incline of surface 24 of frame members 13, once the bundle has been deposited it will tend to gravitate toward the above-described location and this bundle will remain in this location until such time as it is conveyed therefrom by the operation of the unscrambler as described in detail hereafter.

The unscrambler 10 also includes outer frame members 27 (FIGS. 1 and 6) which are of the same general configuration as frame members 13 described above. Each of the frame members 27 include an upwardly extending end portion 28, an inclined portion 29 extending upwardly from the lower part of portion 28, and a rack portion 30 having a downwardly inclined upper surface 31. Furthermore each of frame members 27 has a base portion 32 having flanges 33 suitably secured, as by welding, to opposite sides thereof for securing each of said frame members 27 to the floor of a shop by having bolts (not shown) extending through apertures (not numbered) in flanges 33.

A bar 34 extends through aligned apertures in storage rack portions 16 and 30 of frame members 13 and 27, respectively, and a tube 35 extends through aligned apertures in bases 19 and 32 of frame members 13 and 27, respectively, to maintain said frame members in substantial alignment so that downwardly inclined surfaces 17 and 31 of the storage rack portions of the frame members 13 are in alignment and so that downwardly sloping surfaces 36 and 37 of upwardly extending portions 14 and 28, respectively, are in alignment. Furthermore frame members 27 possess notches 38 in upwardly inclined surfaces 39 thereof, said upwardly inclined surfaces 39 being generally in alignment with upwardly inclined surfaces 24 of frame members 13 and notches 38 being in alignment with notches 25 formed between adjacent T shaped members 21, as described above.

The unscrambler 10 also includes spaced movable bundle carriers 40 (FIGS. 1 and 6). Each of the bundle carriers 40 consist of spaced parallel sub-frame members 41 having T shaped members 42 extending therebetween and having the opposite ends of stems 43 thereof suitably secured to said sub-frame members 41 as by welding. T shaped members 42 have upper surfaces 43 with downwardly inclined ends 44. Adjacent downwardly inclined ends 41 form notches 45 along the length of bundle carriers 40, said notches 45 being spaced the same distance from each other as are notches 25 of the bundle table.

Bundle carriers 40 are programmed to traverse the movement path 46 of FIG. 20 and in so doing pick up a bar from the pile 26 within a pair of aligned lowermost notches 45 in each of bundle carriers 40 and carry such bar to the next higher notch 25 in the bundle table wherein said bar is deposited. More specifically, assuming that the proper controls have been energized, the unscrambler operates automatically to separate bundle 26 into a series of aligned rods 18 (FIG. 5) and store them on the downwardly inclined surfaces 17 and 31 of the storage rack consisting of portions 16 and 30 of frame members 13 and 27. While rods 18 are depicted as being of circular cross section, it will be appreciated that the instant unscrambler will function equally well with bars of other geometric cross section, such as square or polygonal. It is to be especially noted that regardless of the condition of the shear 12 or of the feed table 11, the unscrambler 10 will perform the foregoing function when the unscrambler is energized.

In order to energize the unscrambler, it is merely necessary to close the disconnect switch 47 (FIG. 28) to thereby complete a circuit between a suitable source of current at lines L1, L2 and L3 to lines L1', L2', and L3' through suitable fuses (not numbered). This will cause energization of the solenoid circuit 48 through the transformer primary 49 coupled across lines L1' and L2' and transformer secondary 50 leading to the solenoid circuit 48 through leads 51 and 52 and fuses 53 and 54. Furthermore the unscrambler is hydraulically operated in addition to being electrically controlled. Therefore in order to obtain a suitable source of hydraulic pressure, push button PB–6 is depressed to complete a circuit in line (9) of FIG. 29 and thereby energize starter coil MP therein.

B. As a result of energizing starter coil MP, the following sequence of events occur:

(1) The contacts in line (10) associated with coil MP to seal around BP–6 in line (9) and hold coil MP energized. This is essentially a holding circuit.

(2) The contacts in lines 2T1 and 2T2 and 2T3 leading to pump motor 55 from lines L1', L2' and L3' close to supply current to motor 55. Motor 55 is in turn mechanically coupled to pump 56 (FIG. 20) and thereby causes the latter to pressurize the hydraulic system.

Figure 30:
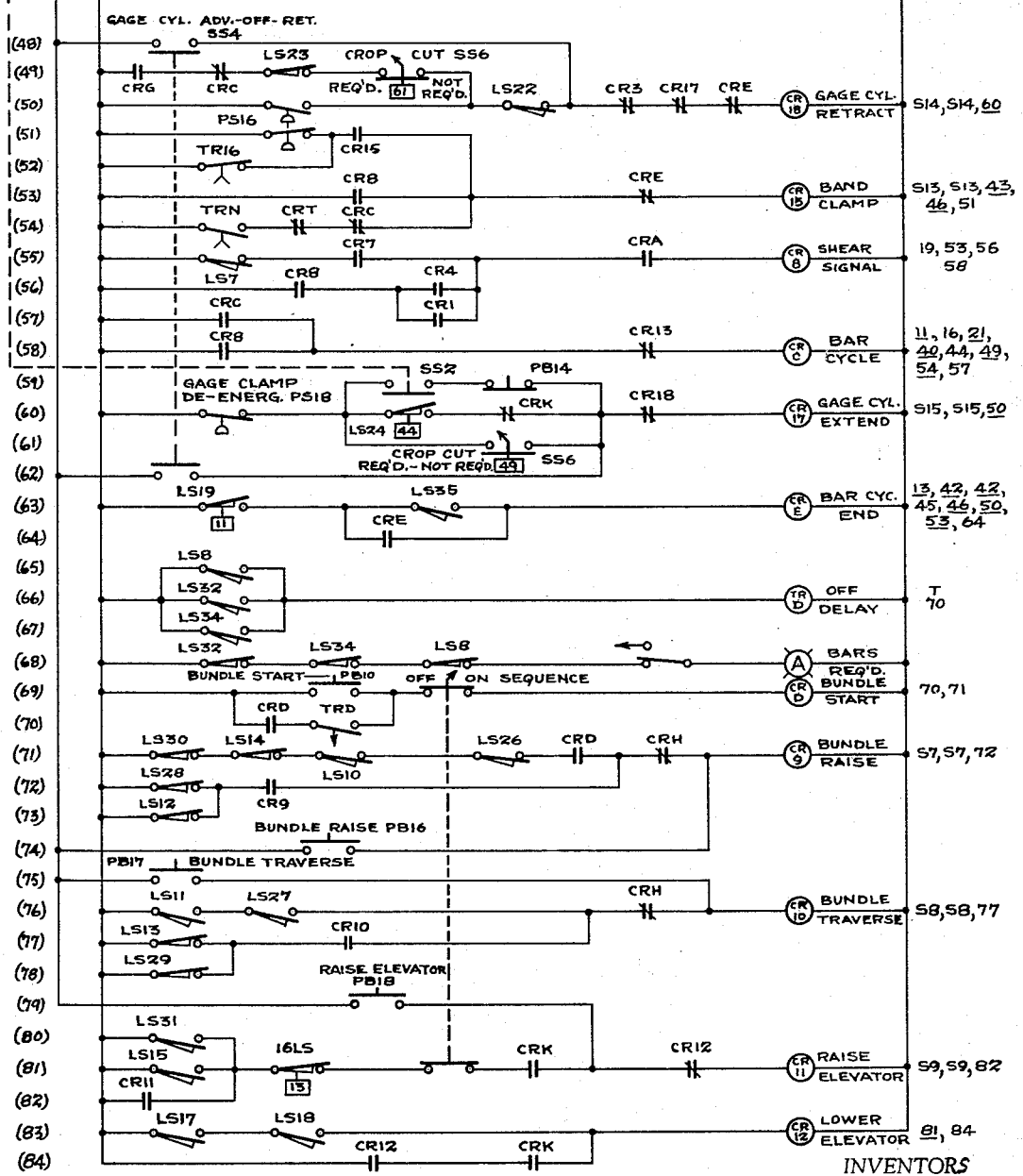
FIG. 30 is a continuation of FIG. 29.

After the electrical circuits have been established in the foregoing manner and after the pump motor 55 has been started, it is merely necessary to depress switch PB–10 in line (69), FIG. 30, to cause the unscrambler to commence operation. More specifically after PB–10 has been depressed, a circuit is completed to bundle start relay CRD in line (69).

L. After relay CRD is energized the contacts controlled thereby will function in the following manner:

(1) Contacts controlled by relay CRD in line (70) close to seal around PB–10. It is to be noted that timed contacts TRD in line (70) have been previously closed as will be described hereafter.
  (2) Contacts associated with relay CRD in line (71) will close to energize the bundle carrier raise relay CR–9.

M. After bundle carrier raise relay CR–9 has become energized the following will occur:

(1) Contacts CR–9 in line S7 (FIG. 28) will close to energize solenoid E (FIG. 20) and thereby raise both bundle carriers 40 (FIG. 1).
  (2) Furthermore the CR–9 contacts in line (72) (FIG. 30) will close to seal around limit switches LS30, LS14, LS26 and LS10 in line (71).

After solenoid E (FIG. 20) is energized by the above described action of the circuit, valve VE controlled thereby will move from the position shown in FIG. 20 wherein it effects communication between conduits 57 and 58 to a position wherein it effects communication between conduits 57 and 59 and causes conduit 58 to be in communication with sump S. Therefore pressurized hydraulic fluid provided by pump 56 may communicate with raise lower cylinder R through conduits 60, 61, 57 and 59, the pressurized fluid provided by pump 56 being applied to the portion of hydraulic cylinder R to the left of piston 62 therein. Furthermore because of the action of solenoid E in controlling valve VE, the portion of raise lower cylinder R to the right of piston 62 is in communication with sump S through conduit 58. The pressurizing of the portion of cylinder R to the left of piston 62 will cause the latter to move to the right in FIG. 20 and cause shaft 63 affixed thereto to pivot bellcrank lever 64 in a counterclockwise direction about pivot 65, the latter being mounted between each of frame members 13 and 27 (FIG. 1). In other words, while FIG. 20 schematically shows only cylinder R, there are actually two cylinders R shown in FIG. 1, each of which is associated with a bundle carrier 40. The lower end of bellcrank lever 64 is connected to the lower end of bellcrank lever 66 (FIG. 20) by means of connecting rod 67. Bellcrank lever 66 in turn is pivotally mounted by shaft 68 relative to frame members 13 and 27 on opposite sides of bundle carrier 40. As noted above, there is a bellcrank lever 66 associated with each of bundle carriers 40. The counterclockwise pivotal movement of bellcrank levers 64 and 66 in the foregoing manner causes rollers 69 and 70 which are in engagement with the undersurface 71 of bundle carriers 40 to raise the latter as said bellcrank levers 64 and 66 move from the position of FIG. 5 to the position of FIG. 6 and thereby cause the bundle carriers 40 to move from the position of FIG. 5 to the position of FIG. 6. This causes notches 45 in bundle carriers 40 to move upwardly through notches 25 of the bundle table while they remain in alignment therewith. As can be seen from FIG. 20, during this movement the bundle carriers traverse portion 74 of movement path 46. Thus any bars which are in notches 25 of the bundle table will be picked up by the notches 45 in the bundle carriers 40. It is to be noted at this point that cylinders R have the ends thereof which are remote from shaft 63 pivotally mounted on frame member 72 (FIG. 6) of the unscrambler as by trunnions 73.

The bundle carriers will raise the bars vertically in the above-described manner along path 74 until limit switches LS11 and LS27 (line (76)) are closed. Limit switch LS11 is associated with bundle carrier 40 on the left side of the unscrambler and limit switch 27 is associated with the bundle carrier on the right side of the unscrambler. It will be appreciated that both limit switches must be closed in order for the subsequent movement of the bundle carriers to be effected. This insures that both bundle carriers 40 will complete each movement prior to starting the next or additional movement. Each of the limit switches LS11 and LS27 are actuated by a cam 75 (FIG. 20) which is mounted on a suitable portion of the bundle carriers 40 and preferably on the subframe members 41. The limit switches in turn are preferably mounted on either upright frame members 13 or 27. These limit switches LS11 and LS27 in turn, when closed, will energize control relay CR–10 (line (76)) to thereby cause the bundle carriers to traverse from left to right in FIG. 20.

N. After control relay CR–10 is energized, the following will occur:

(1) The contacts of relay CR–10 in line S8 will close to energize solenoid F (FIG. 20).
  (2) The contacts of relay CR–10 in line (77) will close to seal around limit switches LS11 and LS27.

After solenoid F (FIG. 20) has been energized in accordance with item N–1 above, it will cause valve VF controlled thereby to shift from a position wherein it effects communication between line (61) leading from pump 56 and the left side of traverse cylinder T through conduits 76 and 77 to a position wherein it effects communication between conduits 76 and conduit 78 leading to the portion of traverse cylinder T to the right of piston 79. After valve VF has been shifted in the above-described manner, it will cause the portion of cylinder T to the left of piston 79 to be in communication with sump S through conduit 77. The foregoing action will cause piston 79 to move to the left in FIG. 20 and thereby cause shaft 80, which extends between piston 79 and bundle carriers 40, to also move to the left. It is noted that a traverse cylinder T is associated with each of bundle carriers 40 (FIG. 1). One end of each cylinder T is pivotally mounted on frame member 81 by means of trunnion 82. Shaft 80 in turn is pivotally mounted on shaft 83 which extends between subframe members 41 of bundle carrier 40.

After traverse cylinder T is energized in the foregoing manner, bundle carriers 40 will move upwardly in the direction of inclination of the bundle table until such time as cam 75 engages and actuates limit switches LS12 and LS28 in lines (73) and (72), respectively. This direction of movement is depicted by portion 84 of movement path 46 in FIG. 20. Thus a bar which has been taken from notches 25 of the bundle table by notches 45 in bundle carriers 40 during movement of the latter through portion 74 of movement path 46 and elevated above the bundle table have now been moved upwardly along the inclination of the bundle table. Limit switch LS12 is associated with one of the bundle carriers 40 and limit switch LS28 is associated with the other of the bundle carriers 40. It is to be noted from lines (72) and (73) (FIG. 30) that bundle raise relay CR–9 will continue to operate until such time as both limit switches LS12 and LS28 have been contacted. This action tends to enhance synchronism of movement of both bundle carriers 40 by preventing further movement of said bundle carriers until a condition has been reached wherein LS12 and LS28 are actuated. After both LS12 and LS28 in lines (73) and (72), respectively, are actuated, relay coil CR–9 in line (71), which controls the bundle raising function, will be de-energized.

O. After relay coil CR–9 has become de-energized the following will occur:

(1) The contacts associated with relay coil CR–9 in line S7 will open to de-energize solenoid E and thereby cause both bundle carriers 40 to lower to their lowermost position.
  (2) The contacts associated with relay CR–9 in line (72) open without effect because limit switches LS12 and LS28 which are in series with these contacts are already open.

After solenoid E has been deenergized in the above described manner, it returns valve VE to the condition shown in FIG. 20 wherein pump 56 is in communication with the portion of raised cylinder R to the right of piston 62 and the portion of cylinder R to the left of piston 62 is in communication with sump S. This will cause shaft 63 driven by piston 62 to move to the left in FIG. 20 and thereby cause bellcrank levers 64 and 66 to pivot in clockwise directions about shafts 65 and 68, respectively, on which they are mounted. The weight of bundle carriers 40 will cause them to move downwardly along portion 85 of movement path 46 (FIG. 20). It is to be especially noted that this downward movement along path 85 occurs when the slots 45 of the bundle carriers 40 and slots 25 of the bundle table are in alignment so that a bar which was previously held in notches 45 comes to rest in a notch 25 of the bundle table as said bundle carirers 40 recede below the level of the upper surface of the bundle table. It can thus be seen how a bar is taken from a lower position on the bundle table and carried to a higher notch 25 in the bundle table.

Upon completion of the downward movement of bundle carriers 40 along path 85, limit switches LS13 and LS29 in lines (77) and (78), respectively, are contacted by cam 75. This will cause relay coil CR–10 in line (76) which controls the bundle traversing function to become deenergized. It will be noted that relay coil CR–10 cannot become deenergized until both limit switches LS13 and LS29 have been contacted. This is for the purpose of preventing one bundle carrier from starting a new movement until after the other bundle carrier is also capable of starting its new movement.

P. After relay coil CR–10 has become deenergized, the following will occur:
(1) The contacts in line S8 associated with relay coil CR–10 will open to deenergize solenoid F (FIG. 20) to allow the bundle carriers 40 to retract to their starting position.
(2) The contacts in line (77) associated with relay coil CR–10 open without effect since limit switches LS13 and LS29 are already open.

Under item P–1 above it was noted that solenoid F is deenergized. This will cause it to return valve VF to the position shown in FIG. 20 wherein the latter effects communication between pump 56 and the portion of traverse cylinder T to the left of piston 79 through conduits 61, 76, and 77. Furthermore valve VF now causes the portion of traverse cylinder T to the right of piston 79 to be in communication with sump S through conduit 78. This will cause piston 79 to move to the right in FIG. 20 and cause bundle carriers 40 to traverse portion 86 of movement path 46. This action is continued until each of the cams 75 on each of bundle carriers 40 engage limit switches LS26 and LS10 associated with said bundle carriers. These limit switches are engaged when the notches 25 of the bundle table are in alignment with notches 45 of the bundle carriers. After limit switches LS26 and LS10 are engaged, the bundle raise relay CR–9 in line (71) is again actuated to cause the bundle carriers 40 to traverse path 74 because of the various electrical and hydraulic actions described in detail above.

The foregoing cycle of operation of the bundle carriers 40 is continually repeated and in this manner bars are elevated step by step from lower notches 25 on the bundle table to upper notches 25 thereof. It is to be especially noted from FIG. 5 that bars 18 which lie in notches 25 occupy a position so that their upper surfaces are substantially flush with the upper surfaces 23 of T members 21. This relationship positively prevents more than one bar from being elevated during each single cycle of operation of bundle carriers 40. More specifically even assuming that the bundle carriers 40 should pick up two bars in any of notches 45, after these bars are deposited in notches 25, the bars which are not firmly seated within such notches will roll back to pile 26 (FIG. 5). The fact that only a single bar is thus transmitted to upper inclined surfaces 17 and 31 of the storage rack obviates the possibility that a plurality of such bars will be dumped at any one time on such storage rack, thereby obviating the attendant possibility that the bars will roll over the upstanding abutments 87 and 88 at the end of storage rack portions 16 and 30, respectively. Continued movement of the movable racks in the above described manner continues until a plurality of bars 18 are aligned in parallelism in the storage rack as indicated in FIG. 5.

It is to be noted that a time delay relay TRD, mentioned in L–1 above, exists in line (66). This time delay relay is in series with each of limit switches LS8, LS32 and LS34, said limit switches being parallel with each other. Thus time delay relay TRD is energized whenever any of the above-mentioned limit switches are closed. As can be seen from FIG. 20, limit switch LS8 is located at the portion of the bundle table on which the pile of bars 26 rests. Therefore assuming certain other conditions have been met, the closing of limit switch LS8 will energize time delay relay TRD to cause the contacts of said time delay relay TRD in line (70) to be closed to thereby maintain the bundle start relay CRD in line (69) energized after bundle start push button PB–10 has been closed. The time delay relay TRD is essentially a pneumatic mechanism with a vented spring biased cylinder which causes relay TRD to remain energized for approximately five cycles of operation of bundle carriers 40 once any of limit switches LS8, LS32 or LS34 have been energized. In the foregoing respect it is to be further noted that limit switch LS32 is located in one of the notches 25 of the bundle table approximately half way between the lower and higher ends thereof. Limit switch LS34 is located in one of the notches 25 of the bundle table proximate the top thereof. Thus it can be seen that when a bar is in any of the positions corresponding to the locations of LS8, LS32 or LS34 the bundle carriers will produce the above-described cycle of operation. It is to be noted that there are 8 notches 25 on the bundle table. Therefore limit switches LS8, LS32 and LS34 are spaced less than 5 notches apart. Thus assuming that any of the limit switches LS32, LS34 or LS8 have been actuated, the bundle carriers will provide sufficient cycles of operation to elevate a bar from the lowermost position on the bundle table until said bar is deposited on the storage rack portion of the bundle table. However once LS8, LS32 and LS34 (FIGS. 20 and 30) are all open, there is a reasonable indication that the bundle table is empty and 5 cycles after limit switches LS8, LS32 and LS34 have been deactuated time delay relay TRD in line (66) will open to open the contacts thereof in line (70) to thereby deactuate bundle start CRD in line (70) and cause the inscrambler to cease operation.

It is also to be noted that limit switches LS8, LS32 and LS34 are also in series with each other and in series with lamp A in line (68), lamp A being located on a suitable control panel, not shown. The purpose of this portion of the circuit is to notify an operator that a bar is missing from one of the locations at which LS8, LS32 and LS34 are located so that the operator may take the necessary steps toward loading the bundle table with another pile of bars 26. It will readily be appreciated that lamp A lights up long before either the bundle table is free of bars and before the storage rack portions of the bundle table are empty so that sufficient warning is thus provided to give ample time for loading the bundle table. It will be appreciated that a relatively long warning is required when it is considered that the bundle table may accommodate as much as 7½ tons of bars and must therefore be loaded by a crane, fork lift, or other similar mechanism.

The above described sequence of operation of the unscrambler is continued until sufficient bars 18 have been deposited on the storage rack portion thereof that limit switches LS14 and LS30 in line (71) are actuated. As can be seen from FIG. 20, LS14 and LS30 are located about half way down the storage rack. This will cause the circuit to raise relay CR-9 (line (71)) to be open to thereby prevent the bundle carriers from continued movement which would result in additional depositing of bars on the storage rack. As bars are taken off of the storage rack, in a manner to be fully described hereafter, and limit switches LS14 and LS30 are again deactuated, assuming that other conditions have been met, the bundle relay CR-9 will again be energized to cause the bundle carriers to again commence operation.

Since the other aspects of operation of the unscrambler are so intertwined with the operation of feed table 11 and billet shear 12, it is necessary at this point to describe the various aspects of the feed table 11 and billet shear 12.

The feed table 11 includes a frame having spaced longitudinally extending boxlike mebers 89 (FIG. 12) connected to each other by channel shaped frame members 90 extending therebetween and welded thereto at longitudinally spaced locations (FIG. 1). An end plate 91 is welded to the ends of boxlike members 89 at the front end of table 11 and a plate 92 is welded to said boxlike members 89 at the rear of the table. In addition a frame member 93 (FIG. 10) is welded to opposite inner surfaces of boxlike members 89 and frame members 94 and 95 extend between opposite inner surfaces of boxlike members 89 and are welded thereto. All of the foregoing frame members extending between boxlike members 89 provide an extremely rigid table and certain of these members perform additional functions, as will be described in detail hereafter.

The above-described frame of feed table 11 is mounted for pivotal movement about shaft 96 (FIG. 15) which extends between brackets 97 extending downwardly from the frame of the table and brackets 98 mounted on the floor. It can readily be seen that by pivoting feed table 11 about shaft 96, the front end thereof at which plate 91 is located may be adjusted to cause this end of the feed table to align itself with the knives of the billet shear. In this respect it is to be noted that knives for different sizes of stock have different sized semicircular cutouts therein, each of said cutouts having a radius corresponding to the radius of the stock. (See FIG. 26.) Therefore the front end of the feed table must be lower for greater diameter stock than for stocks of less diameter because the lowermost portion of such a cutout is further from the top of the knife than a smaller cutout. In order to raise and lower the front end of table 11, an hydraulic cylinder 99 is provided, hydraulic cylinder 99 having the end portion 100 thereof secured to bracket 101 which in turn is rigidly secured to frame member 102, the opposite ends of which are welded to the inner surfaces of boxlike members 89. Hydraulic cylinder 99 has a piston 103 (FIG. 18) therein, said piston being attached to shaft 104, the lower end of which carries plate 105 (FIG. 13) which rests on springs 106 within housing 107 which is mounted on the floor. Springs 106 are of extremely heavy construction. When it is desired to raise the front end of table 11 it is merely necessary to actuate manual valve 108 (FIG. 18) to cause pressurized hydraulic fluid to be applied from pump 56 (FIG. 20) to the portion of cylinder 99 above piston 103 through conduit 109, check valve 110, conduit 111 and conduit 112. When the manual valve 108 is actuated in the foregoing manner, the portion of cylinder 99 below piston 103 is in communication with sump S through conduit 113, valve 108 and conduit 114. The admission of high pressure hydraulic fluid to the portion of cylinder 99 above piston 103 will cause cylinder 99 to rise because piston 103 remains stationary. The rising of cylinder 99 will cause the front end of the feed table 11 to raise also because cylinder 99 is affixed to bracket 101 as described above. When the front end of the feed table has reached its desired height, manual valve 108 is released, and since it is spring-loaded, it returns to a neutral position wherein it terminates communication between both ends of cylinder 99 and the high pressure line and the sump. Therefore the hydraulic fluid in both chambers of cylinder 99 on opposite sides of piston 103 will be trapped and act as a liquid lock. In the event it is desired to lower the front end of feed table 11, it is merely necessary to actuate manual valve 108 to cause high pressure hydraulic fluid from conduit 112 to communicate with the portion of cylinder 99 below piston 103, valve 108 simultaneously causing the portion of cylinder 99 above piston 103 to communicate with the sump through conduits 115 and 114. This will cause cylinder 99 to move downwardly relative to piston 103 which for all practical purposes is stationary. When valve 108 is released, the feed table will remain in the position to which it was moved because of an hydraulic lock, as mentioned above. The above-described action of piston and cylinder 103–99 causes the feed table to pivot about shaft 96 (FIG. 15).

In the event that the feed table 11 is not perfectly horizontal, as a result of adjusting the elevation thereof a bar being fed to the shear will not lie squarely on the stationary support of the shear and when the shear hold-down mechanism, described hereafter, engages such bar it will tend to force it downwardly into engagement with the bed of said shear. If the front end of the feed table were rigidly mounted, the foregoing action would cause the end of the bar remote from the shear to kick up from the feed table and also cause the portion of the bar adjacent the shear to bend. In addition, bars being fed to the shear many times have a relatively large camber therein which prevents them from seating squarely on the bed of the shear. If the front end of the feed table were rigidly mounted, the action of the shear hold-down mechanism would tend to bend the bar. The heavy springs 106 (FIG. 13) in housing 107 will obviate the possibility of obtaining the foregoing undesirable results because once the bar, which is sheared under the foregoing conditions, is subjected to an extremely great force, such as is encountered during a shearing action, springs 106 will yield to permit the front end of the feed table 11 to move to thereby obviate the possibility of bending a bar.

A pair of metal plates 116 (FIG. 12) are provided, each of these plates being welded to an upper surface of boxlike frame member 89. Plates 116 lie in parallel relationship with each other and provide the ways of the feed table on which feed carriage 117 reciprocates. Feed carriage 117 includes a housing portion 118 having a pair of upper rollers 119 journaled on opposite sides thereof (FIGS. 12 and 15). Rollers 119 rest on the upper surface of plates 116. Also journaled on opposite sides of housing 118 are lower rollers 120 which engage the undersurface of plates 116 (FIG. 12). In addition, rollers 121 (FIG. 16) are journaled on the carriage (FIG. 16) with the axes of these rollers extending in a direction which is generally perpendicular to the axes of rollers 119 and 120. The edges of rollers 121 engage the inner edges 122 (FIG. 12) of plates 116. The combined action of rollers 119, 120 and 121 guide carriage 117 during its movement along the path defined by plates 116. Carriage 117 also includes a pusher bar or probe 123 which engages the end of rod 18′ which is fed to shear 12. During the feeding of rod 18′, bar 123 occupies a fixed relationship relative to carriage 117. However by the use of suitable mechanism to be described in detail hereafter, bar or probe 123 projects forwardly for the purpose of ejecting a remnant from shear 12 during the terminal portion of the feeding operation.

Carriage 117 is caused to move along plates 116 of feed table 11 in a unique manner. More specifically, spaced pulleys 124 are mounted on shaft 125 (FIG. 12) which in turn is journaled in bearing pedestals 126 mounted on cross brace 127, the opposite ends of which are suitably welded to the inside surfaces of box-like members 89. Spaced pulleys 124 have a central portion which is adapted to receive metal bands 128, said bands being maintained in engagement with said central portions because of the existence of flanges 129 at the opposite sides of said pulleys 124. As can be seen from FIG. 15, pulleys 124 are located proximate the portion of feed table 11 which is adjacent to shear 12. Located proximate the rear end of feed table 11 are a second pair of spaced pulleys 130 (FIG. 19) mounted on shaft 131 which is journaled for rotation in bearing pedestals 132 mounted on plate 133 (FIG. 15), the opposite ends of which are suitably welded to the inner sides of box-like members 89. Pulleys 130 are also encircled by metal bands 128. Pulleys 130 also have flanges 134 thereon for maintaining bands 128 on the central portions of said pulleys. As can be seen from FIGS. 1, 2, 10, and 12, one band 128 encircles a pulley 124 and a pulley 130 on one side of feed table 11, and the other band 128 encircles a pulley 124 and a pulley 130 on the opposite side of the feed table 11. First ends of each of bands 128 are secured to the front end of carriage 117 as by pressure blocks 134 (FIG. 15) which clamp the ends of bands 128 between them and the underside of the carriage when screws 135 are tightened. The opposite ends of bands 128 are mounted on retaining blocks 136 as by screws 137. Retaining blocks 136 have threaded portions 138 (FIG. 15) which extend through suitable apertures (not numbered) in plate 139 mounted on the rear of carriage 117. Nuts 140 are adapted to be threaded onto threaded portions 138 to both adjust the tension of bands 128 and also secure the ends of bands 128 to the rear of the carriage 117. It will readily be appreciated that, because of the foregoing mode of attachment of bands 128 to carriage 117 and because of the relationship of said bands 128 to pulleys 124 and 130, whenever said pulleys are driven, carriage 117 will be caused to move longitudinally along feed table 11 in a manner which will be explained in greater detail hereafter.

Bands 128 are relatively thin and are preferably of a thickness of .020". Preferably these bands consist of cold rolled tempered polished blue spring steel and because of their relatively small thickness can encircle pulleys such as 124 and 130 having a relatively small diameter, that is, on the order of 14". Considering the tensile strength of bands of the foregoing dimensions the carriage 117 can be pulled by bands 128 with a relatively high force. The advantage of using bands instead of cables is that the pulleys can be of a relatively small diameter because the bands will encircle such pulleys without being stressed beyond their normal bending limit. In other words, if cables were used the pulleys would have to be of a much larger diameter and thus make the feed table higher than if bands were used. Furthermore, the bands permit the feed carriage 117 to be advanced in accurately gauged increments as described in detail hereafter.

The bands 128 are driven by hydraulic motor 141 which is coupled to gear reducer 142, which in turn drives sprocket 143 (FIG. 15) having a chain 144 encircling it and sprocket 145 fixedly mounted on shaft 131 which also mounts pulleys 130. Pulleys 124 are idler pulleys. It can readily be seen therefore that whenever hydraulic motor 141 is energized, pulleys 130 will be driven and carriage 117 will be caused to move.

Also mounted on feed table 11 is a gauging carriage 146 which functions to advance bands 128 in accurately gauged increments to thereby cause carriage 117 to feed bar 18' to shear 12 in accurately gauged increments. The construction which is utilized to mount gauging carriage 146 consists of parallel rods 147 (FIG. 11) having first ends rigidly secured to cross brace 93 and second ends rigidly secured to cross brace 94. Carriage 146 consists of a housing having side plates 148 which are welded or otherwise rigidly secured to front end plate 149 and rear end plate 150. Rods 147 extend through suitable apertures in end plates 149 and 150, said apertures (not numbered) being of a sufficient size to permit clearance between them and rods 147 without excessive play. Thus rods 147 in conjunction with said apertures guide carriage 146 back and forth longitudinally on feed table 11 in a manner to be fully described hereafter.

Gauging carriage 146 has a predetermined length of movement as determined by the spacing between surface 151 of cross brace or fixed abutment block 93 and surface 152 of movable abutment block 153. More specifically, the limit of movement of carriage 146 to the right in FIG. 11 is determined when end plate 150 abuts surface 152 of movable abutment block 153. The position of movable abutment block 153 can be adjusted by the use of adjusting wheel 154 mounted on shaft 156 which carries worm 155. Shaft 156 is journaled in bearings 157 and 158 mounted on cross brace 94 of the feed table. Worm 155 is in mesh with worm gear 159 (FIG. 7) which is mounted on shaft 160. Shaft 160 has one end thereof journaled in cross brace 93 and the other end thereof journaled in cross brace 94. As can be seen from FIGS. 7 and 9, shaft 160 extends through end plates 149 and 150 of carriage 146 but is not in engagement with said end plates. A suitable arrangement is provided for preventing shaft 160 from moving longitudinally relative to cross braces 93 and 94 and this consists of a reduced end portion 161 mounted within a reduced aperture (not numbered) within cross brace 93 so that the portion of shaft 160 adjacent reduced portion 161 provides a shoulder which is in abutting engagement with surface 151 of cross brace 93. A pair of nuts 162 are mounted on the threaded end portion of shaft 160. The foregoing arrangement permits shaft 160 to rotate without moving endwise relative to cross braces 93 and 94. Also suitable bearings are provided in cross brace 93 to absorb the radial and endwise thrust of shaft 160.

Whenever it is desired to adjust the position of movable abutment block 153, it is merely necessary to rotate handle 154 to thereby cause shaft 160 to rotate because of the worm gear connection noted above. Movable abutment block 153 is tapped to receive the threaded end portion 163 of shaft 160. Furthermore suitable apertures (not numbered) are provided in movable abutment block 153 to receive parallel shafts 147 with a small clearance to permit relative movement between movable abutment block 153 and said shafts 147. It can thus be seen that whenever shaft 160 is rotated in the above-described manner, movable abutment block 153 will be caused to move to either the right or left in FIG. 11, depending on the direction of rotation of handle 154, and the position to which movable abutment block 153 is moved determines the limit of movement to the right of gauging carriage 146.

For moving gauging carriage 146 to the right or to the left between its above-described limits of movement, a hydraulic gauging cylinder 164 is provided having one end thereof pivotally mounted on cross brace 95 by trunnion 165 and the shaft 164' thereof secured to rear end plate 150 of gauging carriage 146. The exact manner in which gauging carriage 146 operates to cause feed carriage 117 to advance in predetermined increments will be described at a suitable point hereafter.

The feed table 11 automatically receives rods 18 from the storage rack of the unscrambler 10, one at a time, and feeds such rods in accurately gauged increments to shear 12. In order to place the combined unscrambler, feed table, and shear in operation the following five selector switches, FIGS. 28–30, are set as follows:

Selector switch SS–1 which determines whether the feed table will be off, operates automatically, or advances the rod 18' only a single increment and then stops, is set to automatic. (See FIG. 28, line (31).)

Selector switch SS–2, which is either off or in a position to provide a single cycle of operation of the feed table and the shear, is set to off. (See FIG. 28, line (19).)

Selector switch SS–3 which controls whether the feed carriage 117 will move forward, reverse, or will operate automatically when set on off, is set to off. (See FIG. 29, lines (15) and (47).)

Selector switch SS–4 which either causes the gauging cylinder 164 to either advance or retract, or operate automatically when this selector switch is set on off, is set to off. (See FIG. 30, lines (48) and (62).)

Selector switch SS–5 which determines whether the sequence of operation of the various components of the combined unscrambler, feed table and shear will operate automatically, is set to an on position for obtaining automatic operation. (See FIG. 30, lines (69) and (81).)

After the above five selector switches have been set in the above-described manner, the operator follows the steps which were described above relative to the unscrambler for the purpose of energizing the electrical circuits and starting the hydraulic pump which provides hydraulic fluid under pressure for the operation of the various hydraulic components of the system. More specifically, as described above, the operator's first step in order to obtain automatic operation is to close the disconnect switch 47 to thereby provide electrical current to the electrical circuits shown in FIGS. 28, 29, and 30. Furthermore, push button PB–6 is actuated to start pump motor 55 as described above in paragraph B.

The gauging cylinder 164 is normally in the full forward or extended position actuating limit switch LS24 (FIG. 18) which is mounted on cross brace 93 of feed table 11. In other words gauging carriage 146 is normally in abutting relationship with cross brace 93. If it is not, the mere act of energizing the electrical and hydraulic circuits in the above-described manner after the closing of the above-mentioned five selector switches SS–1 through SS–5 inclusive, will cause relay CR17, line (60), to be energized, said relay controlling the extending of gauging cylinder 164 to the above-described position. The contacts of relay coil CR17 in line S15 will close to energize solenoid N (FIG. 18) and thereby cause it to move valve VMN from the position shown in FIG. 18 to a position wherein it permits communication between conduit 165, leading from high pressure conduit 112, and conduit 166 ultimately leading to the portion of cylinder 164 to the right of piston 167. At this point it is to be noted that conduit 166 is in communication with cylinder 164 through two paths. The first path is through conduits 257, normally open slow-down valve 252, conduit 256, and conduit 166'. The second path is through pressure compensated flow control valve 258 between conduits 166 and 166'. When valve 252 is open, flow to cylinder 164 will be through the path in which it is located. At this time the portion of gauging cylinder 164 to the left of piston 167, which is affixed to piston shaft 164', will be in communication with the sumps S through conduit 168 and valve VMN. The establishing of the foregoing hydraulic circuit will cause piston 167 to move to the left and cause gauging carriage 146 to move to the left also until front plate 149 thereof abuts face 151 of cross brace 93 (FIG. 7) and in so doing actuates limit switch LS24.

After gauging carriage 146 has been moved to the left in the foregoing manner as a result of the operation of the electrical and hydraulic circuits, the operator starts the shear motor by depressing push button PB–5, push button PB–5 having contacts in lines (3) and (5). The contacts in line (5) energize the motor forward coil MF in line (5) to thereby energize shear 12.

A. Coil MF causes the following sequence of operations.
(1) The contacts of coil MF in line (6) close to seal around push button PB–5 in line (5) and thereby hold coil MF energized.
(2) Normally closed contacts of coil MF in line (6) open and provide an electrical interlock to prevent motor reverse coil MR from being actuated which might cause the shear motor to operate in reverse.
(3) The MF contacts in lines 1T1, 1T2, and 1T3 (FIG. 28) associated with shear motor 169 close to admit current to said shear motor and thus the flywheel associated with said shear is brought up to speed.

After the foregoing sequence, push button PB–3, which is located in line (3), is actuated to set the electrical circuit up for automatic operation. The closing of the automatic start button PB–3 in line (3) energizes the automatic operation relay CRA which is also located in line (3).

C. As a result of the energization of automatic operation relay CRA, the various contacts associated therewith cause the following actions:
(1) The contacts of CRA in line (4) close to seal around push button PB–3 to thereby hold coil CRA in line (3) energized.
(2) The CRA contacts in line (11) close to energize the knife lower relay CRK in line (11). At this time it is assumed that the feed carriage 117 is at the rear of feed table 11 wherein limit switch LS19 (FIG. 19), which is located on the rear of feed table 11, is actuated. It is to be noted at this point that limit switch LS19 is located in lines (11) and (63). It will be appreciated that limit switch LS19 is actuated by a cam 173 on the side of the feed carriage 117, or LS19 may be located proximate the surface 170 (FIG. 15) of rear abutment 171 of the feed table. At this point it will be noted that a buffer pad 172 is located on the face of surface 170 to absorb the shock of carriage 117 as it engages rear abutment 171.
(3) The contacts of relay CRA in line (13) close without effect since limit switch LS16 which is located in line (13) is open awaiting the arrival of a bar onto the table 11 in a manner to be described hereafter. It is to be noted that limit switch LS16 can be closed only when there is a bar on feed table 11 in condition to be fed to shear 12.
(4) The CRA contacts in line (40) close without effect since pressure switch PS15 in line (40) is open at this time. At this point it is only necessary to know that pressure switch PS15 can be closed only when bands 128 are held against movement by structure to be described in detail hereafter.
(5) The CRA contacts in line (46) close and may energize CR13, the carriage reverse relay, on a momentary basis. However the normally closed CRK contacts in line (46) will open since the knife lowering relay CRK was energized in step 2 of paragraph C. This procedure causes the feed carriage 117 to automatically be moved to the rear of the table in the event that it has drifted from its rearmost position. The manner in which this is achieved will be described at an appropriate point hereafter.
(6) The CRA contacts in line (55) close without effect since limit switch LS7 in line (55) is open. At this point it is to be noted that limit switch LS7 is located on movable abutment block 153 of feed table 11 (see FIG. 18) and is tripped when gauging carriage 146 is in its fully retracted position.

The manner in which the feed table operates to provide the results enumerated above under Paragraph C–5 can be more fully understood when it is assumed that the feed carriage 117 is located away from the end of the feed table. Hence the contacts of limit switch LS19, line (11), will be open and the contacts of limit switch LS19 in line (63) will be closed. Therefore relay CRE, line (63), will not be energized because limit switch LS35, line (63), will be open at this time. Relay CRE is the bar cycle end relay and is energized when the terminal portion of bar 18' is being fed through the shear 12. In this respect it is to be noted that limit switch LS35 (FIG. 19) is mounted on the frame of feed table 11 and is actuated by cam 173 or a similar cam (not shown) on the side of feed carriage 117 when the latter is at its closest position to shear 12. The knife lower relay CRK in line (11) will not be energized since the contacts of limit switch LS19 in line (11) are open at this time, that is, when the feed carriage 117 is away from the end of the table. However the contacts of automatic operation relay CRA in line (46) will close to immediately energize carriage reverse relay CR–13 in line (46) to thereby cause the feed carriage 117 to move to the rear of the table in the following manner:

D. After carriage reverse relay CR–13 is energized the various contacts associated therewith cause the following actions:

(1) The CR–13 contacts in line S–11 (FIG. 28) close to energize solenoid J (FIG. 19) to thereby cause valve VKJ to shift from a position wherein it is closed to position wherein it causes hydraulic motor 141 to operate in reverse. In this respect it will be noted that a hydraulic circuit is established from conduit 109 leading from pump 56 to hydraulic motor 141 through conduit 174, normally open valve VH, conduit 175, valve VKJ and conduit 176. The exhaust from motor 141 will pass through conduit 177, valve VKJ, and into sump S. The establishing of the hydraulic circuit to hydraulic motor 141 in the foregoing manner will cause it to operate in reverse at high speed and thus rotate pulleys 130 in reverse at high speed to thereby cause the feed carriage 117 to approach the rear end of feed table 11 at high speed. It will be understood that the pulleys 130 are driven because of the above-described mechanical connections between them and hydraulic motor 141.

(2) The normally closed contacts in line (14) associated with relay CR–13 will open to provide an electrical interlock against the energization of relay CR–14 in line (14) being actuated to cause feed carriage 117 from moving forwardly, relay CR–14 being the relay which controls forward movement of carriage 117.

(3) The contacts in line (36) associated with relay CR–13 will close without effect since limit switch LS–33 in line (36) is open. In this respect it is to be noted that limit switch LS–33 is mounted on the bed of feed table 11 and is located in such a manner that limit switch LS–19 lies between it and the rearmost portion of feed table 11. In other words a feed carriage 117 moving to the right in FIG. 19 while approaching the end of feed table 11 must first contact limit switch LS–33 before it contacts limit switch LS–19. Limit switch LS–33 is actuated by cam 173 which is mounted on the side of feed carriage 117, said cam 173 being the same element which energizes LS–19 as noted above. At this point it is to be noted that the actuation of limit switch LS–33, as the feed carriage 117 moves toward the rear of the table, causes the carriage 117 to cease moving at high speed in reverse. The advantage of permitting carriage 117 to move at high speed in reverse as it approaches the rear end of feed table 11 is to minimize the time required to place feed table 11 in readiness to receive a bar which is to be subsequently fed to shear 12. In other words the less time which is consumed in causing the feed carriage 117 to move to the rear of the table, the greater will be the production of the machine because the time consumed in preparing feed table 11 for receiving a bar is greatly minimized. It is to be further noted that it is undesirable that the feed carriage engage rear abutment 171 (FIG. 15) while it is travelling at high speed as this would cause undesirable jarring of the feed table. It is the slow speed limit switch LS–33 which causes the hydraulic motor 141 to slow down carriage 117 prior to the time that it engages cushion 172 on rear abutment 171.

(4) The normally closed contacts of CR–13 in line (58) open without effect since bar cycle relay CRC has not been previously energized and because the CR–8 contacts in line (58) are open. The significance of these conditions will be fully appreciated hereafter.

Assuming that the feed carriage 117 has been located on the feed table to the left of both LS–33 and LS–19 (FIG. 19), in moving toward the rear of feed table 11 at high speed, that is, in moving to the right in FIG. 19, cam 173 on the side of feed carriage 117 will actuate limit switch LS–33. Since the contacts of carriage reverse relay CR–13 in line (36) were closed as set forth above in Paragraph D-3, the closing of limit switch LS–33 in line (36) will immediately energize slow speed relay CR–7 in line (34) to thereby cause the feed carriage 117 to cease moving in reverse at high speed and commence moving in reverse at slow speed.

E. The energization of slow speed relay CR–7 will cause the following sequence of events:

(1) The contacts associated with relay CR–7 and located in line S10 close to energize slow speed solenoid H (FIG. 19) to cause the feed carriage 117 to move at slow speed. The energization of this solenoid causes valve VH to move from the position shown in FIG. 19 to a position wherein it blocks communication between conduits 174 and 175 leading to hydraulic motor 141. Instead hydraulic fluid is caused to flow from conduit 109 into conduit 178 through pressure compensating flow control valve 179 and through conduit 180 leading to valve VKJ which is still energized by solenoid J. Valve 179 causes a lesser volume of hydraulic fluid to be supplied to motor 141 than was supplied before solenoid H was actuated. However the hydraulic fluid so supplied is at the same pressure as was supplied through valve VH to thereby permit motor 141 to produce the same torque as while operating at a higher speed.

(2) The CR–7 contacts in line (35) close to seal around limit switch LS–33 in line (36), thereby holding relay CR–7 in line (34) energized after cam 173 no longer actuates limit switch LS–33.

(3) The CR–7 contacts in line (32) close without effect since the CR–14 contacts in line (33) and the CRG contacts in line (33a) are both open. As noted above, relay CR–14 controls forward movement of feed carriage 117 and as noted above in Paragraph D-2 because of the electrical interlock, relay CR–14 cannot be energized while carriage 117 is moving in reverse.

(4) The CR–7 contacts in line (55) close without effect since limit switch LS–7 in line (55) is open because gauging carriage 146 has not moved into engagement with movable abutment 153.

Continued movement of feed carriage 117 toward the rear of feed table 11 at slow speed after the actuation of limit switch LS–33 in the above manner will continue until carriage 117 arrives at the rear of the table and abuts cushion 172 (FIG. 15) on rear abutment 171. When carriage 117 has arrived at the rear of the table, limit switch LS–19 (FIG. 19) will be actuated by cam 173 on the side of the carriage. This will cause the LS–19 contacts in line (63) to open without effect because limit switch LS–35 in this line has not been actuated as described in detail above. Furthermore, the LS–19 contacts in line (11) will close and energize knife lower relay CRK in line (11), thereby duplicating the action described in Paragraph C-2 where the feed carriage 117 was assumed to be at the rear of the table. After relay CRK has been energized, the shear 12 is caused to perform certain functions. It is therefore believed that in the interest of orderly presentation, basic components of shear 12 must be described at this time.

Billet shear 12 includes a frame 181 having motor 169 mounted thereon which is suitably mechanically coupled to flywheel 182 which is mounted for rotation on main driveshaft 183. Broadly, an eccentric 184 is mounted on shaft 183' which is mechanically coupled through an intervening gear train (not shown) to shaft 183 and is adapted to rotate within member 185 which is guided for movement in vertical ways (not shown) in the frame of the machine. Eccentric 184 and member 185 comprise a Scotch yoke mechanism for actuating a ram 186 secured to member 185, said ram carrying movable knife 187. Mounted on the bed of the machine is a stationary knife 188. Operatively associated with flywheel 182 and shaft 183 is a clutch 189 which selectively effects driving engagement between flywheel 182 and shaft 183 as described in detail hereafter. Also associated with shaft 183 is a brake 190 which selectively holds the shaft against movement in any predetermined position thereof. All of the foregoing structure is conventional in the art and has therefore been described in an extremely broad manner only to provide the proper antecedent basis for further descriptions of the mode of operation of the combined unscrambler, feed table, and shear. The billet shear 12 of the present invention is more fully described in copending application Serial No. 57,039 filed September 19, 1960 now Patent No. 3,152,499, dated Oct. 13, 1964. Other elements of structure associated with shear 12 which cause the instant combination to function in a novel manner will be described at suitable points in the ensuing description.

After the knife lower relay CRK in line (11) has been energized by the closing of limit switch LS-19 when carriage 117 has reached the rear of the table 11 in the above described manner, the following sequence of events will occur:

F. The various contacts associated with knife lower relay CRK will provide the following actions:

(1) The CRK contacts in line (17) will close to energize relay coil CR-3 in line (19), relay CR-3 being associated with brake 190 on the shear and the energization thereof releasing said brake thereby disengaging brake 190 from shaft 183.

(2) The normally closed CRK contacts in line (19) open to prevent actuation of relay CR-3 through normal channels.

(3) The normally closed CRK contacts in line (22) open to prevent actuation of nonrepeat relay CR-5 in line (20) after limit switch LS-5, line (20), is closed by motion of the machine, as described in detail at a subsequent portion of the description.

(4) The normally closed CRK contacts in line (24) open to prevent actuation of relay CR-1 in line (24), relay CR-1 being associated with the hold down on the shear which causes positive gripping of a rod prior to the action of the knives thereon. Furthermore normally closed CRK contacts in line (24) open to prevent actuation of CR-2 relay which actuates a suitable booster (not shown) in the hydraulic system associated with the hold down which normally causes the latter to exert a massive force on the bar being sheared during the shearing operation. This will also be described hereafter. The reason that relays CR-1 and CR-2 are prevented from being actuated at this time is to permit the movable shear blade 187 to be lowered without actuating either the above-mentioned hold down or the booster.

(5) The CRK contacts in line (27) close without effect pending the actuation of limit switch LS-3 in line (28), LS-3 being tripped when the brake 190 is released.

(6) Normally closed CRK contacts in line (29) open with no effect since CR-4 contacts in line (29) are open. Limit switch LS-4 is mounted on the front frame of the machine and is cam operated by a suitable cam CLS-4 mounted on shaft 183' which is driven in synchronism with shaft 183. Because of the opening of CRK contacts in line (29), limit switch LS-4 will be ineffective for performing its normal function during the process of lowering the shear blade 187.

(7) The normal closed CRK contacts in line (46) open to deenergize carriage reverse relay CR-13 in line (46) and thus positively prevent further reverse motion of feed carriage 117.

(8) Normally closed CRK contacts in line (60) open to prevent actuation of relay CR-17 by limit switch LS-24 in line (60). The purpose for opening the circuit through LS-24 is to hold CR-17 deenergized during the time that a crop cut is required, as more fully explained hereafter. In this respect it is to be noted that whenever bars such 18' are fed to a shear, the initial portions of such bars are not perfect and therefore a crop cut is required to shear a small portion from the end of the bar to thereby eliminate the imperfect end which cannot be used for a commercially acceptable forging. The manner in which the crop cut is effected will be more fully described hereafter.

(9) The CRK contacts in line (81) close without effect if limit switches LS-15 and LS-31 are open. As noted above relative to the operation of unscrambler 10, limit switches LS-15 and LS-31 are located at the end of the storage rack (FIG. 20) and will be closed only if a bar is on the storage rack ready for placement onto the feed table 11. As can be seen from line (81), the elevator raise relay CR-11 is in this line and when this relay is actuated, the elevators, to be subsequently described, will remove a bar from the storage rack of the unscrambler and place it on the feed table.

(10) The CRK contacts in line (84) close without effect since relay contacts CR-12 associated with relay CR-12 in line (84) are open, relay CR-12 controlling the lowering of the abovementioned elevators.

In Paragraph F-7 above, carriage reverse relay CR-13, line (46), was deenergized.

G. When relay CR-13 has become deenergized, the contacts associated therewith will provide the following sequence of events:

(1) The CR-13 contacts in line S-11 will open to deenergize carriage reverse solenoid J (FIG. 19) whereupon valve VKJ will return to the position shown in FIG. 20 to thereby disrupt communication between the source of hydraulic pressure and motor 141. This will cause motor 141 to cease exerting a reverse torque on feed carriage 117.

(2) The CR-13 contacts in line (14) will reclose without effect since the contacts associated with relay CRG in line (14) are open. As noted above, relay CRG is energized only when a bar is on the feed table ready for feeding to shear 12.

(3) The CR-13 contacts in line (36) open to deenergize slow speed relay CR-7 in line (34) which in turn will deenergize solenoid H (FIG. 19), solenoid H in turn permitting valve VH to return to the position shown in FIG. 19 to thereby terminate the circuit which causes slow speed actuation of feed carriage 117.

(4) CR-13 contacts in line (58) will reclose without effect since relay contacts associated with relay CRC in line (57) and relay contacts CR–8 in line (58) remain open.

In Paragraph F–1 aboe the contacts of knife lower relay CRK energized brake relay CR–3.

H. The energization of relay CR–3 will cause the following sequence of events:

(1) The CR–3 contacts in line S–5 will close to energize solenoid C (FIG. 21) and release the brake 190 on the shear. Brake 190 is actuated by compressed air from a suitable source 300, FIG. 21. When solenoid C is deenergized, a valve VC associated therewith will permit communication between said source of compressed air and the brake through conduit 301, conduit 302, valve VC, and conduit 303 to thereby cause the brake to effect its locking action. However when solenoid C is energized, the valve VC associated therewith will disrupt the communication between the source of compressed air 300 and the brake 190 and also cause the compressed air which previously actuated the brake to be dumped, thereby permitting spring mechanism (not shown) associated with the brake to move said brake to a released position. The foregoing structure is conventional and therefore a detailed description thereof is not deemed necessary.

(2) The CR–3 contacts in line (6) will close to seal around push button PB–4 in line (5) in order to prevent the use of PB–4 during a machine stroke, PB–4 serving the function of stopping motor 169 when PB–4 is actuated in line (5) to disrupt the circuit to said motor.

(3) The CR–3 contacts in line (10) will close to seal around limit switch LS–19 in line (11) and thereby hold knife lower relay CRK energized even though feed carriage 117 moves away from limit switch LS–19 (FIG. 19).

(4) CR–3 contacts in line (22) close without effect since CR–5 contacts in line (22) and normally closed CRK contacts in line (22) are both open. This prevents energization of nonrepeat relay CR–5 under certain conditions, namely, during the time when CRK is energized, as previously explained.

(5) CR–3 contacts in line (23) close without effect since CRK contacts in line (24) are open.

(6) CR–3 contacts in line (24) close without effect since CRK contacts in line (24) are open.

(7) CR–3 contacts in line (50) open to prevent the energization of gauge cylinder retract relay CR–18, line (50), during a machine stroke, that is, while the shear is in operation.

When brake 190 is released in accordance with Paragraph H–1 above, a portion of the brake will actuate limit switch LS–3 (FIG. 26) in line (28) to thereby close LS–3. However the CRK contacts in line (27) are closed, as set forth above in Paragraph F–5. Furthermore clutch relay CR–4 in line (28) is energized.

I. As a result of the energization of clutch actuating relay CR–4, the contacts associated therewith will provide the following actions:

(1) The contacts in line S–6 associated with clutch relay CR–4 will close to energize solenoid D (FIG. 21) to thereby effect engagement of clutch 189. Insofar as pertinent here, clutch 189 is operated by compressed air from source 300 and when relay CR–4 is energized in the foregoing manner, a valve VD is actuated by solenoid D to permit compressed air to communicate with clutch 189 from compressed air source 300 through conduits 301 and 304, valve VD, and conduit 305. This will cause the clutch to effect engagement between flywheel 182 (FIG. 26A) and shaft 183 to thereby in turn cause the mechanical linkage between shaft 183 and movable blade 187 to lower the latter.

(2) The CR–4 contacts in line (18) close to seal around single stroke selector switch SS–2 in the event this switch is turned to the on position.

(3) CR–4 contacts in line (20) close without effect since limit switch LS–5 and contacts CRK in line (19) are both open.

(4) CR–4 contacts in line (29) close without effect since CRK contacts in line (29) are open.

(5) CR–4 contacts in line (56) close without effect since CR–8 contacts in line (56) are open.

After the shear brake has been disengaged and the clutch has been engaged in the above-described manner, the rotation of the eccentric 184 (FIG. 26A) on the shear is underway. As the eccentric turns, limit switch LS–4, lines (27) and (29), will be engaged by duration cam CLS–4 (FIG. 17) which is mounted on a shaft 183' (FIG. 26) which rotates in synchronism with shaft 183 of the shear 12. As a result of said engagement between cam CLS–4 and limit switch LS–4, the contacts of the latter in line (27) will open to de-energize relay CR–4 in line (28).

J. Upon deenergization of clutch relay CR–4, the following sequence of events will occur:

(1) The CR–4 contacts in line S–6 will open to de-energize solenoid D which in turn will cause the clutch to become disengaged because valve VD associated with solenoid D will terminate communication between the above-mentioned source of compressed air and the clutch. However, notwithstanding that clutch 189 has been disengaged from shaft 183, the ram 186 which carries movable blade 187 will continue to coast from its own momentum thereby causing movable blade 183 to continue its downward movement.

(2) The CR–4 contacts in line (18) will open without effect.

(3) The CR–4 contacts in line (20) will open without effect.

(4) The CR–4 contacts in line (29) will open without effect.

(5) The CR–4 contacts in line (56) will open without effect.

It is to be noted that the CR–4 contacts in lines (18) (20) (29) and (56) have no effect in closing during the sequence of event set forth in Paragraph I, and will will have no effect in opening at this point in the sequence of events. These contacts have other functions in the operation of the machine which will be apparent from appropriate portions of the description which appear hereafter.

The ram 186 of shear 12 will continue to coast with both the clutch and brake disengaged until a point is reached where the duration cam CLS–6, mounted on shaft 183', controlling limit switch LS–6, line (17), releases this limit switch. This will immediately deenergize relay CR–3 in line (19) which controls operation of the brake 190.

K. When relay CR–3, line (19), is deenergized because of the opening of limit switch LS–6, the following sequence of events will occur:

(1) The CR–3 contacts in line S–5 will open to de-energize solenoid C to thereby reset the brake by causing compressed air to be admitted therethrough because of the action of a valve VC. The energization of brake 190 as soon as limit switch LS–6 is no longer actuated by cam CLS–6 will occur when movable knife 187 is at bottom dead center. Thus knife 187 will stop in a position wherein it obstructs movement of bar 18' through the shear 12.

(2) CR–3 contacts in line (6) will open without effect thereby terminating the sealing circuit about push button PB–4 in line (5) to thereby again render push button PB–4 effective in the event it is desired to utilize this push button to stop the shear.

(3) CR–3 contacts in line (10) open without effect since the contacts of limit switch LS–19 in line (11) are still closed because feed carriage 117 is still in a position wherein cam 173 thereon actuates LS–19.

(4) CR–3 contacts in line (22) open without effect since CRK contacts in line (22) are still open in view of the sequence set forth in F–3 above.

(5) CR–3 contacts in line (23) open without effect since CRK contacts in line (24) are still open in view of the action experienced in F–4 above.

(6) CR–3 contacts in line (24) open without effect since CRK contacts in line (24) are still open, as set forth in F–4 above.

(7) CR–3 contacts in line (50) will reclose without effect since pressure switch PS–16, line (50) and FIG. 18, is still open. PS–16 is associated with structure for gauging the length of workpiece fed to the machine as will be described in greater detail hereafter.

In view of the above-described sequence of operations, the movable knife 187 of shear 12 has reached bottom dead center and is held in this position. Furthermore feed carriage 117 has been retracted to the rear of feed table 11 and will be retained in this position until a bar is placed on feed table 11 by the operation of elevators 192 (FIGS. 1, 3, 7, and 8). However prior to the loading of a bar onto the storage rack from the unscrambler, such that it will be available for the elevators, it is required that the machine operator depress push button PB–10 in line (69). When this is done, the unscrambler 10 will commence operation in the manner described in detail above relative to the first portion of this specification which included Paragraphs L, M, N, O, and P. After the action of unscrambler 10 has caused a bar to arrive on the storage rack portion thereof, limit switches LS–15, line (81), and LS–31, line (80), will be energized (FIG. 20) these limit switches being located at the end of the incline of the storage rack proximate abutments 87. It will be noted from line (81) that relay contacts CRK are closed because of the action in F–9 above. This will cause the completion of a circuit to relay CR–11 in line (81), CR–11 controlling the raising of the elevators 192.

Three elevators 192 are provided at three longitudinally spaced locations along feed table 11 (FIG. 1) for removing a bar from the lowermost end of the storage rack of the unscrambler. These three elevators 192 operate simultaneously when actuated. Each of elevators 192 (FIGS. 5, 6, 7, and 8) include a vertical plate 193 having a notch 194 at its upper end. Furthermore each plate 193 has a pair of collars 195 mounted on the rear thereof (FIG. 8), said collars encircling rods 196. One of said rods 196 has the lower end thereof affixed to base plate 197 and the upper end thereof affixed to top plate 198. The other of rods 196 has the lower end thereof affixed to base plate 199 and the top end thereof affixed to plate 198. Plates 197, 198, and 199 extend at right angles from cross brace 200 which extends between and is welded to the inner surfaces of boxlike members 89 (FIG. 8) of the feed table 11. It can readily be seen that rods 196 are in parallelism and therefore act as guides to permit plate 193 to move in a vertical direction (FIG. 7). In order to effect the foregoing vertical movement, an hydraulic cylinder 201 (FIGS. 9 and 18) is associated with each of plates 193. The lower end 202 of hydraulic cylinder 201 is rigidly secured to base plate 197 and shaft 203 has one end thereof affixed to piston 204 within cylinder 201 and the other end thereof attached to flange 205 extending perpendicularly from plate 193 proximate the upper end thereof. It will therefore readily be appreciated that whenever pressurized fluid is supplied to hydraulic cylinder 201, plate 193 will be caused to ride in a vertical direction.

After bar 18 has arrived at the lower end of the storage rack consisting of inclined surfaces 17 and 31 so that it rests against abutments 87, limit switch LS–15 in line (81) and limit switch LS–31 in line (80) will be actuated. The physical location of these limit switches is schematically depicted in FIG. 20. Since contacts CRK in line (81) are closed in view of the action set forth above in F–9, elevator raise relay CR–11 in line (81) will be energized.

Q. As a result of the energization of elevator raise relay CR–11, the following sequence of events will occur:

(1) The CR–11 contacts in line S–9 will close to energize elevator raise solenoid G (FIG. 18) thereby causing valve VG (FIG. 18) to move from the position shown to a position wherein it effects communication between conduit 111 leading from pump 56 and conduit 206 which is in communication with conduit 207 which in turn is in communication with the lower ends of cylinders 201 below pistons 204. The shifting of valve VG will also cause the upper portions of cylinders 201 above pistons 204 which are in communication with conduit 208 to then be vented to sump S through conduit 209, valve VG, and conduit 210. The existence of hydraulic pressure beneath pistons 204 of cylinders 201 and the venting of the portions of cylinders 201 above pistons 204 will cause pistons 204 to rise and cause shafts 203 which are affixed to pistons 204 to rise also. Because of the attachment between shafts 203 and plates 193 through flanges 205, the elevators will rise.

(2) CR–11 contacts in line (82) will close to seal around limit switches LS–15 and LS–31, thereby causing the circuit produced by the initial actuation of said switches to be maintained notwithstanding that the bar 18 which actuated such switches is removed from engagement therewith by the action of the elevators.

The elevators 192 will continue to rise until such time as the portion 211 (FIGS. 5 and 6) rides up underneath lowermost bar 18 on the storage rack. The dimensions of plates 193 are such that portion 211 will engage only the lowermost bar. Continued upward movement of plates 193 will lift the lowermost bar 18 over abutments 87 at the end of the storage rack. When the lowermost bar which has been lifted in this manner is clear of abutment 87, it will roll down portions 211 and come to rest in the apex 212 of notch 194. After the lowermost bar 18 which has been lifted from the storage rack in the above-described manner is clear of abutment 87, the elevators 192 will be at the top of their stroke. At this time it is desired that the elevators 192 reverse their movement to lower bar 18. To effect the foregoing action, limit switches LS–17 and LS–18 (FIG. 18) are located on cross brace 200 proximate flange 198 thereof and will be actuated by collars 195 (FIG. 7) when said collars reach an upper position proximate flange 198. Limit switches LS–17 and LS–18 are located in line (83) and when they are closed they energize elevator lower relay CR–12. It is to be noted that LS–17 is associated with one of said rods 196 and LS–18 is associated with the other of said rods 196.

R. After relay CR–12 is energized by the actuation of limit switches LS–17 and LS–18, the following sequence of events will occur:

(1) The normally closed CR–12 contacts in line (81) will open to thereby deenergize elevator raise relay CR–11 in line (81).

(2) The CR–12 contacts in line (84) will close to seal around limit switches LS–17 and LS–18 in line (83).

S. After elevator raise relay CR–11 has become deenergized in accordance with R–1 above, the following actions will occur:

(1) The CR–11 contacts in line S–9 will open to deenergize solenoid G (FIG. 18) which actuates valve VG. After solenoid G is deenergized, the spring associated with valve VG will return it to the position shown in FIG. 18 where it will effect communication between the hydraulic pressure line 111 and the tops of cylinders 201 through valve VG, conduit 209 and conduit 208. At this time the lower ends of cylinders 201 will be in communication with sump S through conduit 207, conduit 206, valve VG and conduit 210. The existence of high pressure hydraulic fluid above pistons 204 and low pressure below pistons 204 will cause said pistons to move downwardly carrying elevator plates 193 downwardly with them. However since bar 18 which was picked up from the storage rack rolled into apex 112 of notch 194 (FIGS. 5 and 6) after said bar was lifted clear from the storage rack, the bar descends with the elevators. The downward movement of the elevators will continue until such time as collars 195 (FIG. 7) abut plate 197. It is to be especially noted that the normal position of valve VG is as shown in FIG. 18 to cause high pressure hydraulic fluid to be exerted on the top of pistons 204 to thereby prevent said elevators from rising and interfering with action of the feed table.

(2) The CR-11 contacts in line (82) open without effect since relay CR-11 has been deenergized by the opening of the CR-12 contacts in line (81). As can be seen from FIG. 1, the apices 212 of elevator plates 193 are in line both with each other and the centers of rollers 213 which are journalled for rotation in bearing pedestals 214 mounted on cross braces 90 which extend between opposite inner surfaces of box-like members 89. As can be seen from FIGS. 5 and 12, rollers 213 have a V groove in the outer periphery thereof. Furthermore it is to be especially noted that rollers 213 are in alignment with each other and that the V grooves in the rollers are in alignment with the apices of notches 194 of elevator plates 193. It will also be noted that the lowermost position of elevators 192 is such that the apices 212 of notches 194 lie below the uppermost portions of rollers 213 (FIG. 5). Therefore as the elevator plates 193 move to their lowermost position in the above-described manner, a point will be reached wherein the rod which was lying in the apices of the elevator plates will be received by the V grooves of the rollers 213. Continued movement downwardly of the elevator plates 193 will cause said plates to lose contact with the bar which has been deposited on the rollers as said elevator plates move downwardly to an out of the way position wherein they cannot intereferе with operation of the feed table 11.

It will be appreciated that after the lowermost bar 18 (FIG. 5) on the storage rack portion of the unscrambler will roll downwardly until the bar adjacent to the one removed actuates the limit switches LS-15 and LS-31. However when a bar is on the feed table, the elevators cannot rise to move the lowermost bar because of the manner in which the control circuit is set up.

It will also be appreciated at this point that the feed table 11 need not necessarily be supplied with rollers such as 213 but in lieu thereof may possess a guide trough for receiving the bar.

The feed table is now ready to commence feeding the bar 18', which was deposited onto the rollers, to the shear 12. As can be seen from FIG. 18, a limit switch LS-16 is provided. This limit switch is located on the bed of the feed table so that when a bar 18' is on the rollers, this limit switch is actuated. As can be seen from FIGS. 29 and 30, limit switch LS-16 has contacts in line (13) and line (81). The closing of the limit switch contacts in line (13) will effect energization of relay CRG in line (13). Furthermore the carriage forward relay CR-14 in line (14) will also be energized.

T. After relay CRG has been energized in the above-described manner, the following sequence of events will occur:

(1) The CRG contacts in line (12) will close to seal around limit switch LS-19 in line (11) thereby holding the knife lower relay CRK in line (11) energized notwithstanding that limit switch LS-19 which is located at the end of the feed table (FIG. 19) is no longer actuated when carriage 117 starts moving forwardly. In other words limit switch LS-19, as noted above, was physically actuated by cam 173 when carriage 117 was in its rearmost position and such physical contact terminates when the carriage 117 moves forwardly.

(2) The CRG contacts in line (14) close to seal around limit switch LS-16 in line (14). This causes the relay CRG, line (13), to remain energized even though for some reason limit switch LS-16 which was actuated by the depositing of the bar on the feed table for some reason becomes deactuated, as when the bar is still being fed to the shear 12 but is not longer in contact with limit switch LS-16.

(3) The CRG contacts in line (33A) close without effect since contacts CR-7 in line (32), limit switch LS-20 in line (33) and limit switch LS-21 in line (34) are all open. The functions of relays CR-7 and limit switches LS-20 and LS-21 will appear at appropriate points hereafter.

(4) The CRG contacts in line (49) close to energize gauge cylinder retract relay CR-18 in line (50), said relay causing retraction of gauging cylinder 146 in a manner to be described in detail hereafter.

In view of the foregoing sequence there are now two actions in progress. Firstly, the feed carriage 117 has started moving to the left in FIG. 19 as a result of the energization of relay CR-14 in the manner noted above. Secondly, gauging carriage 146 has started moving to the right in FIG. 18 preparatory to causing the shear 12 to effect the crop cut on the end of bar 18' on rollers 213. The manner in which gauging carriage 146 operates will become apparent hereafter.

U. After gauge cylinder retract relay CR-18 has been energized in accordance with step T-4 above, the following actions occur:

(1) The CR-18 contacts in line S-14 (FIG. 28) close to energize gauge retract solenoid M to thereby retract gauging carriage 146. More specifically it can be seen that the energization of solenoid M in FIG. 18 causes the shifting of valve VMN to a position wherein it effects communication between conduit 165 leading from the source of hydraulic pressure and conduit 168 leading to the portion of gauging cylinder 164 to the left of piston 167. The movement of valve VMN also causes conduit 166, which is in communication with the portion of gauging cylinder 164 to the right of piston 167 to be in communication with sump S through conduit 215. The foregoing unbalance of pressures on the opposite sides of piston 167 will cause it to move to the right in FIG. 18 and thereby cause gauging carriage 146 to move to the right also.

(2) The CR-18 contacts in line (60) which were normally closed open as an electrical interlock to prevent relay CR-17, which causes gauging cylinder 164 to extend, from being energized.

The gauging carriage 146 will continue its movement from left to right in FIG. 18 until such time as a portion thereof engages limit switch LS-23, line (49), and this has the immediate effect of opening the circuit to CR-18, line (50), to thereby deenergize CR-18 and thereby stop the gauging carriage 146.

V. The exact sequence of events which occur upon the deenergization of relay CR-18 are as follows:

(1) The CR-18 contacts in line S-14 will open to thereby deenergize solenoid M. This has the effect of causing valve VMN (FIG. 18) to return to the position shown in the drawings to thereby terminate communication through said valve. This in effect causes the hydraulic fluid on both sides of piston 167 in gauging cylinder 164 to be blocked to thereby provide an hydraulic lock against movement of piston 167. This in turn causes gauging carriage 146, because of its attachment to gauging cylinder 164, to stop.

(2) The CR–18 contacts in line 60 will reclose without effect since relay coil CR–17 was not previously energized and because limit switch LS–24 in line (60) is now open because gauging carriage 146 has moved away from it. As noted above during the foregoing sequence of events relating to the movement of gauging carriage 146, feed carriage 117 was also caused to move from left to right in FIG. 19 as a result of the energization of relay CR–14, as noted above.

W. The exact sequence of events resulting from the energization of relay CR–14 in line (14) is as follows:

(1) The CR–14 contacts in line S–12 will close to energize solenoid K to thereby cause feed carriage 117 to move forward, that is, move from right to left in FIG. 19, at high speed. More specifically, solenoid K is shown in FIG. 19 and the energization thereof causes communication to be effected between line 109 leading from pump 56 and valve VKJ through conduit 174, valve VH, and conduit 175. Valve VKJ, when shifted by solenoid K will cause communication between conduit 175 and conduit 177 leading to hydraulic motor 141 to thereby supply high pressure fluid thereto which causes it to run in a forward direction. The exhaust from hydraulic motor 141 will pass through conduit 176 and valve VKJ to sump S. Thus pulleys 130 will be driven because of the mechanical linkage between them and hydraulic motor 141, and bands 128 attached to feed carriage 117 will drive the latter from right to left at high speed.

(2) The CR–14 contacts in line (33) close without effect since limit switches LS–20 and LS–21 are both open at this point. As can be seen from FIG. 19, LS–20 and LS–21 are located at the front of feed table 11 proximate shear 12. These limit switches will not be closed until bar 18′ passes this location, that is, until bar 18′ actuates these limit switches.

(3) The CR–14 contacts in line (34) close without effect for the same reason given above in subparagraph 2.

(4) The CR–14 contacts in line (46) open to provide an electrical interlock to thereby prevent carriage reverse relay CR–13 from being energized, which in turn prevents feed carriage 117 from being actuated simultaneously in both a forward and reverse direction.

As a result of the foregoing sequence of events, feed carriage 117 will move to the left on feed table 11 at high speed until probe 123 which moves with carriage 117 contacts the end of rod 18′ on rollers 213. After such contact is made, rod 18′ will be advanced toward shear 12 at high speed until such time as the front of rod 18′ actuates limit switches LS–20 and LS–21 mounted proximate shear 12. Limit switches LS–20 and LS–21 are located in lines (33) and (34), respectively. As noted above in W–3, the CR–14 contacts in line (34) are closed and this will cause energization of slow speed relay CR–7 in line (34) and forward feed relay TR–7 in line (33). The energization of slow speed relay CR–7 causes hydraulic motor 141 to shift from a condition of high speed to a condition of low speed. The reason for this is to prevent the end of bar 18′ which is being fed to the shear from abutting movable knife 178 with too great a force. In this respect it will again be noted that movable knife 187 is still being held in its bottom dead center position in view of the foregoing sequence of events.

X. More specifically, the energization of relay CR–7 to effect slow speed movement of feed carriage 117 causes the following sequence of events:

(1) The CR–7 contacts in line S–10 close to energize solenoid H (FIG. 19) to cause the carriage to shift from high speed movement to low speed movement to thereby minimize the shock when the end of rod 18′ abuts the movable knife 187. More specifically, from FIG. 19 it can be seen that when solenoid H is energized, it shifts from the position shown to a position wherein it blocks communication between conduits 174 and 175. However, solenoid K is still energized to permit communication between conduit 175 and conduit 176 through valve VKJ. Therefore hydraulic fluid will be supplied to motor 141 from high pressure line 109 through conduit 178, pressure compensating flow control valve 179, conduit 180, conduit 175, valve VKJ and conduit 177. The exhaust hydraulic fluid from motor 141 will pass through conduit 176 and valve VKJ to sump S. Valve 179 maintains the same pressure to hydraulic motor 141 but reduces the volume supplied thereto to thereby cause motor 141 to continue to operate at high torque but at low speed.

(2) The CR–7 contacts in line (32) close to seal around limit switches LS–20 and LS–21.

(3) The CR–7 contacts in line (35) close without effect since the CR–13 contacts in line (36) are open, said CR–13 contacts having been open when relay CR–13 in line (46) was de-energized as set forth in Paragraph W–4 above.

(4) The CR–7 contacts in line (55) close without effect since limit switch LS–7 (FIG. 18) has not yet been actuated to a closed position because gauging carriage 146 is held away therefrom as a result of the sequence described above with respect to limit switch LS–23.

As noted above, the closing of limit switches LS–20 and LS–21 as rod 18′ approaches the shear 12 will result in the energization of relay TR–7 in line (33).

Y. The contacts associated with relay TR–7 provide the following action:

(1) The TR–7 contacts in line (38) remain open for a period of time after relay TR–7 is energized. In this respect a timer (not shown) is associated with relay TR–7 and this timer causes the contacts in line (38) to remain open for a sufficiently long period of time to permit the end of rod 18′ to actually contact the knife 187 which is still in its lowermost position. Thereafter the delay contacts associated with TR–7 in line (38) close to energize delay timer TRN in line (38). In other words the function of the timer associated with relay TR–7 is to insure, after actuation of limit switches LS–20 and LS–21, that there is no further action until such time as the end of rod 18′ engages shear blade 187.

Z. After timer TRN is energized in line (38) to start action of a timer associated therewith, the following sequence of events will occur:

(1) The normally closed contacts of TRN in line (14) will open immediately to de-energize carriage forward relay CR–14 in line (14).

(2) The TRN contacts in line (32) will close to hold relay TR–7 in line (33) and relay CR–7 in line (34) energized.

(3) The TRN contacts in line (54) will close after a very short time delay to energize relay CR–15 in line (53). The purpose of having this very short time delay is to permit the tension exerted on bands 128 by motor 141 to relax momentarily. It will be appreciated that after the front end of rod 18′ has come into abutting relationship with lowered knife 187 under the thrust provided by motor 141, the rod 18′ will be under stress because it is held at one end by movable blade 187 and is being pushed at the other end by probe 123. Thus in effect there will be a tendency to push movable blade 187 to the left in FIG. 18 and there will be an equal and opposite force exerted against feed carriage 117 in FIG. 19 tending to push it to the right. In short, the entire system will be under stress because movement of rod 18' is blocked by lowered movable knife 187. By deenergizing the carriage forward relay CR–14 in accordance with Z–1 above prior to energizing CR–15 in accordance with the instant step, the tension on bands 128 will be relaxed because the feed carriage 117 will be permitted to move a bit to the right to permit such relaxation of tension to thereby eliminate the above-described stress in the system.

It is to be especially noted that when the stress in the system is released in accordance with the immediately preceding steps of operation, rod 18' remains in firm abutting relationship with lowered knife 187. The reason for this is that a pressure block 226 (FIG. 24) is mounted on the frame of the machine to firmly grip the front end of rod 18'. Pressure block 226 includes an upper block 227 having a semicircular recess 228 therein. Upper block 227 is mounted on base block 229 by means of screws 230 which have the threaded ends 231 thereof threaded into mating tapped apertures 232 in base block 229. Heads 233 are provided on screws 230 and these heads abut upper ends of springs 234, the other ends of springs 234 resting on surfaces 235 of counterbores 236. Springs 234 are extremely heavy so that there is very little tendency for upper block 227 to be biased away from base block 229 when a rod is inserted between upper semicircular groove 228 in upper block 227 and lower semicircular groove 236 in base block 229. The spring tension provided by the tightening of screws 230 is set at a value which will cause rod 18' to be engaged with sufficient force by semicircular grooves 228 and 236 so that rod 18' will move only when a positive thrust is applied thereto by probe 123 of the feed carriage 117. In other words blocks 227 and 229 exert a sufficient force on rod 18' so that once the thrust of the feed carriage 117 is removed from said rod, the friction engaging said rod will not permit it to advance as a result of its own momentum. Thus rod 18' will always stop in an exact position corresponding to that at which thrust of the feed carriage 117 was terminated and will not advance any further under its own momentum. The foregoing action, as will more fully appear hereafter, permits rod 18' to be advanced through the shear inaccurately gauged increments. It will be noted that the entry ends of blocks 227 and 229 are flared to provide a frusto-conical entry portion 237 leading to semicircular grooves 228 and 236. One half of frusto-conical entry portion 237 is located at 238 in upper block 227 and one half is located at 239 in base block 229. Frusto-conical aperture 237 guides the rod into semicylindrical recesses 236 and 228. The base block 229 has a depending flange 240 which is suitably bored to receive screws 241 which are received in mating tapped apertures (not shown) in the frame 181 of shear 12. Screws 241 hold flange 240 loosely to permit the above-described pressure block assembly to float for reasons which appear hereafter, and for the purpose of permitting the internal surfaces of cylindrical recesses 236 and 228 to firmly engage all portions of bar 18' within such recesses as a result of such floating action.

AA. After the carriage forward relay CR–14 has been deenergized in accordance with Z–1 above, the following sequence of events will occur:

(1) The CR–14 contacts in line S–12 will open to deenergize solenoid K (FIG. 19) thereby permitting valve VKJ to return to the position shown in the drawings wherein restricted flow is allowed between conduits 176 and 177 and sump S. This allows a restricted amount of movement by hydraulic motor 141 which results in the relaxation of motor 141 to permit the bands 128 to relax. It will be noted that relief and check valves 216 and 217 are located across lines 176 and 177. This permits a release of hydraulic pressure in motor 141 in the event said pressure exceeds a predetermined amount, as when the motor is rapidly reversed.

(2) The CR–14 contacts in line (33) open without effect since the TRN contacts in line (32) in parallel therewith are closed.

(3) The CR–14 contacts in line (34) open without effect since relay CR–7 in line (34) is sealed through CR–7 in line (32) and CRG in line (33A).

(4) The CR–14 contacts in line (46) reclose without effect since relay CR–13, the carriage reverse relay, is held open by contacts CRK, line (46), which were opened in Z–3 as a result of the energization of relay CR–15.

As noted above in Z–3, band clamp relay CR–15 in line (53) was energized. The function of the band clamps may best be appreciated from FIGS. 7, 10, 11, and 18. In the interest of providing accurate gauging when feeding rod 18' to the machine, it is necessary at certain times to clamp bands 128 against relative movement with respect to the frame of feed table 11. This will prevent hydraulic motor 141 from moving said bands 128 even if said motor is actuated. In this respect it will be noted that during all subsequent feeding actions, motor 141 always exerts a forward thrust on feed carriage 117 even though the bands are clamped. Furthermore, the clamping of bands 128 relative to the frame of the machine will prevent feed carriage 117 from drifting. In order to clamp bands 128 against movement the following structure is provided. Hydraulic cylinders 218 (FIGS. 7 and 10) are rigidly mounted on fixed abutment 93 (FIG. 7) which extends between the inner surfaces of boxlike members 89 of feed table 11 (FIG. 10). The lower ends of shafts 219 are affixed to brake shoes or band clamps 220 and the upper ends of shafts 219 are affixed to pistons 221 within hydraulic cylinders 218 (FIG. 18). As can be seen from FIGS. 7 and 10, anvils 222 are associated with fixed abutment 93 and that bands 128 normally ride between anvils 222 and band clamps 220. Whenever pistons 221 (FIG. 18) are energized, band clamps 220 will move downwardly to thereby clamp bands 128 between them and anvils 222 as described in greater detail hereafter.

BB. After band clamp relay CR–15 in line (53) is energized, the following sequence of events will occur:

(1) The CR–15 contacts in line S–13 will close to energize solenoid L (FIG. 18). This will cause valve VL to shift from the position shown in the drawings to a position wherein it effects communication between conduit 223 leading from high pressure line 112 and conduit 224 leading to the portion of cylinder 218 above piston 221. The portion of cylinder 218 below piston 221 will be in communication with sump S through conduit 225 and valve VL. Establishing the foregoing hydraulic circuit will cause pistons 221 to move downwardly to thereby cause band clamps 220 to descend to thereby clamp bands 128 between them and anvil 222.

(2) The normally closed CR–15 contacts in line (43) open without effect since limit switch LS–24 was previously open as a result of gauging carriage 146 having moved to the right.

(3) The normally closed CR–15 contacts in line (46) open to continue to keep carriage reverse relay CR–13 in line (46) deenergized.

(4) The CR–15 contacts in line (51) close to seal in relay CR–15 in line (53) and this relay must now stay energized until pressure switch PS–16 in line (51) (see also FIG. 18) is open in a manner to be described hereafter.

After the clamping of bands 128 by the action of cylinders 218 in the above-described manner, pressure will build up in conduit 224 until such time that pressure switch PS–15, lines (40) and (41), close to thereby energize knife raising relay CRT in line (40).

CC. As a result of the energization of knife raising relay CRT, the following sequence of events will occur:
  (1) The normally closed CRT contacts in line (17) open without effect since limit switch LS–6 in line (17) has previously been opened as noted above in the description preceding paragraph K.
  (2) The CRT contacts in line (21) close to energize nonrepeat relay CR–5 in line (20). The exact sequence of events accompanying the deenergization of relay CR–5 appears in paragraph QQ hereafter.
  (3) The normally closed CRT contacts in line (27) open without effect since limit switch LS–4 in line (27) has been previously opened as set forth above in the paragraph preceding paragraph J.
  (4) The CRT contacts in line (30) close without effect since limit switch LS–3 in line (28) is open as a result of the action described above in the description preceding Paragraph I.
  (5) The CRT contacts in line (39) close to seal around pressure switch PS–15 in line (40).
  (6) The CRT contacts in line (42) close to energize gauge clamp relay CR–16 in line (42) and timer relay TR–16 in line (43). The functions of these relays will appear at suitable points hereafter.
  (7) Normally closed CRT contacts in line (54) open without effect since band clamp relay CR–15 in line (53) was sealed through pressure switch PS–16 in line (51).

As noted above in paragraph CC–2 control relay CR–5 was energized and this is the first step in starting the shear blade 187 toward its normal top dead center position. However the energization of relays CR–16 and timer TR–16 as noted above in CC–6 relate to the action of the feed table in feeding rod 18' to the shear and will therefore be dealt with first before the action of control relay CR–5 is described.

DD. The energization of relay CR–16 for actuating the gauge clamps results in the following sequence of events:
  (1) The CR–16 contacts in line S–16 close to energize solenoid P. (See also FIG. 18.) The gauge clamp mechanism is shown in FIGS. 7, 9, 11, and 18. The function of the gauge clamp mechanism is to selectively clamp gauging carriage 146 to bands 128 to thereby feed accurately gauged lengths of rod 18' through shear 12. More specifically, as noted above in paragraph V, the gauging carriage 146 was held in a position intermediate the fixed abutment 93 from which it was moved and movable abutment 153 toward which it was moved. While in this position solenoid P is actuated as noted above to cause valve VP (FIG. 18) to shift from the position shown in the drawing to a position wherein it effects communication between conduit 242 leading from high pressure line 112 and conduit 243 leading to the portions of gauge clamp cylinders 244 above pistons 245 therein. The portions of cylinders 244 below pistons 245 are in communication with sump S through conduit 246, valve VP and conduit 247. The subjecting of cylinders 244 to the foregoing hydraulic pressures will cause pistons 245 to move downwardly. Shafts 248 are connected to pistons 245 at one end thereof and on their opposite ends carry brake shoes or gauge clamps 249 (FIG. 9). The upper portions of cylinders 244 (FIG. 9) are rigidly mounted on gauging carriage 146. Also mounted on gauging carriage 146 is an anvil 250. Bands 128 extend in the space between brake shoe 249 and anvil 250. Since the upper ends of cylinders 244 are rigidly mounted on gauging carriage 146 the subjecting of cylinders 244 to the above-described hydraulic pressures will cause gauge clamps 249 to clamp bands between it and anvil 250.
  (2) The CR–16 contacts in line (15) close and carriage forward relay CR–14 in line (14) is again energized. This results in energizing solenoid K (FIG. 19) to drive feed carriage 117 forward at slow speed. It is also to be noted at this time that until such time as all of the work has been performed on rod 18' hydraulic motor 141, which was energized as a result of the actuation of solenoid K, exerts a forward force on bands 128. In other words, whenever the bands are clamped by brakes 220 motor 141 stalls but does not have the flow of hydraulic fluid thereto disrupted. Motor 141 will permit the band clamp mechanism including brake shoes 220 to hold the bands 128 stationary since motor 141 will develop full torque in a stalled condition and remain stalled without difficulty. Thus motor 141 keeps the lower run of bands 128 under tension during the entire bar cycle so that as these bands are advanced in increments, as will be more fully described hereafter, there will be no slack in the lower run of these bands which might adversely affect the accuracy of the length of rod 18' which is advanced.
  (3) The CR–16 contacts in line (41) close to seal around the CRT contacts in line (42) and thereby place relay CR–16 in line (42) under the control of pressures switch PS–15 in line (41).

As as result of subjecting conduits 243 and 246 to the above-described pressures as a result of actuating solenoid P in DD–1 above, pressure, switches PS–16 in conduit 243 and PS–18 in conduit 246 will be actuated. Pressure switch PS–16 is in lines (50) and (51) and pressure switch PS–18 is in line (60). PS–18 will open without effect on the circuit since CR–17 in lines (60) was not energized. PS–16 in line (50) will have no immediate effect since limit switch LS–22 in line (50) is open, limit switch LS–22 (FIG. 18) being opened when the bands 128 are clamped by brake 220. Furthermore pressure switch PS–16 in line (50) will have no immediate effect because normally closed contacts CR–3 in line (50) will open at approximately the same time as the actuation of pressure switch PS–16 because of the action of shear 12 which will be subsequently described. However the contacts of pressure switch PS–16 in line (51) open with the immediate result that relay CR–15 in line (53) which controls the band clamps is deenergized.

EE. Since relay CR–15 in line (53) is deenergized the following sequence of events will occur:

(1) The CR–15 contacts in line S–13 will open to deenergize solenoid L and cause the band clamps associated with cylinders 218 to release bands 128. More specifically when solenoid L is deenergized it will return valve VL, which it controls, to the position shown in FIG. 18 wherein high pressure hydraulic fluid is supplied to the portion of cylinder 218 below piston 221 through conduit 223, valve VL and conduit 225. Furthermore the portion of cylinder 218 above piston 221 will be vented to sump S through conduit 224, valve VL and conduit 224'. This will cause pistons 221 to rise in cylinders 218 and thereby carry brake or band clamps 220 upwardly to release bands 128.
  (2) The normally closed CR–15 contacts in line (43) reclose without effect since limit switch LS–24 in line (44) is now open, LS–24 having been opened as a result of gauging carriage 146 having moved away therefrom.
  (3) Normally closed CR–15 contacts in line (46) reclose without effect because the CR–14 contacts in line (46) are open.
  (4) CR–15 contacts in line (51) open without effect since pressure switch PS–16 in line (51) has previously opened, as noted above.

At this point of the operation of feed table 11 the gauging carriage 146 has been retracted by the action of cylinder 164 to the point where it has engaged crop cut limit switch LS–23 and bands 128 have been clamped by the gauge clamp mechanism including cylinder 244 and its associated structure to thereby firmly secure gauging carriage 146 to bands 128. From line (50) in FIG. 30 it can be seen that the gauging cylinder 164 can move gauging carriage 146 to the right since movable shear knife 187 is raised clear of rod 18' as will appear more fully hereafter. More specifically, the energization of gauge cylinder retracting relay CR–18 depends upon when contacts CR–3 in line (50) reclose, said contacts being energized when the brake relay CR–3 in line (19) again blocks brake 190 in its top dead center position.

FF. As noted above in Paragraph CC–2 relay coil CR–5 was energized and as a result the following sequence of events will occur:

(1) The normally closed CR–5 contacts in line (19) will open without effect since contacts CR–8 in line (19) remained open.
(2) The CR–5 contacts in line (22) close to seal around contacts CRT in line (21).
(3) Normally closed CR–5 contacts in line (24) open without effect since CRK contacts in line (24) are open.
(4) Normally closed CR–5 contacts in line (28) open without effect since CR–2 contacts in line (28) are open.

At the time that relay CR–5 was energized in Paragraph CC–2, limit switch LS–5 mounted on the front frame of shear 12 and located in line (20) was closed by the action of duration cam CLS–5 on the shaft 183' of the shear and as a result relay CR–3, for energizing the brake, was energized at the same instant that relay CR–5 was actuated.

GG. As a result of the energization of relay CR–3 associated with shear brake 190, the following sequence of events will occur:

(1) The CR–3 contacts in line S–5 will close to energize solenoid C to release the brake on the shear in the manner noted above by permitting the compressed air in communication therewith to be dumped in the manner noted above.
(2) The CR–3 contacts in line (6) close to seal around push button PB–4 in line (5).
(3) The CR–3 contacts in line (10) close to seal around limit switch LS–19 in line (11) and thereby hold relay CRK energized.
(4) The CR–3 contacts in line (22) close without effect since normally closed CRK contacts in line (22) are open.
(5) The CR–3 contacts in line (23) close without effect since the CRK contacts in line (24) are open.
(6) The CR–3 contacts in line (24) close without effect since the CRK contacts in line (24) are open.
(7) The CR–3 contacts in line (50) open to prevent the energization of gauge cylinder retract relay CR–18 during the stroke of the shear 12 in raising movable knife 187 to top dead center.

The releasing of the brake on the shear in accordance with GG–1 above results in the actuation of limit switch LS–3 associated with the brake and located in line (28), and since limit switch LS–4 in line (29) associated with the duration cam CLS–4 is closed and since the CRT contacts in line (30) are closed, there is an immediate energization of clutch CR–4 in line (28), this relay controlling the action of clutch 189 on the shear.

HH. The energization of relay CR–4 will cause the following sequence of events:

(1) The CR–4 contacts in line S–6 will energize a solenoid D to cause the clutch 189 to engage. More specifically as noted above the clutch is actuated by compressed air and a suitable valve VD is associated with solenoid D which permits communication between the clutch and a source of compressed air when solenoid D is actuated. As a result of the energization of clutch 189, the flywheel 182 is engaged with shaft 183 (FIG. 26A) and through the suitable mechanical linkage within shear 12, movable knife 187 is caused to commence its travel from its bottom dead center position toward its top dead center position.
(2) The CR–4 contacts in line (18) close without effect.
(3) The CR–4 contacts in line (20) close without effect because coils CR–3 and CR–5 have been previously energized.
(4) The CR–4 contacts in line (29) close without effect since the CRK contacts in line (29) are open.
(5) The CR–4 contacts in line (56) close without effect since the CR–8 contacts in line (56) are open.

As a result of the foregoing actions, the clutch 189 is now engaged and the brake 190 is disengaged to cause movable knife 187 to move toward the top of its stroke as noted above. The next step which occurs is that the duration cam CLS–4 on the shaft of shear 12 causes the contacts of limit switch LS–4 in line (29) to open and the contacts of limit switch LS–4 in line (27) to close. The LS–4 contacts in line (27) close without effect since the CRT contacts in line (27) are still open. However the LS–4 contacts in line (29) open to thereby deenergize clutch relay CR–4 in line (28).

II. The deenergization of relay CR–4 which controls the clutch will produce the following sequence of actions:

(1) The CR–4 contacts in line S–6 will open to deenergize solenoid D to thereby disengage the clutch.
(2) The CR–4 contacts in line (18) open without effect.
(3) The CR–4 contacts in line (20) open without effect on the circuit since relay CR–3 and CR–5 are sealed through the CRT contacts in line (21).
(4) The CR–4 contacts in line (29) open without effect since the CRK contacts in line (29) are open.
(5) The CR–4 contacts in line (56) open without effect since the CR–8 contacts in line (56) are open.

After the foregoing sequence of events the shear will continue to coast with both the clutch 189 and brake 190 disengaged until a point is reached where the duration cam CLS–5 mounted on the machine releases limit switch LS–5 in line (20). This will immediately cause brake actuating relay CR–3 which is in line (19) to be deenergized.

JJ. The deenergization of relay CR–3 in line (19) causes the following actions:

(1) The CR–3 contacts in line S–5 open to deenergize solenoid C and reset the brake 190 to stop the shear with movable blade 187 at the top dead center.
(2) The CR–3 contacts in line (6) open without effect and push button PB–4 is effective.
(3) The CR–3 contacts in line (10) open without effect since knife lowering relay CRK in line (11) is sealed through contacts CRG in line (12).
(4) The CR–3 contacts in line (22) open without effect since the CRK contacts in line (22) are open.
(5) The CR–3 contacts in line (23) open without effect since the CRK contacts in line (24) are open.
(6) The CR–3 contacts in line (24) open without effect since the CRK contacts in line (24) are open.
(7) The CR–3 contacts in line (50) will reclose and immediately energize gauge cylinder retracting relay CR–18 in line (50) to thereby cause the gauging cylinder 164 (FIG. 18) to move gauging carriage 146 from its crop cut position wherein it was stopped by limit switch LS–23 to a position wherein a small portion of the end of rod 18' is pushed through the machine.

However, the shear 12 has now moved the movable knife 187 to its top dead center position wherein the lower edge thereof lies above rod 18' so that the latter may be pushed through the shear between said upper knife 187 and lower knife 188. The retraction of the gauging carriage 146 as a result of step JJ–7 above will cause the rod or bar 18' to be pushed through shear 12 a small distance so that a crop cut can be effected on the end thereof. At this point it is to be again noted that many times the end of a rolled bar such as 18' is imperfect in that it may either not be square or may have a seam therein which would render it useless for subsequent forging. It is this portion of the bar 18' which is removed during the crop cut. The length of the crop cut is determined by the physical distance moved by the gauging carriage 146 between the actuation of limit switch LS–23 (FIG. 18) and the actuation of limit switch LS–7 mounted on movable block 153. It will be appreciated that by moving LS–23 to any desired adjusted position the length of crop cut can be adjusted for any particular type of material. It is to be further noted that the crop cut is effected automatically in view of the sequence of events which were described heretofore and which will be further described hereafter. The effecting of the crop cut in an automatic manner as a result of automatic operation of the instant apparatus greatly reduces the time required in the effecting of the crop cut and thereby increases the productive capacity of the shear. This can be more fully appreciated when it is considered that in most instances in the past it was required to feed a bar such as 18' through the machine manually in order to provide for a crop cut. This manual feeding not only was time consuming but also required the services of an operator to effect the crop cut, thereby greatly increasing production costs.

KK. After gauge cylinder retracting relay CR–18 has been energized in accordance with JJ–7, the following sequence of events will occur:

(1) The CR–18 contacts in line S–14 will close to energize solenoid M (FIG. 18) to thereby actuate valve VMN in the above-described manner to provide high pressure hydraulic fluid to the portion of cylinder 164 to the left of piston 167 while permitting the portion of cylinder 164 to the right of piston 167 to be exhausted to sump S. This will cause gauging carriage 146 to move to the right from the position at which it was stopped by the action of limit switch LS–23. However, as noted above, the gauging carriage 146 has clamped bands 128 and therefore the movement of gauging carriage 146 to the right will be accompanied by a corresponding movement of the lower run of bands 128 to the right. This will cause feed carriage 117 to advance to the left thereby pushing bar 18' through the separated knives 187 and 188.
(2) The normally closed CR–18 contacts in line (60) open as an electrical interlock to prevent any action which might cause gauging cylinder 164 to move carriage 146 to the left.

As noted above, gauging carriage 146 moves to the right as a result of the action of gauging cylinder 164. This movement to the right will continue until such time as end plate 150 engages limit switch LS–7 which is mounted on movable block 153. After the gauging carriage abuts movable block 153, the gauging cylinder 164 actually stalls out. The actuation of limit switch LS–7 causes it to close to thereby energize shear signal relay CR–8 in line (55).

LL. The energization of relay CR–8 will produce the following sequence of events:

(1) The CR–8 contacts in line (19) will close without effect since the CRK contacts in line (19) are open. This particular contact will under all other conditions, except during the crop cut which is now being described, start the cycle of shear 12 immediately to cause movable blade 187 to descend. However in the present instance wherein the crop cut is being effected, the relay CR–3 in line (19) will be energized after relay contacts CRK in line (19) are deenergized as will appear hereafter.
(2) The CR–8 contacts in line (53) close to energize band clamp relay CR–15 in line (53). The action accompanying this step will be described hereafter.
(3) The CR–8 contacts in line (56) will close without effect since the CR–1 contacts in line (57) and the CR–4 contacts in line (56) are still open.
(4) The CR–8 contacts in line (58) close to energize relay CRC in line (58), this relay setting up the circuit for subsequent automatic feeding of rod 18 through shear 12 in increments after the crop cut has been effected.

As noted above in steps LL–2 and LL–4, relays CR–15 and CRC, respectively, have been energized.

MM. The energization of band clamp relay CR–15 produces the following sequence of events:

(1) The CR–15 contacts in line S–13 close to actuate solenoid L (FIG. 18) to thereby cause the band brakes or clamps 220 to be actuated hydraulically in the above-described manner to engage bands 128 to thereby hold said bands against movement.
(2) The CR–15 contacts in line (43) open without effect.
(3) The CR–15 contacts in line (46) open without effect since the CR–14 contacts in line (46) are open.
(4) The CR–15 contacts in line (51) close without effect since pressure switch PS–16 in line (51) and relay contacts TR–16 in line (52) are still open.

As a result of moving the band clamps 220 into engagement with bands 128, limit switch LS–22, which is mounted on fixed abutment 93 and is in engagement with clamps 220 when the latter are in a released position, is opened. Limit switch LS–22 is located in line (50). The opening of limit switch LS–22 as a result of clamping bands 128 causes gauging cylinder retracting relay CR–18 in line (50) to be deenergized.

NN. The deenergization of gauging cylinder retracting relay CR–18 produces the following sequence of events:

(1) The CR–18 contacts in line S–14 open to deenergize solenoid M (FIG. 18) thereby causing valve VMN to return to its center position shown in the drawings without producing any other effect on the gauging cylinder 164 at this time.
(2) The CR–18 contacts in line (60) reclose without effect since pressure switch PS–18, which is associated with conduit 246, is open.

OO. As noted above in Paragraph LL–4, bar cycle relay CRC in line (58) was energized and the following sequence of events will occur as a result thereof:

(1) The normally closed CRC contacts in line (11) open to deenergize knife lower relay CRK in line (11).
(2) The CRC contacts in line (16) close to seal around contacts CR–16 in line (15) and thereby hold carriage forward relay CR–14 in line (14) energized.
(3) The normally closed CRC contacts in line (21) open to deenergize nonrepeat relay CR–5 in line (20).
(4) Normally closed CRC contacts in line (40) open to deenergize knife raising relay CRT in line (40).
(5) CRC contacts in line (44) close without effect since limit switch LS–24 contacts are open inasmuch as feed carriage 146 is away from fixed abutment 93.
(6) Normally closed CRC contacts in line (49) open so that gauge cylinder retract relay CR–18 cannot be energized through line (49).

41

(7) Normally closed CRC contacts in line (54) open without effect since CR–8 contacts in line (53) are closed to hold band clamp relay CR–15 energized.

(8) CRC contacts in line (57) close to seal around contacts CR–8 in line (58) and thereby hold bar cycle relay CRC in line (58) energized.

In view of the foregoing sequence of events, relays CRK, CR–5 and CRT have become deenergized and taking these in order, the following sequence of events will occur:

PP. After relay CRK, which controls the lowering of movable knife has become deenergized, the following sequence of events will occur:

(1) The CRK contacts in line (17) open without effect because normally closed CRT contacts in line (17) are still open.

(2) Normally closed CRK contacts in line (19) reclose without effect since normally closed CR–5 contacts in line (19) are still open.

(3) Normally closed CRK contacts in line (22) reclose without effect since CR–3 contacts in line (22) are still open.

(4) Normally closed CRK contacts in line (24) reclose without effect since CR–3 contacts in lines (23) and (24) are open.

(5) CRK contacts in line (27) open without effect since CRT contacts in line (27) are open.

(6) Normally closed CRK contacts in line (29) reclose without effect since limit switch LS–4 is open, as noted above.

(7) Normally closed CRK contacts in line (46) reclose without effect since normally closed CR–14 contacts in line (46) are open.

(8) Normally closed CRK contacts in line (60) reclose without effect since pressure switch 18 in line (60) is open.

(9) CRK contacts in line (81) open without effect since limit switch LS–16 in line (81) is held open by the bar on the table.

(10) CRK contacts in line (84) open without effect since relay contacts CR–12 in line (84) are open.

QQ. The deenergization of nonrepeat relay CR–5 in line (20) as noted above in Paragraph OO–3, causes the following sequence of events. Nonrepeat relay CR–5 insofar as automatic operation is concerned, functions as a point of no return device to prevent the shear 12 from being stopped once it has started its cutting stroke as a result of the closing of limit switch LS–5:

(1) The normally closed CR–5 contacts in line (19) reclose and energize brake relay CR–3 in line (19). This action releases the brake as noted above to free movable knife 187 for a down stroke as appears hereafter.

(2) The CR–5 contacts in line (22) open without effect since at this point the CR–3 contacts in line (22) are not yet closed.

(3) The normally closed CR–5 contacts in line (24) reclose without effect but will allow the CR–3 contacts in line (24) to energize hold-down relay CR–1 in line (24) later in the cycle, as will appear hereafter.

(4) Normally closed CR–5 contacts in line (28) reclose without effect since CR–2 contacts in line (28) are open.

At this time because of the action in QQ–1, brake relay CR–3 has been energized to start the shear on its first complete shearing cycle. For an orderly explanation at this point to set forth the action of the gauging mechanism including gauging carriage 146, it is necessary to continue with a further description of the action of the feed table and gauge until the condition is reached where the feed table has achieved all of its functions and waits for the shear 12 to complete its cycle. As noted above, the CRT relay in line (40) for raising the knife 187 was deenergized in Paragraph OO–4.

42

$P_1P_1$. After relay CRT was deenergized, the following sequence of events will occur:

(1) Normally closed CRT contacts in line (17) reclose without effect since CRK contacts in line (17) are open.

(2) CRT contacts in line (21) open without effect since normally closed CRC contacts in line (21) are open.

(3) Normally closed CRT contacts in line (27) reclose without effect since CRK contacts in line (27) are open.

(4) CRT contacts in line (30) open without effect since limit switch LS–4 in line (29) is open.

(5) CRT contacts in line (39) open without effect since normally closed CRC contacts in line (40) are open.

(6) CRT contacts in line (42) open to deenergize relay 16 in line (42) and relay TR–16 in line (43). As noted above, relay CR–16 controls the gauge clamps and as a result of the deenergization thereof sequence of events occurs as will be described in paragraph RR hereafter.

(7) CRT contacts line (54) reclose without effect since normally closed contacts CRC in line (54) are open.

RR. After gauge clamp relay CR–16 has been deenergized in Paragraph $P_1P_1$–6, the following sequence of events will occur:

(1) The CR–16 contacts in line S–16 open in deenergize solenoid P to release the gauge clamps 249 (FIG. 18). More specifically, when solenoid P is deenergized valve VP returns to the position shown in FIG. 18 wherein high pressure hydraulic fluid is routed to the portion of cylinder 244 below piston 245 and the hydraulic fluid above piston 245 is routed to the sump. This will cause brakes or clamps 249 to be lifted to free bands 128.

(2) The CR–16 contacts in line (15) open without effect since the CRC contacts in line (16) are closed. This permits the carriage forward relay CR–14 to remain energized.

(3) The CR–16 contacts in line (41) open without effect since pressure switch PS–15 contacts in line (41) are open.

SS. The deenergization of relay TR–16 in line (43) in accordance with step $P_1P_1$–6 cause the following sequence of events. At this point it is to be noted that relay TR–16 is a timer relay for maintaining a circuit across gauge clamp relay CR–16 in line (42) when the gauge clamps are initially energized. In this respect it can be seen from FIG. 18 that a momentary surge in conduit 243 may cause pressure switch PS–16 in line (51) to open prematurely and thereby cause hand clamp CR–15 in line (53) to be deenergized prematurely. However the exact reason for this type of action will become apparent hereafter when the interaction between the band clamps 220 and the gauge clamps 249 are described during the incremental feeding of rod 18' to shear 12. However at this point it is to be noted that the deenergization of timer TR–16 in line (43) performs the following function:

(1) Normally closed timer TR–16 contacts in line (52) will reclose immediately and seal around CR–8 contacts in line (53) to hold hand clamp relay CR–15 line (53) energized.

The action of gauge clamp relay CR–16 and the deenergization of solenoid P as set forth above in Paragraph RR–1 results in the returning of valve VP, controlled by solenoid P, to the position shown in FIG. 18 as noted above. This in turn will cause pressure switch PS–16 in conduit 243 to be deactuated, thereby causing its contacts in lines (50) and (51) to return to the positions shown in said lines. Furthermore pressure switch PS–18 in conduit 246 will be actuated as a result of high pressure hydraulic fluid in conduit 246 to thereby return to the position shown in line (60). The actuation of pressure switch PS-16 in the above-described manner will have no effect since limit switch LS-22 in line (50) was previously opened as a result of the movement of band clamps 220 away from said switch during the step of clamping bands 128 as set forth above in Paragraph MM-1. The actuation of pressure switch PS-16 in line (51) will have no effect because this merely duplicates the action of the TR-16 contacts in line (52) to supply current to the band clamp relay CR-15 in line (53). However the closing of pressure switch PS-18 in line (60) will effect the immediate energization of gauge cylinder extend relay CR-17 in line (60).

TT. As a result of the energization of relay CR-17, the following sequence of events will occur:

(1) The CR-17 contacts in line S-15 will energize solenoid N to cause piston 167 therein to move to the left and thereby move gauging carriage 146 to the left also until it contacts limit switch LS-24 when said gauging carriage 146 comes to rest against fixed abutment 93. More specifically the energization of solenoid N causes valve VMN to shift from the position shown in FIG. 18 to the position wherein it effects communication between conduit 165 leading from the source of hydraulic pressure and conduit 166 leading to the portion of gauging cylinder 164 to the right of piston 167. Valve VMN will also cause communication between the portion of cylinder 164 to the left of piston 167 and sump S through conduits 168 and 215. The subjecting of gauging cylinder 164 to the foregoing differential in pressure across piston 167 thereof will cause gauging carriage 146 to move to the left.

(2) The CR-17 contacts in line (50) will open as an electrical interlock to thereby prevent the energization of gauging cylinder retracting relay CR-18 in line (50).

After the gauging carriage 146 has moved fully to the left and has come into abutting engagement with face 151 of fixed abutment 93, limit switch LS-24 having contacts in lines (44) and (60) will be actuated. As a result the contacts of limit switch LS-24 in line (69) will open to thereby deenergize gauge cylinder extending relay CR-17 while piston 167 thereof is as far to the left as it can go in FIG. 18. The contacts of limit switch LS-24 in line (44) will close to energize gauge clamping relay CR-16 in line (42) and time delay relay TR-16 in line (43).

UU. As a result of the energization of gauge clamp relay CR-16 in line (42) the following sequence of events will occur:

(1) The CR-16 contacts in line S-16 will close to energize the gauge clamping solenoid P to thereby cause the gauge clamp assembly to hold bands 128. More specifically when solenoid P (FIG. 18) is energized, valve VP will shift from the position shown to a position wherein it causes high pressure hydraulic fluid to act in the portion of gauge clamping cylinder 244 above piston 245 while permitting the portion of said cylinder below said piston to communicate with sump S as described in detail above. This will cause gauge clamps 249 to move downwardly and thereby engage bands 128 between them and anvil 250. It is to be especially noted that this action occurs while the band clamps 220 are engaging bands 128.

(2) The CR-16 contacts in line (15) close without effect since the CRC contacts in line (16) are closed.

(3) The CR-16 contacts in line (41) close without effect since pressure switch PS-15 in line (41) is open.

VV. As noted above in the paragraph preceding Paragraph TT, time delay relay TR-16 in line (43) was energized and this will cause the following to occur:

(1) The normally closed TR-16 contacts in line (52) will open after a time delay.

The purpose of maintaining the time delay TR-16 contacts in line (52) closed for a predetermined period of time is to insure that the band clamps 220 remain in engagement with bands 128 for a period of time after the gauge clamps 249 have been energized thereby insuring that the bands 128 are held by either the band clamps 220 or the gauge clamps 249. The foregoing action insures that the bands are under control of either set of clamps to thereby prevent the feed carriage 117 from drifting. More specifically in the foregoing respect the maintaining of the TR-16 contacts in line (52) closed maintain band clamp relay CR-15 in line (53) energized for a predetermined period of time. Upon opening of contacts TR-16 in line (52) relay coil CR-15 which controls the band clamps may or may not be deenergized. More specifically if the shear 12 is still in its cycle wherein it is effecting a downward movement to shear the end of rod 18', the CR-8 contact in line (53) will be energized to thereby maintain band clamp relay CR-15 energized to thereby cause band clamps 220 to firmly engage bands 128. This is necessary to prevent movement of feed carriage 117 during the actual shearing cycle. Relay contacts CR-8 in line (53) remain energized in the foregoing respect when shear signal relay CR-8 in line (55) is energized as noted above in Paragraph LL-3. Furthermore it is to be noted that CR-4 contacts in line (56) remain energized during the shear cycle because relay CR-4, line (28), which is controlled by the engagement of the clutch 189, causes said CR-4 contacts in line (56) to remain closed. Thus band clamp relay CR-15 will remain energized during the actual shearing stroke. However it is to be also noted that if pressure switch PS-16 (FIG. 18) has not been opened as a result of the action of solenoid P as noted above in Paragraph UU-1, the pressure switch PS-16 will hold band clamp relay CR-15 energized because of the contacts of PS-16 in line (51). Normally, however, for the average gauge length of stock being fed to shear 12, band clamp relay CR-15 will be under the control of relay contacts TR-16 in line (52) and after a delay, which is set into delay timer TR-16, which is sufficient to insure that the gauge clamp relay CR-16 in line (42) has caused solenoid P in line S-16 to be opened for a sufficiently long time to build up full clamping pressure of gauge clamps 249, timed contacts TR-16 in line (52) will open to deenergize band clamp relay CR-15 in line (53) to thereby cause the actuation of solenoid L (FIG. 18) to return valve VL to the position shown to thereby cause the band clamp 220 to release bands 128.

The physical sequence which is achieved as a result of the foregoing action is to cause the band clamps 220 to remain in engagement with bands 128 under full pressure and to cause gauging carriage 146 to be fully extended to the left against fixed abutment 93 and to cause the gauge clamps 249 on gauging carriage 146 to be fully clamped before the band clamps 220 are released. The band clamps 220 will not release, in view of the action of shear signal relay CR-8, until shear 12 has completed its cycle as will be more fully understood at appropriate points hereafter. Furthermore, the gauging carriage 146 will not be able to move to the right in FIG. 18 to advance rod 18' into shear 12 until shear 12 has completed its stroke, which at this point is the crop cut, as described above and as will be more fully described hereafter.

Reverting now to Paragraph QQ-1, it was seen there that relay coil CR-3, which caused the brake 190 to release, was energized to initiate a full normal shear cycle.

WW. The energization of relay CR-3 in line (19) will cause the following sequence of events:

(1) The CR-3 contacts in line S-5 close to energize solenoid C to release brake 190 in the manner described in detail above.

(2) The CR-3 contacts in line (6) close to seal around push button PB-5 in line (3).

45

(3) The CR-3 contacts in line (10) close without effect since normally closed CRC contacts in line (11) are open.
(4) The CR-3 contacts in line (22) close without effect since the CR-5 contacts in line (22) are open.
(5) The CR-3 contacts in line (23) close without effect since pressure switch PS-2 in line (23) is open.
(6) The CR-3 contacts in line (24) close to energize hold-down relay CR-1 which causes rod 18' to be firmly held by a hold-down mechanism on shear 12 as described more fully hereafter under XX-1.
(7) Normally closed CR-3 contacts in line (50) open to prevent relay CR-18 from causing gauging cylinder 164 to retract during the cycle of shear 12.

XX. As noted above in WW-6, relay CR-1 in line (24) was energized and as a result the following sequence of events will occur:

(1) The CR-1 contacts in line S-3 will close to energize solenoid A (FIG. 21) to thereby cause hold-down 310 to move into engagement with the top of pressure block 227 and also cause work support 312 to engage rod 18'. More specifically hold-down 310 is mounted for vertical movement on suitable guides of shear 12. Hold-down 310 (FIG. 31) is of inverted U-shaped configuration having a top portion 310' and a pair of downwardly extending legs 311' at opposite sides thereof. The opposite legs 311' extending from top central portion 310' of hold-down 310 have the central portions of levers 313 pivoted thereon at 313'. First ends of levers 313 are pivotally secured to piston rods 314 (FIGS. 21 and 31) at 314' and the other ends are pivotally secured to work support 312 at 312'. After solenoid A is energized, valve VA (FIG. 21) moves from the position shown in the drawings to a position wherein it permits communication between conduit 306 leading from compressed air source 300 and conduit 307 leading to air oil tank 308. This will cause compressed air to be supplied to tank 308 which in turn forces the oil therein into conduit 309 leading to the portions of hold-down cylinders 315 above pistons 316. Valve VA also causes the portions of cylinders 315 below pistons 316 to be in communication with air oil tank 317 through conduits 318 and 319. The air in air oil tank 317, after valve VA has shifted, is vented to the atmosphere through conduit 320 and valve VA. Thus the existence of a differential pressure on pistons 316 causes them to move downwardly and move piston shaft 314 (FIG. 31) downwardly also which causes surface 311 of hold-down 310 to move into engagement with pressure block 227 and thereafter work support 312 will be moved upwardly as a result of rotation of levers 313 to support the underside of rod 18'. The specific structure of the hold-down 310 is more fully described in copending application Serial No. 57,039.
(2) The CR-1 contacts in line (25) close to seal around the CR-3 contacts in line (24) thereby maintaining the hold-down relay CR-1 energized regardless of subsequent opening of the CR-3 relays in line (24).
(3) The CR-1 contacts in line (57) close to hold the shear signal relay CR-8 energized in line (55).

It is to be noted at this point that pressure switch PS-2 mentioned above in WW-5 is physically located in communication with the air in air oil tank 308 (FIG. 21), the pressure of which is controlled by valve VA actuated by solenoid A. When sufficient movement of the hold-down in the manner described above in XX-1 has been effected so that the air pressure in cylinder 308 builds up to a value of approximately 80 p.s.i., pressure switch PS-2 will close and energize relay CR-2 in line (23), this relay controlling a booster which causes the hold-down 310 (through pressure block 227) and work support 312

46 to exert massive forces on the workpiece. The manner in which this is effected will be described hereafter at YY-1.

YY. As a result of energizing booster relay CR-2, the following sequence will occur:

(1) The CR-2 contacts in line S-4 will close to energize solenoid B which will cause the oil pressure in hold-down cylinders 315 to rise to a level of between 250 and 500 p.s.i. More specifically, from FIG. 21 it can be seen that when solenoid B is energized, valve VB will move from the position shown in FIG. 21 to a position where it causes compressed air to be supplied to the portion of booster cylinder 320 to the left of piston 321 while permitting the portion of cylinder 320 to the right of piston 321 to be vented. This will cause piston 321 and stem 322 to move to the right in FIG. 21 so that the end 322' thereof enters portion 323 of booster 320 to thereby exert additional pressure on the hydraulic fluid in conduit 309 to thereby raise the pressure of the hydraulic fluid in cylinders 315.
(2) The CR-2 contacts in line (22) close to seal around pressure switch PS-2 in line (23).
(3) The CR-2 contacts in line (28) close without effect pending the actuation of limit switch LS-3 in line (28).

As noted above in WW-1 solenoid C was energized to release the brake 190 on the shear 12. This action will close limit switch LS-3 in line (28) to thereby cause clutch relay CR-4 in line (28) to be energized in view of the fact that CR-2 contacts in line (28) were closed at YY-3.

ZZ. As a result of the energization of clutch relay CR-4 the following sequence will be obtained:

(1) The CR-4 contacts in line S-6 will close to energize solenoid D which as noted above permits compressed air to be supplied to clutch 189, and thus the clutch 189 will be energized and start rotation of the machine which in turn will result in movable knife 187 starting its downward travel from top dead center.
(2) The CR-4 contacts in line (20) close without effect since the CR-5 contacts in line (19) are closed.
(3) The CR-4 contacts in line (18) close without effect since selector switch contact SS-2 in line (19) is closed.
(4) The CR-4 contacts in line (29) close without effect since limit switch LS-4 is open.
(5) The CR-4 contacts in line (56) close to seal around hold-down relay CR-1 thereby holding shear signal relay CR-8 in line (55) energized.

As a result of the foregoing sequence, the hold-down 310 has been engaged, the clutch 189 has been engaged and downward movement of movable knife 187 has commenced. At this time the duration cams CLS-4 and CLS-5 on shaft 183' of shear 12 actuate limit switches LS-4 in line (29) and LS-5 in line (20), respectively during the normal shearing cycle. Limit switch LS-4 is the first to be contacted, thereby opening on line (27) without effect since CRK contacts in line (27) are open, and closing on line (29) to seal around booster contacts CR-2 in line (28). Thereafter limit switch LS-5 is contacted by cam CLS-5 to immediately energize nonrepeat relay CR-5. As noted above, once nonrepeat relay CR-5 is energized, the shear 12 is required to complete a shear cycle and cannot be stopped unless emergency stop button PB-1 located between lines (1) and (2) is actuated.

AAA. The energization of nonrepeat relay CR-5 produces the following sequence:

(1) The normally closed CR-5 contacts in line (19) open without effect since the CR-4 contacts in line (20) are closed.
(2) The CR-5 contacts in line (22) close to seal nonrepeat relay CR-5 in line (20), brake relay CR-3 in line (19) through limit switch LS–5 in line (20).
(3) Normally closed CR–5 contacts in line (24) open to deenergize hold-down relay CR–1 in line (24).
(4) normally closed CR–5 contacts in line (28) open without effect since limit switch LS–4 in line (29) is closed.

BBB. As noted above in AAA–3, relay CR–1 was deenergized and will produce the following sequence:

(1) The CR–1 contacts in line S–3 open to deenergize solenoid A. However, at this point the deactuation of solenoid A has no physical effects on the shear since the booster 320 acts as a check valve to continue to hold the hold-down 310 and workpiece support 312 under pressure.
(2) The CR–1 contacts in line (25) open without effect.
(3) The CR–1 contacts in line (57) open without effect since the CR–4 contacts in line (56) are closed as noted above in ZZ–5.

In view of the foregoing actions, full control of the cycle of shear 12 has been placed under the control of duration cams CLS–4 and CLS–5 which are now holding limit switch LS–4 and LS–5, respectively, closed. As the ram 186 of shear 12 is lowered, a point will be reached wherein the movable knife 187 engages the workpiece. As the movable knife 187 moves through rod 18′ in separating the workpiece from the end thereof, the hydraulic cylinders 315 which actuate the work hold-down 310 are forced to retract during the pushing of the workpiece support downwardly. Since the booster 320 is operative with stem 322′ located in portion 323, there will be a rise in hydraulic pressure to the 2000–3000 p.s.i. range as the workpiece at the end of rod 18′ moves downwardly during the shearing and tends to move piston shafts 314 upwardly against the confined hydraulic fluid in cylinders 315. Thus the workpiece and the bar are clamped against both the movable and stationary knives, respectively, under massive forces and the separation of the workpiece from the parent bar 18′ will normally be complete after the movable knife 187 has penetrated only a small fraction of the bar's thickness. In other words, in order to shear the workpiece from the end of the rod 18′, it is only necessary to penetrate bar 18′ a small amount and the remainder of the separation occurs as a result of cleavage. Certain of the foregoing is fully described in copending application Serial No. 57,039. After the cleavage has been effected, the descending shear ram 186 contacts and opens limit switch LS–1 mounted on the rear frame of the machine (FIG. 26) with the immediate effect of deenergizing relay coil CR–2 in line (23) which controls the booster. Switch LS–1 is contacted after the small amount of knife penetration sufficient to produce cleavage, as noted above, has been effected.

CCC. When relay CR–2 has been deenergized in the foregoing manner, the contacts associated therewith will function as follows:

(1) The CR–2 contacts in line S–4 will open to deenergize solenoid B, and cause valve VB to return to the position shown in FIG. 21, thereby causing booster piston 321 to move to the left to release the high pressure hydraulic fluid on the hold-down cylinders and allowing them to start to rise to the top of their stroke in preparation for the next machine cycle. At this time it will be noted that the workpiece and rod 18′ are no longer engaged by massive forces since the work hold-down 310 and the workpiece support 312 no longer have pressure supplied to them. In this respect it will be noted from BBB–1 that solenoid A was deenergized and therefore returned valve VA to the position shown in the drawings to thereby cause air oil tank 308 to be vented through conduit 307 and valve VA thereby causing the hydraulic pressure above pistons 316 to be relieved since booster cylinder 320 returned to the position shown in FIG. 21 as a result of the deenergization of solenoid B. Furthermore valve VA will cause communication between compressed air line 306 and conduit 320 leading to air oil tank 317 to thereby cause low pressure oil to be applied to the portions of hold-down cylinders 315 below pistons 316 to thereby raise pistons 316 and raise hold-down 310 (FIG. 31) as a result of the upward movement of piston shafts 314.
(2) The CR–2 contacts in line (22) open without effect since limit switch LS–1 in line (24) is open.
(3) The CR–2 contacts in line (28) open to place final control of clutch relay CR–4 under the action of duration cam CLS–4 controllingg LS–4 in line (29).

The shear 12 will continue its cycle to a point where the clutch duration cam CLS–4 loses contact with LS–4 in line (29) and allows this limit switch to open, thereby deenergizing relay coil CR–4 in line (28).

DDD. Upon becoming deenergized, relay CR–4 will produce the following sequence:

(1) The CR–4 relays in line S–6 open to deenergize solenoid D and thereby cause the clutch 189 to release.
(2) The CR–4 contacts in line (20) open without effect since brake solenoid CR–3 is now held energized through limit switch LS–5 in line (20).
(3) The CR–4 contacts in line (18) open without effect for the same reason given in DDD–2.
(4) The CR–4 contacts in line (29) open without effect since limit swicth LS–4 contacts in line (29) are open.
(5) The CR–4 contacts in line (56) open to deenergize shear signal relay CR–8 in line (55). The deenergization of CR–8 will signify that shear 12 has completed its cycle so that the feed table 11 can commence its subsequent action, as noted below in Paragraph GGG.

After the foregoing, the shear will continue to coast, with both the clutch and the brake disengaged, to a point where the second duration cam CLS–5 loses contact with limit switch LS–5 in line (20). In opening, LS–5 will deenergize brake relay coil CR–3 in line (19).

EEE. As a result of the deenergization of brake relay CR–3, the following sequence will be obtained:

(1) The CR–3 contacts in line S–5 will open to deenergize solenoid C to thereby cause the brake 190 to reengage and cause the shear 12 to stop at top dead center.
(2) The CR–3 contacts in line (6) open to thereby render push button PB–4 in line (5) effective to stop the motor 169 of shear 12 in the event this action is desired.
(3) The CR–3 contacts in line (10) open without effect since the CRC contacts in line (11) are open.
(4) The CR–3 contacts in line (22) open to deenergize nonrepeat relay CR–5 in line (20).
(5) The CR–3 contacts in line (23) open without effect since the booster relay CR–2 in line (23) was previously deenergized as noted above in the paragraph preceding CCC.
(6) The CR–3 contacts in line (24) open without effect since the CR–5 contacts in line (24) are open.
(7) The normally closed CR–3 contacts in line (50) reclose and allow gauge cylinder retract relay CR–18 to again become energized. As will be noted hereafter, the energization of this relay will cause the gauging carriage 146 to move to the right to feed a predetermined length of rod 18′ through shear 12.

As noted above in EEE-4, relay CR-5 was deenergized.

FFF. The contacts associated with nonrepeat relay CR-5 will produce the following sequence:
(1) Normally closed CR-5 contacts in line (19) reclose without effect since the CR-8 contacts in line (19) are open.
(2) The CR-5 contacts in line (22) open without effect since the brake relay contacts CR-3 in line (22) are open.
(3) The CR-5 contacts in line (24) reclose without effect since the brake relay contacts CR-3 in line (24) are open.
(4) The CR-5 contacts in line (28) reclose without effect since the booster contacts CR-2 in line (28) are open.

As noted above in DDD-5, shear signal relay CR-8 was deenergized.

GGG. After relay CR-8 is deenergized, the following sequence of events will occur:
(1) The CR-8 contacts in line (19) open without effect since the CR-5 contacts in line (19) are open.
(2) The CR-8 contacts in line (53) open to deenergize band clamp relay CR-15 providing that the gauging mechanism has reached a point where this is permitted as set forth in the explanation following paragraph VV.
(3) The CR-8 contacts in line (56) open without effect since the CR-4 contacts in line (56) are open.
(4) The CR-8 contacts in line (58) open without effect since the CRC contacts in line (57) are closed.

At this point the shear 12 has completed the crop cut and arrived at the top of its stroke. As set forth above in the paragraph following VV, gauging carriage 146 is fully to the left against fixed abutment 93 and the gauge clamps 249 have engaged bands 128. Upon subsequent energization of gauging cylinder 164 gauging carriage 146 will move to the right and move the lower run of bands 128 to the right also. Furthermore at this time hydraulic motor 141 will be engaged in forward to also move carriage 117 to the left in FIG. 19 because of the engagement between motor 141 and bands 128. At this time it is to be again noted that the movement of gauging carriage 146 to the right will continue until plate 150 thereof moves into engagement with movable block 153. Movable block 153 is adjusted by means of the gearing associated therewith which drives threaded shaft 163 to any desired position so that the length of rod 18′ which will be advanced through shear 12 is a function of the distance between the facing surfaces of fixed block 93 and movable block 153. It is in this manner that predetermined gauge lengths are obtained so that a plurality of intermittent shearing operations will be effected on rod 18′ as it is advanced through shear 12. The normal gauging cycle in moving movable carriage 146 to the right in FIG. 18 starts with relay CR-18, the gauge cylinder retracting relay becoming energized.

HHH. After gauge cylinder retracting relay CR-18 has become energized, the following sequence will occur:
(1) The CR-18 contacts in line S-14 close to energize solenoid M (FIG. 18). As noted above, an hydraulic circuit will be set up to cause piston 167 in gauging cylinder 164 to move to the right and thereby drive gauging carriage 146 to the right also until such time as it abuts movable abutment 153. It is deemed that a detailed explanation of the hydraulic flow at this point is unnecessary because it has already been set forth with respect to other sequences.
(2) The CR-18 contacts in line (60) open to provide an electrical interlock against energization of gauge cylinder extend relay CR-17 in line (60).

As noted above prior to Paragraph HHH, the gauging cylinder 164 in retracting pulls gauging carriage 146 to the right and since bands 128 are clamped to gauging carriage 146 by clamps 249, bands 128 will cause feed carriage 117 to advance rod 18′ through shear 12. The foregoing is effected at a relatively high speed. At this point it will also be noted that the rod in advancing through the shear is held against movement by its own momentum by pressure block assembly 226 (FIG. 24), which was described in detail above. However in order to insure that the momentum of rod 18′ is at a minimum toward the end of the advancing stroke, an hydraulic deceleration valve is provided. This will insure that the end of rod 18′ will remain in engagement with probe 123 of pusher carriage 117 at the end of the stroke because the deceleration valve 252 (FIG. 18) causes the feed carriage to decelerate and thereby also causes rod 18′ pushed thereby to decelerate so that it will not tend to continue its movement through pressure block 226 after feed carriage 117 stops when gauging carriage 146 engages movable abutment 153. As can be seen from FIGS. 7, 11, and 18, a cam 253 is affixed to plate 150 of gauging carriage 146. The deceleration valve 252 is mounted on the frame of the machine so that cam 253 will engage stem 254 of said valve prior to the time that gauging carriage 146 engages movable abutment 153. It will be noted from FIG. 11 that cam 253 includes a cam arm 254 and a flange 255 which secures said cam arm to plate 150. Cam 253 is inclined at an angle to valve stem 254 so that the closer gauging carriage 146 comes to movable block 153 the greater will the restriction to fluid flow be obtained through valve 252.

More specifically, whenever the gauging cylinder 164 has the portion to the left of piston 167 pressurized as a result of solenoid M having shifted valve VMN, in the manner described in detail above, the exhaust from gauging cylinder 164 to the right of piston 167 will be through conduit 166′, conduit 256, valve 252, conduit 257, conduit 166, valve VMN and conduit 215 to sump S. However before cam 253 engages stem 254 the flow through valve 252 will be unrestricted. However as cam 253 progressively actuates stem 254, valve 252 will gradually close off thereby restricting the flow thereto and causing a portion of the flow to pass through pressure control valve 258. This will provide an hydraulic dampening action to thereby cause piston 167 to slow down and cause gauging carriage 146 to slow down correspondingly. As gauging carriage 146 approaches movable block 153, valve 252 will be practically closed so that gauging carriage 146 will be moving at an extremely slow rate. Thus both the feed carriage 117 and rod 18′ will be moving relatively slow so that the latter possesses relatively little momentum and therefore will not move away from probe 123 when feed carriage 117 stops because the pressure applied by pressure block 226 provides sufficient frictional resistance to movement of rod 18′ to the left to overcome any momentum which it may have when it is not being positively pushed. Thus after the initial crop cut has been effected in the above-described manner, it is absolutely certain that the amount that rod 18′ will advance through shear 12 will be limited by the exact spacing between the opposing faces of fixed block 93 and movable block 153.

After movable carriage 146 reaches face 152 of movable block 153, limit switch LS-7 (FIG. 18) will be closed. Limit switch LS-7 is mounted on block 153 and the contacts thereof are located in line (55). When limit switch LS-7 is closed, relay CR-8 in line (55) is again energized.

III. The energization of shear signal relay CR-8 will produce the following sequence:
(1) The CR-8 contacts in line (19) will close to energize brake relay CR-3 in line (19) to thereby release brake 190 in a manner described in detail above.
(2) The CR-8 contacts in line (53) will close to energize band clamp relay CR-15. The action of relay CR-15 during a shearing action other than the crop cut varies slightly from the action which it produces for the crop cut and therefore this action will be separately described under paragraph JJJ hereafter.
(3) The CR-8 contacts in line (56) close to seal around limit switch LS-7 in line (55).

(4) The CR–8 contacts in line (58) close without effect since CRC contacts in line (57) are closed.

The energization of relay CR–3 in III–1 starts a normal cycle of shear 12 which will follow the exact sequence outlined in Paragraphs WWW through GGG.

As noted above in Paragraph III–2, band clamp relay CR–15 was energized. This is the first step in starting toward the next gauging cycle wherein another length of rod 18' is fed into shear 12 after the length which was previously fed in has been sheared. Since, as noted above, the gauging action varies slightly from the crop cut procedure, it is outlined in the following paragraphs.

JJJ. After band clamp relay CR–15 in line (53) was energized in III–2 the following sequence will occur:

(1) The CR–15 contacts in S–13 close to energize solenoid L (FIG. 18) to thereby move valve VL from the position shown in the drawings to the position wherein it causes band clamp cylinder 218 to be actuated, as described in detail above, to cause band clamps 220 to engage bands 128. After band clamps 220 engage bands 128 the gauge carriage 146 may be moved from right to left in FIG. 18. As noted above, it is always necessary that either the band clamps or the gauge clamps be engaged with bands 128 to thereby insure accuracy of cuts.

(2) The CR–15 contacts in line (43) open without effect since limit switch LS–24 in line (44) is open while gauging carriage 146 is away from fixed block 93.

(3) The CR–15 contacts in line (46) open without effect since CR–14 contacts in line (46) are open.

(4) The CR–15 contacts in line (51) close without effect since timer relay contacts TR–16 in line (52) and pressure switch PS–16 contacts in line (51) are open.

The actuation of band clamps 220 under JJJ–1 above will result in the energization of pressure switch PS–15 in conduit 224 in the manner noted above. Pressure switch PS–15 has contacts in lines (40) and (41). The moving of these contacts results in the deenergization of gauge clamp relay CR–16 in line (42) and time delay relay TR–16 in line (43). At the same time limit switch LS–22 in line (50) (see also FIG. 18), opens to deenergize gauge cylinder retract relay CR–18 in line (50) as a result of band clamps 220 moving downwardly into engagement with bands 128.

KKK. As a result of deenergizing gauge clamp relay CR–16, the following sequence will occur:

(1) The CR–16 contacts in S–16 open to deenergize solenoid P (FIG. 18) to thereby cause valve VP to return to the position shown in the drawings wherein gauge clamp cylinder and piston assembly 244–245 lifts gauge clamps 249 out of engagement with bands 128. It is to be noted that this occurs only after band clamps 220 have already engaged bands 128.

(2) The CR–16 contacts in line (15) open without effect since CRC contacts in line (16) are closed.

(3) The CR–16 contacts in line (41) open without effect since pressure switch 15 contacts in line (41) are open.

LLL. As noted above, timer relay TR–16 was deenergized and this deenergization will produce the following sequence:

(1) The TR–16 contacts in line (52) close immediately to seal in band clamp relay CR–15 in line (53).

As a result of the energization of solenoid P to retract gauge clamps 249, the pressure switches PS–16 and PS–18 in conduits 243 and 246, respectively, associated with valve VP will be actuated. Pressure switch PS–16 in line 243 opens without effect since limit switch LS–22 in line (50) was previously open. The contacts of pressure switch PS–16 in line (51) will reclose without effect since band clamp relay CR–15 was already sealed in through the TR–16 contacts in line (52) in accordance with LLL–1.

However the contacts of pressure switch PS–18 in line (60) will close as a result of the existence of high pressure hydraulic fluid in conduit 246 to thereby immediately energize gauge cylinder extend relay CR–17 in line (60) to thereby cause the gauging carriage 146 to be extended from right to left in FIG. 18. Since this action was completely described in paragraphs TT, VV, and UU, it is deemed unnecessary to repeat this subject matter at the present time. After the gauging carriage 146 has come to rest against fixed block 93, the gauge clamps 249 will engage bands 128 as described above and in due course and at the appropriate portion of the shear cycle will again feed rod 18' through the knives a distance as is predetermined by the spacing between blocks 93 and 153.

The above-described sequence of gauging the lengths of rod 18' and shearing these lengths by shear 12 is repeated automatically until such time as the end portion of rod 18' approaches shear 12. Suitable structure is provided for automatically ejecting a remnant from shear 12 when the length of this remnant is less than the length of the slugs which have been cut. For this purpose the following structure is associated with feed carriage 117 (FIGS. 2, 12, 13, 14, 15, and 16). A yoke 259 of inverted U-shaped configuration has rollers 260 journaled on the opposite sides thereof for engaging the upper surfaces of ways 116 of feed table 11. Also journaled on the sides of yoke 259 are lower rollers 261 which engage the undersurfaces of ways 116 of feed table 11.

Yoke 259 is rigidly affixed to feed carriage housing 118 during the normal gauging cycles described above but is movable relative to said housing during the process of ejecting a remnant from shear 12. More specifically, rods 262 (FIG. 14) have their left ends rigidly affixed to yoke 259 and their right ends slidably mounted in upstanding plate 263 which is mounted between the opposite sides of feed carriage housing 118. As can be seen from FIG. 14, suitable bearing supports 264 house the right ends of rods 262 and apertures (not numbered) are provided in plate 263 to permit the right ends of rods 262 to slide relative to feed carriage housing 118 under certain circumstances to be described hereafter. At this point it is to be noted that the end of pusher rod or probe 123 (FIG. 14) is rigidly affixed to plate 265 mounted on plate 263 of feed carriage 117 as by bolts 266. Thus probe 123 cannot move relative to feed carriage housing 118.

As the end of rod 18' passes through the upper portion 267 of end plate 91 (FIG. 13) of feed table 11 under the pushing action of probe 123, a point will be reached where yoke 259 comes into abutting engagement with portion 267 of plate 91 and engages bumper 268 (FIG. 15). However just prior to this time yoke 259 is disengaged from rigid connection with feed carriage housing 118 because the roller 270 on cam follower arm 269 (FIGS. 15 and 16) engage cam 271 (FIGS. 1 and 3) which is mounted on one of boxlike frame members 89 of feed table 11. Cam follower arm 269 is keyed to shaft 271 (FIG. 16), the opposite ends of which are journaled for rotation in bearings 272 mounted on feed carriage housing 118. Shaft 271 in turn has dogs 273 rigidly affixed thereto, the ends of these dogs being formed into hooklike portions 274, the inner surfaces of which are in abutting driving relationship with rods 266 (FIGS. 14 and 15) during the actual advancement of feed carriage 117 during the above-described gauging action. However, after cam follower arm rides up on cam 271, said arm will pivot in a counterclockwise direction (FIG. 15) about the axis of shaft 271. Since dogs 273 are rigidly affixed to shaft 271 they will also pivot in a counterclockwise direction until such time as the ends 274 thereof disengage the right ends of rods 262. This will permit said rods 262 to move to the right relative to feed carriage housing 118 after yoke 259 has come into abutting engagement with plate 267 on the front of feed table 11. More specifically as the end of probe 123 passes through the aperture in plate 267, rods 262 will move to the right in FIG. 14 because yoke 259 is held by plate 267. The ends of rods 262 are connected by shaft 275 (FIG. 14). First ends of coil springs 276 encircle shaft 275 and the other ends of springs 276 are attached to hooks 277 mounted on plate 278 which is affixed to plate 263 of feed carriage housing 118. It can thus be seen that as the left end of probe 123 enters shear 12, rods 262 will be held stationary but feed carriage housing 118 will move to the left and thus springs 276 will be expanded. In this manner probe 123 will enter the shear to eject a remnant of rod 18' therefrom.

The function of upstanding yoke 259 is to cause positive engagement between the end of rod 18' and the end of pusher rod 123 during the actual feeding of the rod to the shear. More specifically, sometimes rods such as 18' have a camber therein so that the right end thereof will not be in exact alignment with probe 123. This raises the distinct possibility that during the initial stages of engaging probe 123 with the end of rod 18' said probe might miss the end of the rod and therefore not feed said rod to the shear in the above-described manner. To obviate the foregoing possibility a suitable cam plate such as 400, shown in FIGS. 32 and 33, which are described hereafter may be affixed to yoke 259, said cam plate having an aperture therein for receiving the end of the rod. More specifically in the foregoing respect the plate may have a funnel-shaped aperture with the large dimension facing the shear and the small dimension facing feed carriage housing 118. Thus as yoke 259 approaches the end of rod 18' during the initial step of feeding said rod to the shear, said end will enter the funnel-shaped aperture in the cam plate which in turn will guide said end toward the left end of probe 123. The exact structure of the cam plate 400 and its relationship to a yoke will be described hereafter. As can be seen from FIG. 15 during the normal driving relationship between probe 123 and rod 18', the left end of probe 123 lies between the opposite side walls 278 and 279 of yoke 259 so that after the right end of rod 18' is funneled toward the left end of probe 123 during the initial stages of engagement therebetween, positive engagement will be assured to thereby prevent probe 123 from moving to the left in FIG. 15 without engaging the end of rod 18'. It is to be especially noted that probe 123 is centered within the small portion of the funnel in the cam plate and that said small end has a diameter which is less than twice the diameter of rod 18' so that the left end of probe 123 must positively engage the right end of rod 18' after the latter has entered the funnel.

As noted above, there was relative movement between probe 123 and yoke 259 during the step of ejecting the remnant of rod 18' from shear 12. After such ejection has been completed, feed carriage housing 118 is caused to move to the right, as will be described in detail hereafter, and during such initial stages of movement said housing 118 will move to the right relative to yoke 259 which is still held stationary against portion 267 of plate 91 because of the bias of springs 276 on rods 262. However a point will be reached where shaft 275 which is mounted on the ends of rods 262 and supports springs 276 returns to the position shown in FIG. 14 and wherein cam arm 269 loses contact with cam 271 and pivots in a clockwise direction to return to the position shown in FIG. 15. At this time movement of feed carriage housing 118 to the right will be accompanied by movement of yoke 259 to the right because at this time there will be a positive connection therebetween.

During the movement of feed carriage housing 118 to the left after yoke 259 has engaged end plate 91, a point will be reached wherein cam 173 (FIG. 19) mounted on feed carriage 117 engages limit switch LS-25. This occurs when the end of probe 123 is extremely close to the center line between blades 187 and 188 but has not yet reached the point where movable blade 187, if actuated, could engage the end of probe 123. The actuation of limit switch LS-25 prevents shear 12 from producing a shearing stroke under any circumstances to thereby prevent the end of probe 123 from being sheared by movable blade 187. It is to be especially noted that limit switch LS-25 does not in any way affect the action of the gauging mechanism described above. In this respect the interaction between relays CR-8, CR-15, CR-17 and CR-18 will continue until the probe 123 has positively pushed the remnant end of rod 18' through shear 12. Because of the foregoing structure, the ejection of a remnant end of a rod from shear 12 in an automatic manner is positively assured.

It is to be also especially noted at this point that pressure block 226 (FIG. 24) is mounted adjacent to and in overlying relationship with a portion of lower knife 188. Thus even if a greater length of rod 18' extends to the left of the left face of lower knife 188 than to the right thereof in FIG. 24, the fact that this smaller length is engaged by upper block 227 of pressure block 226 will prevent the remnant from falling off of knife 188 because of its unbalance. As noted above, the gauging sequence continues even though the probe 123 is moving relative to yoke 259 and thus the obtaining of the maximum number of slugs from rod 18' is assured because the actual shearing action of shear 12 will terminate only when the left end of probe 123 is extremely close to the center line between knives 187 and 188.

Insofar as the actuation of limit switch LS-25 is concerned, it is to be noted that even though it is not actuated until the left end of probe 123 is extremely close to the center line of blades 187 and 188, the fact remains that sometimes the remnant end is shorter than the distance between the center line of shear knives 187 and 188 and the rear side of shear 12. Therefore the above-described additional gauging cycles are desired to make certain that the remnant is positively ejected from the rear side of shear 12 so that it will not interfere with subsequent engagement of a workpiece of another rod 18' by becoming lodged on the surface of the workpiece support 312.

As noted above, the actuation of limit switch LS-25 positively prevents shear 12 from producing a cutting stroke when the probe 123 is extremely close to the center line of knives 187 and 188. This can be seen from FIG. 29 of the line diagram wherein limit switch LS-25 which is normally closed is located in line (19) with brake relay CR-3. The opening of limit switch LS-25 causes the brake relay CR-3 to be deenergized thereby causing the brake 190 to terminate motion of movable knife 187 when the latter reaches the top of its stroke.

After the probe 123 has completely pushed the remnant of rod 18' through shear 12, cam 173 on pushed carriage housing 118 will engage limit switch LS-35 in line (63) to thereby energize bar cycle end relay CRE to thereby signal that the entire rod 18' has been completely disposed of and that it is time to reverse the direction of travel of feed carriage 117 to place the feed table in condition for receiving a subsequent rod 18' from the storage rack of the unscrambler.

MMM. The energization of relay CRE in line (63) results in the following sequence:
(1) The normally closed CRE contacts in line (13) open to deenergize CRG relay in line (13). Thus the bar on table relay CRG can no longer provide an indication that there is a bar on the feed table.
(2) Both normally closed CRE contacts in line (42) open to deenergize the gauge clamp relay CR-16 and the time delay relay TR-16 in lines (42) and (43), respectively. The deenergization of gauge clamp relay CR-16, as noted above, causes solenoid P to be deenergized to thereby cause valve VP to return to its position shown in FIG. 18 to thereby cause gauge clamps 249 to release bands 128.
(3) The CRE contacts in line (45) close without effect since the CR-14 contacts in line (46) are open.
(4) Normally closed CRE contacts in line (46) open without effect.

(5) Normally closed CRE contacts in line (50) open to deenergize gauge cylinder retract relay CR–18 assuming that it is energized at this time. This would deenergize solenoid M to cause valve VMN to return to the position shown in FIG. 18.

(6) Normally closed CRE contacts in line (55) open to deenergize band clamp relay CR–15 if it is energized to thereby deenergize band clamp solenoid L (FIG. 18) to cause valve VL to return to the position shown in FIG. 18 to thereby cause band clamps 220 to release bands 128.

(7) The CRE contacts in line (64) close to seal around limit switch LS–35 to thereby hold bar cycle end relay CRE in line (63) energized until it is positively deenergized by the opening of limit switch LS–19 after feed carriage 117 has returned to its position at the rear of the feed table.

NNN. After the deenergization of the bar on table relay CRG in line (13) in accordance with MMM–1 above, the following sequence of events will occur:

(1) The CRG contacts in line (12) open without effect since CRK, line (11), is not energized.

(2) The CRG contacts in line (14) open to deenergize carriage forward relay CR–14 in line (14) to thereby positively prevent feed carriage 117 from being energized in a forward direction, that is, from right to left on the feed table.

(3) The CRG contacts in line (33A) open and in conjunction with the open CR–14 contacts in line (34) will deenergize timer relay TR–7, line (33), slow speed relay CR–7 in line (34) and on delay timer relay TRN in line (38).

(4) The CRG contacts in line (49) open without effect on the circuit since the normally closed CRE contacts in line (50) are now open.

After the foregoing sequence of events, all relays associated with shear 12 and the gauging cycles of feed table 11 are deenergized except relays CRE energized above in the paragraph preceding MMM, and gauge cylinder extend relay CR–17 which will cause solenoid N in line S–15 to actuate valve VMN to cause the gauging carriage 146 to be moved fully to the left until it contacts limit switch LS–24 as described in detail above. Furthermore at this time the carriage reverse relay CR–13 has become energized through the deenergization of carriage forward relay CR–14 in NN–2.

OOO. As a result of the deenergization of carriage forward relay CR–14 in NN–2, the following sequence of events will occur:

(1) The CR–14 contacts in line S-12 will open to deenergize solenoid K, the carriage forward solenoid to thereby remove the force which solenoid K exerts on valve VKJ in FIG. 20, thereby tending to permit valve VKJ to return to the position shown in the drawings. However it will be noted that at a subsequent point solenoid J which controls the reverse action of motor 141 will be energized to cause feed carriage 117 to move in reverse toward the end of the feed table.

(2) The CR–4 contacts in line (33) open to deenergize timer relay TR–7 (see MMM–3 above).

(3) The CR–14 contacts in line (34) open to deenergize slow speed relay CR–7 thereby permitting feed carriage 117 to be moved toward the rear end of the table 11 at high speed, as described hereafter.

(4) Normally closed CR–14 contacts in line (46) reclose to energize carriage reverse relay CR–13 in line (46).

PPP. As a result of the energization of carriage reverse relay CR–13 in line (46), the following sequence of events will occur:

(1) The CR–13 contacts in line S-11 close to energize carriage reverse solenoid J. This will cause valve VKJ (FIG. 20) to shift from the position shown to a position wherein it effects communication between high pressure conduit 109 and conduit 176 leading to hydraulic motor 141 to thereby cause said hydraulic motor to operate at high speed in reverse. Thus the carriage 117 will move from its position at the extreme left of feed table 11 proximate shear 12 to the right end of feed table 11 (FIG. 19) at high speed until the feed carriage 117 abuts fixed abutment 171 (FIG. 15) and comes to rest after actuating limit switch LS–19, as described in detail above. It is to be especially noted at this point that the reverse travel of feed carriage 117 the length of the table is of special significance in that it greatly cuts down the time required to prepare feed table 11 for a subsequent bar loading action from the storage rack of unscrambler 10. In this respect it can readily be seen that if it took as long for the feed carriage 117 to return to its position at the rear of table 11 as it did for it to move from the rear of the table to the front of the table, there would be an extremely long unproductive time during which no slugs were being obtained from the shear. However by causing the carriage to reverse at high speed the actual resetting time is held to a minimum thereby permitting the feed table 11 to have a relatively high rate of production with a lower per unit cost of slugs.

(2) The CR–13 contacts in line (14) open as an electrical interlock to prevent carriage forward relay CR–14 from being energized.

(3) The CR–13 contacts in line (36) close without effect.

(4) The normally closed CR–13 contacts in line (58) open to deenergize bar cycle relay CRC in line (58).

QQQ. After CRC relay has been deenergized in PPP–4, the following sequence of events will occur:

(1) The normally closed CRC contacts in line (11) close without effect since the knife lower relay CRK was previously de-energized.

(2) The CRC contacts in line (16) open without effect because carriage forward relay CR–14 in line (14) was previously deenergized.

(3) Normally closed CRC contacts in line (21) reclose without effect since CRT contacts in line (21) are open.

(4) Normally closed CRC contacts in line (40) reclose without effect since CRT relay in line (40) was previously deenergized and pressure switch PS–15 is now open in line (40).

(5) CRC contacts in line (44) open without effect since CRE contacts in line (42) are open.

(6) Normally closed CRC contacts in line (49) reclose without effect since CRG contacts in line (49) are open.

(7) Normally closed CRC contacts in line (54) reclose without effect since TRN contacts in line (54) are open.

(8) CRC contacts in line (57) open without effect since CR–13 contacts in line (58) are open.

In view of the foregoing sequence of events, as noted above, the feed carriage 117 will move toward the rear of feed table 11 at high speed and will continue to do so until cam 173 (FIG. 20) thereon engages limit switch LS–33 in line (36). At that time carriage 117 will continue to move toward the rear of the table at slow speed as described above in paragraph E until such time as limit switch LS–19 is actuated by cam 173 to thereby set the feed table 11 up for receiving a bar 18 from the storage rack of unscrambler 10 as described in detail above. Thereafter, as described in detail above, a bar 18' will be unloaded from the storage rack onto the feed table and the above-described sequence of events will be repeated until such time as there are no bars 18 available for feeding to table 11. When no bars are available, the actuation of the appropriate limit switches associated with the unscrambler 10, feed table 11, and shear 12 will cause them all to terminate operation until such time as the unscrambler 10 is again reloaded.

It is to be noted that the electrical line diagram of FIGS. 28, 29, and 30 are conventional and that only the most pertinent features of the instant combination have been described in the specification. However a review of these diagrams will indicate that there are various collateral electrical circuits relating to lubrication of the machine, signals for indicating that various sequences have been performed, or are required, and various push buttons for providing semi-automatic operation. The portions of the circuit relating to the foregoing elements are integrated with the circuit which has been described and it is believed that an understanding of these circuits will be readily apparent to one skilled in the art from FIGS. 28, 29, and 30.

In FIGS. 22 and 23 a modified form of feed carriage 325 is disclosed. This feed carriage may be connected to bands 128 in the same manner described above with respect to feed carriage 117. However the probe arrangement is made especially for feeding of relatively thin rods 18″ which are susceptible to bending. First of all, it is to be noted that a V trough 326 is used for supporting rod 18″ to thereby prevent it from sagging. Rods 327 have the right end thereof attached to feed carriage 325 in the same manner as described above with respect to rods 266 of FIG. 16. The left ends of rods 327 (FIG. 22) support yoke 328. A probe 329 may have the right end thereof affixed to feed carriage 325 in the same manner as proble 123 of FIG. 16. The left end of probe 329 fits between side faces 330 and 331 of yoke 328. A suitable funnel arrangement as described above with respect to feed carriage 117 is provided in yoke 328 for receiving the end of bar 18″. It can therefore be seen that once the right end of bar 18″ is engaged by the left end of probe 329, it cannot lose contact therewith. However in order to insure that rod 18″ is held within trough 326, a hold-down member 332 is mounted on the front of yoke 328. More specifically the upper end of hold-down member 332 is rigidly secured to block 333 having an aperture 334 therein which receives bar 335 extending between plates 336 on the front of yoke 328. A pair of set screws 337 and 328 are threaded into block 333. By backing off one of the set screws and tightening the other, the height of the end 339 of hold-down member 332 may be adjusted so that various sized bars may be accommodated in trough 326. The end 339 prevents rod 11″ from rising up during the feeding thereof to the left.

It is also to be noted that block 333 can be shifted from side to side on rod 335 (FIG. 23). This permits the adjustment of hold-down 332 laterally so that this hold-down may coact with the other troughs (not shown) which may be placed to the side of trough 326. In the foregoing respect it is also to be noted that the plate on which probe 123 (FIG. 16) is mounted may be shifted laterally with respect to carriage 117 to thereby permit probe 123 to be shifted laterally. A similar type of mounting is provided for probe 329 of FIG. 22 to thereby permit probe 329 to be moved into alignment with hold-down 332 after the latter has been moved to a shifted position. The purpose for permitting all of the foregoing adjustments is because knives for shears many times have different sized cutouts 350–350′ and 351–351′ (FIG. 26) placed side by side for receiving different sizes of stock. It is easier to shift a probe on a feed carriage and the guide troughs laterally as different sized stocks are to be cut on the shear than to change the knives. In the foregoing respect it is also to be noted that V-shaped rolls 213 (FIG. 1) which guide a rod to shear 12 can also be shifted laterally on the feed table to effect an alignment of the foregoing type by merely causing the bearing pedestals 214 on which rolls 213 are mounted to have sliding connections with the cross braces of the feed table on which they are mounted.

In FIGS. 27, 27A, 27B, and 27C an alternate form of unscrambler is disclosed. This unscrambler may be identical in all respects to the unscrambler structure desired above in FIGS. 5 and 6 except for certain structure. More specifically, the unscrambler of FIGS. 27–27C is particularly suited for receiving stock of various dimensions. More specifically blocks 340 are provided having an upper portion 341 and a stem 342. Suitable apertures 343 are provided in the ends of channels 344 for receiving stems 342. These apertures, as can be seen from FIG. 27 and FIG. 27C, are located with one side thereof in alignment with the surfaces of frame members 13 (FIG. 1) which face each other. U-shaped brackets 345 are suitably welded to the inside surfaces of frame members 13 for receiving the lower portions of stems 342. It can readily be seen therefore that stems 342 may be inserted through apertures 343 in plate members 344 and the lower portions of stems 342 will enter the space defined by U-shaped brackets 345 and the inside surface 346 of frame members 13. Since both the apertures 343 in plates 344 and the apertures provided by brackets 345 are noncircular, T-shaped block members 340 will not be able to rotate once they have been dropped into position. Various sets of blocks 340 may be provided with each bundle table, each of these sets having blocks which are of a different height to thereby cause the distance from the bottom of slots 347 to the top of blocks 340 to be different to thereby permit the unscrambler to accommodate stock of different sizes. As can be seen from FIG. 27A, it is desirable that stock, when located in slots 347, have the upper surface thereof flush with the upper surfaces of blocks 340. This insures that in the event bundle carriers 40 (FIG. 1) pick up more than one bar in the slots therein, after one of these bars is deposited in slots 347 of the bundle table, the other of the bars will be permitted to roll downwardly into the storage bin portion of the bundle table. The foregoing arrangement assures that after bars reach the top of the bundle table they will be discharged one at a time onto the storage rack. The purpose of desiring only one bar at a time on the storage rack is to prevent a plurality of bars to be deposited thereon at any given time which in turn might cause such bars to jump over the fixed stop or abutment 87 at the end of the storage rack and possibly land on the feed table 11 during an actual feeding operation, that is, when said feed table is not clear to receive such bars.

It is also to be noted that both the bundle carriers and the bundle table of FIGS. 27 to 27C do not have the T-shaped cross sectional configuration shown in FIGS. 5 and 6. Instead they have channel members which have the end portions thereof welded to suitable frames and edge portions of the channels welded to each other. This construction is cheaper than one utilizing the T-shaped members of FIGS. 5 and 6.

It is to be again noted from FIG. 25 that a plurality of grooves are provided in the pressure blocks in side by side relationship. These grooves are of different sizes to accommodate different size stocks. More specifically, the semicircular grooves 236 and 228 will accommodate a first size of stock and grooves 236A and 228A will accommodate another size of stock. Lower grooves 236 and 236A (FIG. 25) are in line with correspondingly sized grooves in stationary knife 188 and grooves corresponding in size to grooves 228 and 228A are located in side by side relationship in movable knife 187. By the use of a plurality of differently sized apertures, different sizes of stock may be fed to shear 12 without either removing pressure block assembly 226 or removing knives 187 and 188 from the shear. The foregoing is effected as noted above by merely shifting the guide means on the feed table.

At a preceding portion of the specification a cam plate 400 (FIGS. 32 and 33) was described broadly with respect to yoke 259 associated with carriage 117. It will be understood that cam plate 400 may be mounted on yoke 259 in the same manner as described hereafter with respect to yoke 328 of FIG. 22. More specifically, yoke 328 is of inverted U-shaped configuration having downwardly depending legs with an opening therebetween. Cam plate 400 initially fits within the opening between these legs and is secured therein by screws 405 which fit through the upper portion of yoke 328 and are threaded into tapped apertures (not numbered) in cam plate 400. An outer peripheral portion of cam plate 400 fits in complementary mating relationship with surface 401 of inverted U-shaped yoke 328 as can be seen from FIGS. 32 and 33. A flange 404 is located on the front face of cam plate 400 and this flange abuts the side face 331 of yoke 328 to prevent said cam plate from being pushed through the opening in the yoke. The lower portion of cam plate 400 has a portion of a conical surface 403 therein which tapers toward a portion of a cylindrical surface 402 toward the rear of said cam plate. It can readily be seen from FIG. 32 that if a bar 18' has a camber therein which might cause it to miss the end of probe 329' associated with a feed carriage, such bar will engage funnel-shaped opening 403 and as there is relative movement between the cam plate 400 and the end of the bar 18' the latter will be moved downwardly so that positive engagement between the end of probe 329' and the bar is assured. It must again be stressed that while cam plate 400 has been described with respect to yoke 328 for the sake of convenience, its primary use is with yokes such as 259 (FIG. 15) which do not have a hold-down such as 332 (FIG. 22) associated therewith.

As noted above with respect to FIGS. 24 and 25, the pressure block assembly 226 floats for the purpose of securely holding a bar. It is to be further noted that a resilient pressure pad 231' is located between the lower portion 229 of the pressure block and the bed 181 of the shear. This resilient pad causes the pressure block assembly to always return to a predetermined position after a rod is no longer therein. It is also to be noted that the resilient pad 231' permits the pressure block assembly 226 to move downwardly when it is subjected to the stress of the hold-down 310. This causes the end portion of rod 18' to be firmly seated on stationary blade 188 so that the massive forces referred to above are applied to rod 18' at areas immediately adjacent to the locality at which the rod is sheared. In other words it can be seen that if the lower portion 229 of the pressure block assembly were rigidly mounted, such rigid mounting might interfere with the firm seating of rod 18' on stationary blade 188. If such seating were not effected, the rod 18' would tend to bend during the shearing and a commercially unacceptable cut would be obtained. Thus the resilient pressure pad 231' has sufficient spring force to return the pressure block assembly 226 to a predetermined position when it is not subjected to the above-described hold-down force but is also sufficiently resilient so that it permits a rod 18' to seat firmly on stationary blade 188 when said rod is subjected to the above-described hold-down force.

It will also be noted that while the foregoing description has described the operation of the feed table and shear with respect to a single bar, it will be appreciated that a plurality of rollers or guide troughs may be placed side by side and that a plurality of pusher rods may be mounted on the feed carriage so that a plurality of bars may be simultaneously fed to a shear in tandem thereby producing a multiple output from the shear. Furthermore the elevators associated with the feed table may be designed within the scope of the instant invention to pick up a plurality of bars from the storage rack of the unscrambler and deposit such bars substantially simultaneously on spaced guide means to effect the above-described objective of shearing a plurality of bars simultaneously.

While the pressure block assembly 226 (FIGS. 24 and 25) has been shown as mounted on the shear 12 per se, it will be appreciated that it can also be mounted on the end of the feed table 11 proximate shear 12. Furthermore while the storage rack has been depicted as being an integral part of the frame of unscrambler 10, it will be appreciated that this storage rack can be a portion of the feed table without any physical connection to the unscrambler frame. Furthermore within the scope of the present invention it will be appreciated that an unscrambler such as 10 can be mounted on both sides of the feed table 11, each of said unscramblers being capable of handling different sized bars and that each of the unscramblers can operate simultaneously to load a pair of side by side guide arrangements, such as described above, for feeding two bars of different sizes simultaneously to a shear having knives therein with a pair of different sized openings, as shown in FIG. 26.

It can thus be seen that the combined unscrambler, feed table and shear of the present invention is manifestly capable of achieving the above-enumerated objects set forth in the specification, and while preferred embodiments of the present invention have been disclosed, it will readily be appreciated that the present invention is not limited thereto but may be otherwise embodied within the scope of the following claims.

We claim:
1. A feed table for advancing a rigid member to an intermittently operating machine comprising a frame, feeding means mounted on said frame, motor means for driving said feeding means, means associated with said feeding means for engaging the end of said rigid member remote from said machine in abutting relationship, control means for intermittently causing said motor means to advance said feeding means toward said machine by alternately moving and stopping and thereby causing said rigid member in abutting engagement with said feeding means to be intermittently advanced toward said machine, and pressure block means operatively associated with said feeding means for frictionally engaging a portion of said rigid member remote from the end thereof in engagement with said feeding means with a frictional force which is in excess of the force produced as a result of the momentum of said member experienced during the movement thereof to thereby cause said end of said member remote from said machine to remain in abutting engagement with said feeding means after said feeding means have come to a stop after movement thereof.

2. A feed table for advancing a rigid member in accurately gauged increments to an intermittently operating machine comprising a frame, feeding means mounted on said frame, motor means for driving said feeding means, abutment means associated with said feeding means for engaging the end portion of said member remote from said machine in abutting relationship, gauging means operatively associated with said feeding means for alternately causing said feeding means to advance and thereafter stop after having advanced a predetermined accurately gauged distance and therefore causing said member in abutting relationship with said abutment means to advance toward said machine said predetermined accurately gauged distance, and pressure block means operatively associated with said feeding means for frictionally engaging a portion of said member remote from the portion thereof in abutting relationship with said abutment means with a frictional force which is in excess of the momentum of said member during the advancing movement thereof, to thereby cause said end of said member in abutting engagement with said abutment means to remain in such engagement after said feeding means have been stopped to thereby assure that an accurately gauged portion of said member has been advanced toward said machine.

3. An unscrambler for separating single elongated bars of a predetermined cross sectional depth from a bundle of like elongated bars comprising a frame, a storage bin on said frame for receiving said bundle of elongated bars, a bundle table inclined upwardly from said storage bin, said bundle table including an upper surface and a plurality of substantially parallel horizontal slots extending downwardly from said upper surface of said bundle table and being of a dimension substantially equal to said predetermined cross sectional depth of said elongated bars to thereby receive only a single bar with the upper surface of said bar lying substantially flush with said upper surface of said bundle table, bundle carrier means mounted on said frame, a plurality of bar engaging means on said bundle carrier means, and control means operatively associated with said bundle carrier means for causing said bar engaging means to receive bars from said slots on said bundle table and elevate said bars to other slots located at a higher position on said bundle table and thereafter move to a position wherein it does not obstruct the surface of said bundle table to thereby permit bars which are not positively deposited in said slots of said bundle table to roll downwardly into said storage bin without being obstructed by bars which are held within said slots inasmuch as said last-mentioned bars are substantially flush with the upper surface of said bundle table whereby the moving of single bars from lower slots in said bundle table to higher slots thereof is positively assured.

4. An unscrambler as set forth in claim 3 including means operatively associated with said slots on said bundle table for varying the dimensions thereof to permit said slots to receive bars of various dimensions.

5. An unscrambler for separating a bundle of elongated bars into a series of bars lying in parallel juxiaposed relationship comprising a frame, a storage bin on said frame for receiving said bundle of bars, a bundle table inclined upwardly from said storage bin, said bundle table having a lower portion located proximate said storage bin and a higher portion located remotely from said storage bin, a plurality of substantially parallel horizontal bar receiving means on said bundle table, bundle carrier means mounted on said frame, bar carrying means operatively mounted on said bundle carrier means for removing bars from lower bar receiving means on said bundle table and transporting said bars to higher bar receiving means on said bundle table in a stepwise fashion to thereby gradually elevate said bars from said storage bin to bar receiving means located at said higher portion of said bundle table, storage rack means located in operative relationship to said bundle table for receiving bars from said higher bar receiving means associated therewith in response to the operation of said bundle carrier means, and control means for terminating the operation of said bar carrying means when a predetermined number of bars are stored on said storage rack means.

6. An unscrambler as set forth in claim 5 wherein said storage rack means is downwardly inclined from the higher portion of said bundle table so that bars removed from said bundle table by said bundle carrier means and deposited on said storage rack means move downwardly on said storage rack means, and means on said storage rack means for terminating the downward movement of said bars, said depositing of single bars on said storage rack means permitting said bars to come to rest in parallel side by side juxtaposed relationship on said storage rack means, said depositing of single bars on said storage rack means permitting said bars to come to rest in parallel side by side juxtaposed relationship on said storage rack means.

7. In combination, an unscrambler for separating a bundle of bars into a series of parallel bars lying in juxtaposed side by side relationship and a feed table for selectively removing said juxtaposed bars for feeding to a machine comprising: an unscrambler frame, a storage bin on said unscrambler frame for receiving a bundle of bars, means on said unscrambler for separating said bundle of bars, storage rack means operatively associated with said unscrambler for storing said bars in parallel juxtaposed side by side relationship; said feed table including a feed table frame, receiving means on said frame for receiving a bar from said storage rack, means on said feed table for feeding a bar on said bar receiving means to said machine; and transporting means operatively associated with both said feed table and said unscrambler for removing bars retained on the storage rack portion thereof and conveying said bars to said receiving means on said feed table for receiving said bars, and control means operatively associated with said bar transporting means and with said feed table for preventing said transporting means from transporting said bars to said feed table unless said bar receiving means on said feed table is clear to receive said bar.

8. In combination an unscrambler for separating a bundle of elongated bars into a series of bars lying in parallel juxtaposed side by side relationship and a feed table for conveying said bars to a machine comprising: an unscrambler frame, a storage bin on said frame for receiving said bundle of bars, means for positively separating said bundle into single bars, storage rack means for storing said separated bars in parallel side by side juxtaposed relationship, and first control means for causing said unscrambler to function until a predetermined number of bars have been stored on said storage rack and thereafter automatically terminate operation; said feed table means including a frame, means on said frame for receiving a bar from said storage rack, means on said feed table for feeding a bar on said receiving means to said machine and bar transporting means operatively associated with both said unscrambler and said feed table, and second control means operatively associated with both said unscrambler and said feed table for causing said bar transporting means to positively remove a bar from said storage rack and deposit it on said bar receiving means on said feed table only when said bar feeding means is in a position where it causes said feed table to be in condition to receive said bar; said first control means associated with said unscrambler being operative to replenish the supply of bars on said storage rack until said predetermined amount has been deposited thereon regardless of the condition of said feed table to thereby assure that a sufficient number of bars is deposited on said storage rack for transporting to said feed table when said second control means indicate a requirement for a bar on said feed table.

9. A feed table for intermittently advancing a workpiece in accurately gauged increments comprising a frame, workpiece feeding means mounted on said frame, first guide means operatively associated with said frame and said workpiece feeding means for guiding said workpiece feeding means in a pretermined path on said frame, a gauging carriage, second guide means operatively associated with said gauging carriage for guiding said gauging carriage in a predetermined path, first stop means for limiting the movement of said gauging carriage in a first direction, second stop means for limiting the movement of said gauging carriage in a second direction, spaced pulleys mounted on said frame, flat band means extending about said spaced pulleys and secured to said workpiece feeding means, band clamping means mounted on said frame, gauge clamping means mounted on said gauging carriage, first means for selectively moving said gauging carriage between said first and second stop means, second means for moving said workpiece feeding means, and first control means for causing said gauge clamping means to engage said band means when said gauging carriage is proximate to said first stop means and for causing said band clamping means to disengage said band means when said gauging carriage is proximate to said first stop means and for causing said second means to move said workpiece feeding means and said band means and said gauging carriage until said gauging carriage is proximate to said second stop means to thereby move said workpiece feeding means a distance as determined by the spacing between said first and second stop means, and second control means responsive to the approaching of said gauging carriage to said second stop means for causing said band clamping means to engage said band means and for causing said gauge clamping means on said gauging carriage to release said band means and for causing said first means to return said gauging carriage from a position proximate said second stop means to a position proximate said first stop means while said band clamping means hold said band means and said workpiece feeding means against movement, said movement of said gauging carriage to a position proximate said first stop means causing a reenergizing of said first control means.

10. A feed table for advancing a workpiece an accurately gauged predetermined amount comprising a frame, spaced pulleys mounted on said frame, a feed carriage on said frame for advancing said workpiece, a guide means for guiding said feed carriage on said frame in a predetermined path of movement, band means encircling said spaced pulleys and attached to said feed carriage, motor means for selectively causing said feed carriage to move on said frame, gauging means for causing said feed carriage to move said predetermined amount on said frame, band clamp means for positively locking said band means to said frame after said predetermined amount of movement of said feed carriage has been experienced to thereby insure that said feed carriage terminates movement after it has moved said predetermined amount and means for moving the band clamp means into locking position after said predetermined amount of movement.

11. A feed table for intermittently advancing a workpiece in accurately gauged predetermined increments comprising a frame, spaced pulleys mounted on said frame, a feed carriage mounted on said frame, means for guiding said feed carriage in a predetermined path of movement, flat band means encircling said spaced pulleys and affixed to said feed carriage, a gauging carriage, gauge clamp means on said gauging carriage for selectively securing said gauging carriage relative to said flat band means, band clamp means fixedly mounted relative to said frame, first positive stop means for limiting movement of said gauging carriage in a first direction, second positive stop means for limiting movement of said gauging carriage in a second direction, first control means for causing said gauge clamp means to engage said band means to thereby positively secure said gauging carriage to said flat band means when said gauging carriage is in abutting relationship with said first positive stop means and for causing said band clamp means to disengage said flat band means, motor means for moving said feed carriage and said flat band means and said gauging carriage secured thereto from said first positive stop means to said second positive stop means, second control means for causing said band clamp means to lock said flat band means against movement relative to said frame after said gauging carriage has come into abutting relationship with said second positive stop means and for causing said gauge clamp means to disengage said band means to thereby release said gauging carriage from said flat band means, whereby said movement of said gauging carriage between said first and second positive stop means results in the movement of said feed carriage a predetermined distance which is a function of the distance between said first and second positive stop means, third control means for positively insuring that said gauge clamp means does not disengage said flat band means until after said band clamp means positively engage said flat band means to thereby assure that said feed carriage is positively held in a position corresponding to the position to which it was moved when said gauging carriage came into abutting relationship with said second positive stop means, means for returning said gauging carriage from said second positive stop means to abutting relationship with said first positive stop means, and fourth control means for insuring that said first control means effect engagement between said gauge clamp means and said band means before disengagement is effected between said band clamp means and said flat band means to thereby positively insure that said feed carriage is held in a position corresponding to the position to which it was moved when it came into abutting relationship with said second positive stop means until after said gauge clamp means engage said flat band means.

12. A feed table for advancing a rigid member to an intermittently operating machine comprising a frame, feeding means mounted on said frame, motor means for driving said feeding means, means associated with said feeding means for engaging the end of said rigid member remote from said machine in abutting relationship, control means for intermittently causing said motor means to alternately move and stop said feeding means thereby intermittently advancing said feeding means toward said machine and thereby causing said rigid member in abutting engagement with said feeding means to be intermittently advanced toward said machine, pressure block means operatively associated with said feeding means for frictionally engaging a portion of said rigid member remote from the end thereof in abutting engagement with said feeding means with a frictional force which is in excess of the force produced as a result of the momentum of said member experienced during the movement thereof to thereby cause said member to positively stop when said feeding means stops, and means for floatingly mounting said pressure block means relative to said feed table to thereby insure positive frictional gripping engagement between said member and said pressure block means.

13. A pressure block assembly for frictionally engaging an elongated bar-like member being fed to a machine by feed means which engage the end of said bar-like member with an abutting relationship remote from said pressure block assembly comprising a base portion adapted to be mounted relative to said machine, a pressure member, resilient means for yieldingly mounting said pressure member on said base portion, said base portion and said pressure member providing an aperture for receipt of said elongated bar-like member against the bias of said resilient means whereby said pressure member and said base portion resiliently engage said elongated bar-like member with a frictional force which is greater than the force produced by the momentum of said elongated bar-like member, and means for floatingly mounting said pressure block assembly relative to said machine to permit said pressure block assembly to have a floating action to thereby positively adjust itself to a position which will provide good frictional engagement between said elongated bar-like member and said pressure block assembly.

14. An unscrambler for separating a bundle of elongated bars into groups of bars each having a predetermined equal number of bars therein comprising a frame, a storage bin on said frame for receiving said bundle of bars, a bundle table inclined upwardly from said storage bin, said bundle table having a lower portion located proximate said storage bin and a higher portion located remotely from said storage bin, a plurality of bar receiving means on said bundle table, said bar receiving means being spaced along the incline of said bundle table, means on said unscrambler for removing bars from said storage bin and depositing said bars in said bar receiving means and for moving said groups of bars from lower bar receiving means to higher bar receiving means in a step-wise fashion, each of said bar receiving means including means for causing each of said bar receiving means to retain only said predetermined number of bars in said group and permitting bars in excess of said predetermined number to roll downwardly on said bundle table into said storage bin to thereby insure that each of said bar receiving means on said bundle table does not contain bars in excess of the number of bars capable of being retained by said bar receiving means.

15. A feed table for advancing a rigid member to an intermittently operating machine comprising a frame, feeding means mounted on said frame, motor means for driving said feeding means, means associated with said feeding means for engaging the end of said rigid member remote from said machine in abutting relationship, pressure block means operatively associated with said feeding means for frictionally engaging a portion of said rigid member with a frictional force which is in excess of the force produced as a result of the momentum of said member experienced during the movement thereof to thereby cause said member to positively stop when said feeding means stops, and means for floatingly mounting said pressure block means relative to said feed table to thereby insure positive frictional gripping engagement between said member and said pressure block means.

References Cited by the Examiner

UNITED STATES PATENTS

| | | | |
|---|---|---|---|
| 610,584 | 8/1898 | Bertsch et al. | 83—461 |
| 1,099,174 | 6/1914 | Gray | 214—1.6 X |
| 1,596,368 | 8/1926 | Naclerio | 269—254 |
| 1,604,891 | 10/1926 | Eeles | 83—264 X |
| 1,965,868 | 7/1934 | Vickers | 198—219 |
| 2,005,589 | 6/1935 | McCoy | 214—1.5 X |
| 2,017,752 | 10/1935 | Fisher | 83—389 X |
| 2,043,556 | 6/1936 | Protin. | |
| 2,618,842 | 11/1952 | Gridley | 214—1.5 |
| 2,656,859 | 10/1953 | Retz | 214—1.4 |
| 2,674,779 | 4/1954 | Herzog | 214—1.5 |
| 2,681,498 | 6/1954 | Harney | 214—1.2 |
| 2,781,120 | 2/1957 | Heiden | 198—29 |
| 2,849,066 | 8/1958 | Michelet et al. | 83—207 |
| 2,896,796 | 7/1959 | Schuetz | 214—1 |
| 2,995,235 | 8/1961 | Maier | 198—29 |
| 3,034,389 | 5/1962 | Pater | 83—461 |
| 3,044,512 | 7/1962 | Jones | 269—254 |
| 3,072,269 | 1/1963 | Hillier | 214—1.2 |
| 3,083,841 | 4/1963 | Guillaume-Ernest Megel et al. 214—1.2 | |
| 3,095,771 | 7/1963 | Vann | 214—1.2 X |
| 3,111,876 | 11/1963 | Rupp | 83—207 |
| 3,146,805 | 9/1964 | Bryner | 140—147 |
| 3,174,370 | 3/1965 | Thumim | 214—1.6 X |
| 3,175,430 | 3/1965 | Smith | 83—477 X |

FOREIGN PATENTS 32,305 3/1908 Austria.
1,120,844 12/1961 Germany.

MARVIN A. CHAMPION, *Primary Examiner.*

LEON PEAR, *Examiner.*

L. B. TAYLOR, *Assistant Examiner.*